United States Patent [19]
Wang et al.

[11] Patent Number: 5,619,433
[45] Date of Patent: Apr. 8, 1997

[54] REAL-TIME ANALYSIS OF POWER PLANT THERMOHYDRAULIC PHENOMENA

[75] Inventors: Guan-Hwa Wang, Potomac; Zen-Yow Wang, Elliott City; Horngshyang Lein, Columbia, all of Md.

[73] Assignee: General Physics International Engineering Simulation Inc., Columbia, Md.

[21] Appl. No.: 959,937

[22] Filed: Oct. 9, 1992

Related U.S. Application Data

[63] Continuation-in-part of Ser. No. 846,753, Mar. 4, 1992, abandoned, which is a continuation-in-part of Ser. No. 761,000, Sep. 17, 1991, abandoned.

[51] Int. Cl.$^6$ .................................................... G06F 17/50
[52] U.S. Cl. .......................................... 364/578; 364/495
[58] Field of Search ................................... 364/578, 148, 364/149, 188, 495; 395/500, 919, 920

[56] References Cited

U.S. PATENT DOCUMENTS

| | | | |
|---|---|---|---|
| 3,919,720 | 11/1975 | Alliston | 444/1 |
| 4,349,869 | 9/1982 | Prett et al. | 364/159 |
| 4,472,770 | 9/1984 | Li | 364/149 |
| 4,796,194 | 1/1989 | Atherton | 364/578 |
| 4,801,421 | 1/1989 | Ackerson et al. | 376/249 |
| 4,803,039 | 2/1989 | Impink, Jr. et al. | 364/188 |
| 4,815,014 | 3/1989 | Lipner et al. | 364/188 |
| 4,965,743 | 10/1990 | Malin et al. | 364/578 |
| 4,977,529 | 12/1990 | Gregg et al. | 364/578 |
| 5,016,204 | 5/1991 | Simoudis et al. | 364/578 |
| 5,319,579 | 6/1994 | Lipner | 364/578 |

OTHER PUBLICATIONS

Fabic, "On Choices Between The Two–Fluid and The Mixture Models for Simulation of Severe Transients in Nuclear Power Plants," Key Note Speech on the Simulation Multiconference on Simulators International VIII, 1–5 Apr. 1991, pp. 1–9 (spec. pp. 3,4).

Ishii, "Foundation of Various Two Phase Flow Models and Their Limitations," Argonne National Laboratory, pp. 3–47 to 3–56 (spec. p.

Wulff, "Computational Methods for Multiphase Flow," Chapter 3, *Multiphase Science and Technology*, vol. 5, 1990 (spec. p. 3).

Agee, "Capabilities and Limitation of LWR System Analysis Codes," RELAP User Seminar, College Station, Texas 1989 (spec. p. 3).

Fabic, "Thermal Hydraulics in Nuclear Power Plant Simulators," *Proceedings of the Third International Topical Meeting on Reactor Thermal Hydraulics*, Newport, Rhode Island, 1985 pp. 3.A1–1 to 3.A–5 (spec. p. 4).

(List continued on next page.)

*Primary Examiner*—Ellis B. Ramirez
*Assistant Examiner*—Eric W. Stamber
*Attorney, Agent, or Firm*—Orrick, Herrington & Sutcliffe

[57] ABSTRACT

A method and computer tool apparatus for determining the final state parameters of a power plant thermohydraulic system in which the thermohydraulic system is represented as a plurality of nodes having a flow regime map monitoring the thermodynamic system parameters. An equation set is provided including a first plurality of field equations including only one momentum equation, a drift equation for correlating the field equations with their variables, constitutive correlations and drift flux coefficients determined in response to the flow regime map so that there is closure between the field equations and the drift flux equation, and state equations for dependent thermodynamic variables. Final state parameters for the monitored thermohydraulic system are determined by solving the equation set in response to the sensed parameters by a momentum method and pressure search method, using a constant time step in the calculations. Real time methodologies used in the simulation field are combined with engineering analysis methodologies to provide the method and apparatus for engineering analysis and simulation of power plant thermohydraulic phenomena in a real-time environment.

33 Claims, 42 Drawing Sheets

Microfiche Appendix Included
(14 Microfiche, 1305 Pages)

OTHER PUBLICATIONS

Ransom et al., "Relaps/MOD2 Code Manual Volume 1: code Structure, System Models, and Solution Methods Idaho National Engineering Laboratory," NUREG/CR-4312, EGG-2396, Aug., 1985.

Ransom et al., "Selective Review of LWR Thermal Hydraulic Simulation Methods," The International Topical Meeting on Advances in Reactor Physics, Mathematics and Computations, 1987, Paris, France (spec. p).

Ishii, "One Dimensional Drift Flux Model and Constitutive Equations f Relative Motion Between Phases in Various Two–Phase Regimes," Argonne National Laboratory, ANL–77–47, Oct. 1977 (spec. p. 24).

FLUID NODE

HEAT SLAB

```
main ─┬─ sthinput
      ├─ sthconst
      ├─ sthinit
      ├─ sthfregime ─┬─ sthfregmaph
      │              ├─ sthfregmapv
      │              ├─ sthfregmode
      │              └─ sthfregmapj ─── sthfregmapv
      ├─ sthgamma ─┬─ sthhifhig ─┬─ sthhifhigus ─┬─ sthhifhig23 ─── sthhifhigs ─── sthhifhigbb
      │            │             │               │                              └─ sthhifhiga
      │            │             │               ├─ sthhifhig56 ─── sthhifhigia ─── sthhighigbb
      │            │             │               │                              └─ sthhifhigis
      │            │             │               ├─ sthhifhigb  ─── sthhifhigbb
      │            │             │               ├─ sthhifhigia ─── sthhifhigbb
      │            │             │               ├─ sthhifhiga
      │            │             │               ├─ sthhifhigd
      │            │             │               ├─ sthhifhigs  ─── sthhifhigbb
      │            │             │               └─ sthhifhigis
      │            │             ├─ sthhifhighs
      │            │             └─ sthhifhigvs
      │            ├─ sthhifhigxn
      │            └─ sthhifhiglag
      ├─ sthfwffwg ─┬─ sthfwallj ─── sthmfloss
      │             └─ sthfwafgj ─── sthmfloss
      └─ sthhlossfg
```

```
-sthpvsov----sthmviscfg
 |-sthpgasfrv
 |-sthpvsov1---sthpvgamma
 |             |-sthpvcoefla
 |             |-sthmtxinv-----sthmtxinv4
 |             |              |-sthmtxinv5
 |             |-sthpvcoeflb
 |             |-sthpvcoeflp
 |             |-sthpvcoeflc---sthdriftc0
 |             |              |-sthdriftvgj
 |             |-sthpvcoefdp
 |             |-sthdpsov40----sthdpmtx40
 |             |-sthdpsovsg----sthdpmtxsg
 |             |-sthpvnewpv
 |             |-sthpvzprop
 |             |-sthpvvflfp----sthmdonor
 |             |-sthpvcoefff---sthppropjj---sthmdonor
 |             |                           |-sthsepup
 |             |                           |-sthsepdn
 |             |               |-sthpvcoeflb
 |             |               |-sthpvcoeflp
 |             |               |-sthpvcoeflc---sthdriftc0
 |             |               |              |-sthdriftvgj
 |             |               |-sthpvcoefdp
 |             |-sthpvdisp
 |-sthpvsov2---sthpvconv
 |             |-sthpvnfield
 |             |-sthpvnprop----spwaters
 |                             |-spsat
 |                             |-stsat
 |                             |-spwaterf
 |                             |-sthpgasprp
 |-sthpemass
```

```
├─ sthmpropj
├─ sthmvelk
├─ sthppropj ──── sthppropjj ── sthmdonor
│                              ├─ sthsepup
│                              └─ sthsepdn
│
├─ sthmflow
├─ sthfbreak ──── sthchoke
│
├─ sthsgdriver ── sthpropctl
│                 └─ sthpictl
│
├─ sthprdriver ── sthpropctl
├─ sthhyht ───── sthhcoef ─── sthlogic ───── sthtpawht
                 │                          ├── sthdittus
                 │                          ├── sthprednb
                 │                          ├── sthchfcal
                 │                          ├── sthpstdnb
                 │                          └── sthconden
                 │
                 ├─ sthcond1
                 ├─ sthcond2
                 ├─ sthhcoeflag
                 └─ sthqwfqwg
```

FIG. 38C

REAL-TIME ANALYSIS OF POWER PLANT THERMOHYDRAULIC PHENOMENA

RELATED APPLICATIONS

This application is a continuation in part of U.S. application Ser. No. 07/846,753, filed Mar. 4, 1992 in the names of Guan-Hwa Wang and Zen-Yow Wang and entitled REAL TIME ANALYSIS OF POWER PLANT THERMOHYDRAULIC PHENOMENA, now abandoned, which is a continuation in part of U.S. application Ser. No. 07/761,000 filed Sep. 17, 1991 in the names of Guan-Hwa Wang and Zen-Yow Wang and entitled REAL TIME ANALYSIS OF POWER PLANT THERMOHYDRAULIC PHENOMENA, now abandoned. Application Ser. No. 846,753 is hereby incorporated herein by reference.

This application is accompanied by a microfiche appendix having 14 microfiche films.

A portion of the disclosure of this patent document contains material which is subject to copyright protection. The copyright owner has no objection to the facsimile reproduction by any one of the patent disclosure, as it appears in the Patent Office files or records, but otherwise reserves all copyright rights whatsoever.

FIELD OF THE INVENTION

This invention relates to simulating power plant thermohydraulic phenomena in real time, more specifically to modeling power plant two phase thermal hydraulic phenomena for real time operator training and best-estimate engineering analysis.

BACKGROUND OF THE INVENTION

In the field of power plant facilities, it is important to analyze the plant thermohydraulic properties or phenomena for maintaining the facility and training operators to perform routine and emergency monitoring and procedures. It is known to analyze power plant thermohydraulic phenomena using engineering codes such as the well known RELAP5/MOD3, and to conduct real time simulations for operator training of power plant two phase thermohydraulic phenomena with engineering code methodologies.

RELAP5/MOD3 is an engineering code that can provide analysis of steady state and transient thermohydraulic conditions. It applies field equations (also known as balance or conservation equations), state equations, closure correlation flow regime maps and a two-step semi or nearly implicit numerical scheme for solving the thermohydraulic properties, e.g., pressure and momentum (or velocity). One deficiency in applying RELAP5/MOD3 in the real time domain is that it uses variable time steps to assure system stability during severe transient calculation. However, this approach will not guarantee that it can run in real time under all operating conditions. Another deficiency with RELAP5/MOD3 is that it cannot be used to simulate a complete cycle of power plant performance from start up to shut down continuously. Consequently, the code is limited in its application to engineering analysis.

In view of the risks posed by power plant accidents, there is a continuing need for improved methods and devices for simulating in real time a wide variety of power plant thermohydraulic phenomena with high fidelity. A high fidelity simulator is one that can satisfies the simulator testing standard (e.g., ANSI/ANS 3.5 1991 in U.S.A.), which requires more rigorous validation and performance testing than the prior standard, and also enables operators and safety engineers to better understand the physical mechanisms of plant performance, thereby preparing them to face events and phenomena which were not previously encountered. It is desirable that such a high fidelity simulator bear the safety analysis code grade best-estimate capability in accordance with existing industry and regulatory organization requirements.

Existing simulators typically rely on either the two-fluid (6 equations) or the mixture models (3 or 4 equations) see, e.g., Fabic, "On Choices Between The Two-fluid And The Mixture Models For Simulation Of Severe Transients In Nuclear Power Plants," Key Note Speech on the Simulation Multiconference on Simulators International VIII, 1–5 Apr. 1991; Ishii, "Foundation of Various Two phase Flow Models and their Limitations," Argonne National Laboratory; Ishii, "Two-Fluid Model for Two phase Flow," Chapter 1, Multiphase Science and Technology, Volume 5, 1990; Wulff, "Computational Methods for Multiphase Flow," Chapter 3, Multiphase Science and Technology, Volume 5, 1990; and Agee, "Capabilities and Limitations of LWR System Analysis Codes," RELAP User Seminar, College Station, Tex., 1989. The mixture models use one set of mass, energy and momentum equations (i.e., 3 equations) to describe the behavior of mixture phase. Individual phasic phenomena are simulated by correlation models, such as drift flux model. The two-fluid model considers each phase separately in terms of two sets of mass, energy and momentum equations (i.e., 6). Closure correlations for interfacial relationships and wall-fluid interactions are required.

Other analysis techniques using 4 or 5 equations are also known. Such models can be viewed as advanced mixture models and their complexities lie between mixture and two-fluid models. The two-fluid model is regarded as mathematically more complete and rigorous than the mixture model. However, it requires much more physical understanding of the interfacial transfer laws as well as more sophisticated numerical methods to obtain optimal performance.

Thermal hydraulic models (especially for real time simulators) are also discussed in terms of nodal or loop momentum methods and nodal or system pressure methods. See, e.g., Fabic, "On Choices Between The Two-fluid And The Mixture Models For Simulation Of Severe Transients In Nuclear Power Plants," Key Note Speech on the Simulation Multiconference on Simulators International VIII, 1–5 Apr. 1991; Wulff, "Computational Methods for Multiphase Flow," Chapter 3, Multiphase Science and Technology, Volume 5, 1990; and Fabic, "Thermal Hydraulics in Nuclear Power Plant Simulators," Proceedings of the Third International Topical Meeting On Reactor Thermal Hydraulics, Newport, R.I., 1985. The Nodal Momentum Nodal Pressure (NMNP) method considers conservation of momentum, mass and energy for each node. Examples of this method includes known safety analysis engineering codes like RECAP, TRAC, RETRAN, ATHLET, and CATHARE and real time simulation codes like SIMARC, CETRAN and TRACS.

The Loop Momentum System Pressure (LMSP) method considers momentum balance for a closed loop (not for a node) and fluid properties are calculated based on a system pressure. Many problems encountered with this method are well known. Fluid properties based on a system pressure fails to simulate conditions where hydraulic pressure is an important factor in the total pressure calculation. Fluid cells not in a loop require decoupled treatments, thus it loses fidelity of prediction. It also fails to simulate conditions where a loop is broken by isolation valves. Interfacial heat balance and mass balance are numerically calculated in two successive time steps, and thus are not consistent. This causes numerical instabilities in fast transients calculation. Examples of this method include the engineering code RAMONA and real time code RETACT.

The advances in RISC-based workstation technology, and its equivalents, and developments in engineering code principles have stimulated the need for improved real time analysis methods suitable for both engineering analysis and simulation for operator training. It is known that efforts have been made to install the TRAC engineering analysis code on a CRAY super-computer for real time simulation. However, the expense of purchasing and maintaining such a super computer is expected to render such a combination impractical for commercialization. It also has been reported that use of the RELAP code in real time was under study.

It is therefore, an object of the present invention to provide an integrated methodology for real time analysis of power plant thermohydraulic phenomena. It is another object to provide real time analysis of power plant thermohydraulic phenomena that can be used for simulation training of facility operators and for engineering analysis of such phenomena, separately or simultaneously.

It is another object of the invention to provide a real time analysis of power plant thermohydraulic phenomena under normal and emergency operating conditions.

It is another object of the invention to simulate real time power plant thermohydraulic phenomena under normal, emergency, and beyond design conditions.

It is another object of the invention to provide an improved analysis of two phase flow in a power plant hydraulic system.

It is another object of the invention to provide an improved analysis of thermal transfer in a fluid flow system.

SUMMARY OF INVENTION

System of Equations

The present invention provides for methods and apparatus for analyzing power plant thermohydraulic phenomena in real time. Broadly, the invention concerns analyzing a two phase flow, thermal transfer, non-equilibrium system using six known field equations. The six field equations form a system of equations, which are adopted from RELAP5/MOD3 code, and include balance equations for non-condensible gas mass, mixture gas mass, liquid mass, mixture gas energy, liquid energy and mixture (sum) momentum. All the terms appearing in the RELAP5/MOD3 field equations are retained. A source (or sink) term is added to the six balance equations for interfacing with systems not simulated by the THEATRe™ code. THEATRe™ is a trademark of the applicant and references to THEATRe™ and THEATRe™code are to applicants' product for real time analysis of power plant thermohydraulic phenomena which embodies the present invention. These six equations are listed as follows:

non-condensible gas mass: (1)

$$\frac{\partial}{\partial t}(\alpha_g \rho_g X_n) + \frac{1}{A}\frac{\partial}{\partial x}(\alpha_g \rho_g v_g X_n A) = \delta S_n/A$$

vapor mass: (2)

$$\frac{\partial}{\partial t}(\alpha_g \rho_g) + \frac{1}{A}\frac{\partial}{\partial x}(\alpha_g \rho_g v_g A) = \Gamma + \delta S_g/A$$

liquid mass: (3)

$$\frac{\partial}{\partial t}(\alpha_f \rho_f) + \frac{1}{A}\frac{\partial}{\partial x}(\alpha_f \rho_f v_f A) = -\Gamma + \delta S_f/A$$

vapor energy: (4)

$$\frac{\partial}{\partial t}[\alpha_g \rho_g u_g] + \frac{1}{A}\frac{\partial}{\partial x}(\alpha_g \rho_g u_g v_g A) + P\frac{\partial \alpha_g}{\partial t} +$$

$$\frac{P}{A}\frac{\partial}{\partial x}(\alpha_g v_g A) = q_{wg} + q_{ig} + (\Gamma - \Gamma_w)h_s^* +$$

$$\Gamma_w h_s^s + DISS_g + \delta S_{gQ}/A$$

liquid energy: (5)

$$\frac{\partial}{\partial t}[\alpha_f \rho_f u_f] + \frac{1}{A}\frac{\partial}{\partial x}[\alpha_f \rho_f u_f v_f A] + P\frac{\partial \alpha_f}{\partial t} +$$

$$\frac{P}{A}\frac{\partial}{\partial x}[\alpha_f v_f A] = q_{wf} + q_{if} - (\Gamma - \Gamma_w)h_f^* -$$

$$\Gamma_w h_f^s + DISS_f + \delta S_{fQ}/A$$

mixture (sum) momentum: (6)

$$\alpha_g \rho_g \frac{\partial v_g}{\partial t} + \alpha_f \rho_f \frac{\partial v_f}{\partial t} + \frac{1}{2}\alpha_g \rho_g \frac{\partial v_g^2}{\partial x} + \frac{1}{2}\alpha_f \rho_f \frac{\partial v_f^2}{\partial x} =$$

$$-\frac{\partial P}{\partial x} + \rho B_x - \alpha_g \rho_g v_g FWG - \alpha_f \rho_f v_f FWF -$$

$$\Gamma_g(v_g - v_f) + \delta \Delta P_P + \delta S_v$$

In view of the listed six field equations (Equations 1-6), seven independent variables are required. These are: pressure (p), liquid and gas internal energies ($u_f$ and $u_g$), void fraction ($\alpha_g$), non-condensible quality ($X_n$), gas and liquid velocity ($v_g$ and $v_f$). A drift equation is used to balance the number of field equations and number of independent variables:

$$(1-\alpha_g C_o)v_g - \alpha_f C_o v_f = \langle\langle v_{gj}\rangle\rangle \quad (7)$$

The solution of the set of seven field equations requires closure relationships to compute interfacial heat/mass transfer ($h_{ig}$, $h_{if}$ and $\Gamma$), wall heat transfer ($q_{wg}$, $q_{wf}$ and $\Gamma_w$), wall energy dissipation ($DISS_f$, $DISS_g$), wall friction ($F_w$), distribution parameter ($C_o$) and drift velocity ($v_{gj}$). State equations are also required to calculate five dependent thermodynamic variables: liquid temperature ($T_f$), gas temperature ($T_g$), saturation temperature ($T^s$), liquid density ($\rho_f$) and gas density ($\rho_g$). The same RELAP5 linearized state equations are used and they are also listed for completeness:

$$\tilde{\rho}_f - \rho_f = \left(\frac{\partial \rho_f}{\partial p}\right)(\tilde{P} - P) + \left(\frac{\partial \rho_f}{\partial u_f}\right)(\tilde{u}_f - u_f) \quad (8)$$

$$\tilde{T}_f - T_f = \left(\frac{\partial T_f}{\partial p}\right)(\tilde{P} - P) + \left(\frac{\partial T_f}{\partial u_f}\right)(\tilde{u}_f - u_f) \quad (9)$$

$$\tilde{\rho}_g - \rho_g = \left(\frac{\partial \rho_g}{\partial p}\right)(\tilde{P} - P) + \left(\frac{\partial \rho_g}{\partial u_g}\right)(\tilde{u}_g - u_g) + \quad (10)$$

$$\left(\frac{\partial \rho_g}{\partial X_n}\right)(\tilde{X}_n - X_n)$$

$$\tilde{T}_g - T_g = \left(\frac{\partial T_g}{\partial p}\right)(\tilde{P} - P) + \left(\frac{\partial T_g}{\partial u_g}\right)(\tilde{u}_g - u_g) + \quad (11)$$

-continued $$\tilde{T}^s - T^s = \left(\frac{\partial T^s}{\partial p}\right)(\tilde{P} - P) + \left(\frac{\partial T^s}{\partial u^s}\right)(\tilde{u}_g - u_g) + \left(\frac{\partial T_g}{\partial X_n}\right)(\tilde{X}_n - X_n) \quad (12)$$

$$\left(\frac{\partial T^s}{\partial X_n}\right)(\tilde{X}_n - X_n)$$

Solution Method

The two phase flow problem defined above requires the determination of 12 variables per fluid node. The 12 variables are P, $v_g$, $v_f$, $\alpha_g$, $X_n$, $u_g$, $u_f$, $T_g$, $T_f$, $T^s$, $\rho_g$, and $\rho_f$. Correspondingly there exists 12 equations for each fluid node (Equations 1–12). The RELAP5/MOD3 semi-implicit method is adapted, with some modification, to solve the equation set and hence, the problem. This method is an extension of the well-known ICE method, i.e., staggered mesh with donor cell concept. The semi-implicit method has been extensively discussed in the[3,8] literature and here the adapted method in the present invention is discussed. The RELAP5 solution scheme includes semi- and nearly-implicit schemes. Both RELAP5 and the present invention use similar two-step calculations, with major differences that convective terms are treated explicitly (with respect to time) in the semi-implicit scheme and they are treated implicitly in the nearly-implicit scheme. The two-step scheme can be called the predictor-corrector scheme since major computation load is completed in the first step leading to a prediction of the solution and subsequently the second step makes corrections with minor computations.

The first step solves simultaneously a solution set of 13 linear equations per fluid node. The 13 equations includes 11 linearized field and state equations (Equations 1–6 and 8–12), a drift equation (Equation 7) and an interfacial mass balance equation (Equation 13) for 13 variables (the above listed 12 variables plus interfacial mass transfer rate $\Gamma$).

$$\Gamma = \Gamma_w - \frac{h_{if}(T^s - T_f) + h_{ig}(T^s - T_g)}{h_g^* - h_f^*} \quad (13)$$

The first step solutions are called "intermediate" because the non-conservative form of the field equations are used in the calculations and the state equations are not the true state relationships. The principal objectives of the second step calculations are to enhance mass and energy conservation and the consistency of fluid properties. That is, mass and energy errors resulting from linearization process are minimized in this step. Complete elimination of errors requires a full-fledged solution to the non-linear equation set-up, which overloads computational capability. RELAP5 assumes that the first step intermediate solution is a very good approximation to the true solution, therefore intermediate solutions need only minor corrections by the nonlinear equations to enhance consistency and thus stability. Furthermore, corrections are not made to all the 13 intermediate values. Two velocities ($v_g$ and $v_f$), the fluid total pressure (p) and the interfacial mass transfer rate ($\Gamma$) remain unchanged. The latter two variables represent two "integral" parameters in a two phase system since both phases share the same values. It makes sense to treat these two integral parameters as anchor points and adjust other parameters to obtain a complete set of consistent solutions.

The implicit treatments (semi or nearly) result in linking all fluid nodes in a fluid system. This requires a solution scheme to solve an enormous linear equation system in the first step. For a system of n mass cells and m momentum cells, the matrix size is 11*n+2*m by 11*n+2*m. Fortunately the semi-implicit method allows a significant reduction of the matrix size. The resulting matrix consists of n equations for a system of n fluid nodes. Each equation is reduced from the 13 linear equations and is in terms of the pressure and pressures at adjacent nodes. A direct matrix solver can be used to solve this pressure equation matrix. Subsequently other values are calculated by simple substitutions. The present invention adopts a very efficient matrix solver, preferably a sparse matrix solver specifically suited for real time application. A solver is unique to a system configuration and it is generated by an automatic solver generation package. The package uses a direct factorization method and a special algorithm (described below) to create two factorized matrices. The generated solver is written such that factorization, forward and backward substitutions can be performed sequentially (i.e., no do-loops and no if-checks for 0, 1 and −1) and that mathematic operations involving zero, 1 and −1 are eliminated.

Several issues of the RELAP5 solution method were reported which question the adequacy of RELAP method. Justification of the method to some major reported issues are presented here in view of real time application. The most serious issue raised is that the solving of nonlinear equations without iterations is not justified either theoretically or numerically (i.e., estimation of solution convergence and truncation errors relative to the original nonlinear equation solution). Another major issue is that numerical damping and dispersion of short-wave propagation are significant (not quantified) unless the nodalization is sufficiently fine. The justification lies in the fact that the adequacy of a numerical model should be judged on the basis of comparison with analytical solution and physical data for problems of interest. The no-iteration approach presents as an assumption used in the entire two phase flow system modeling. Uncertainties embedded in constitutive correlations and nodalization will contribute significantly more errors to the solution than the no-iteration assumption. Also the differential models developed to date do not accurately reflect the short wave-length phenomena, therefore the improvement in the assumption is not an indication of improved solution accuracy. Furthermore, short-wave length phenomena are not of interest to the real time simulation for operator training.

Closure Correlations

The complexities involved in RELAP5/MOD3 correlations are overwhelming. The flow regimes include four maps and a total of 29 regimes. Two are general purpose maps, characterized by geometric orientation, i.e., horizontal or vertical and two are special purpose maps for high flow mixing phenomena and for rapid condensation phenomena. The interfacial heat transfer coefficients $h_{ig}$ and $h_{if}$ consist of a substantial number of correlations (approximately 100). A separate correlation represents changes of a coefficient value for a thermodynamic state for a flow regime. The wall friction correlations include calculations of total two phase flow loss and the loss for individual phases. The wall heat transfer calculations cover three typical regimes: pre-CHF, CHF and post-CHF. Also considered are condensation, effect of non-condensible gases and the partition of total heat transfer into convection and phase change. In addition, numerical treatments for transition regions and smoothing calculations add substantial complexities.

The present invention improves upon the RELAP5/MOD3 correlations by first producing a replica version of RELAP5/MOD3 correlations in a modularized FORTRAN format, and second improving the replica for real time application. Evidently, the task required extensive review of the RELAP documentation and the FORTRAN codings. The review identified physics-based equations from numerical treatments and uncovered discrepancies between FORTRAN and documentation. The review led to two different approaches to develop a version of correlations for the present invention. The first approach was to write the FORTRAN program primarily based on the available RELAP documentation. This approach was applied to flow regimes, interfacial heat transfer and wall friction, since this portion of RELAP5 documentation is relatively detailed. However, the documentation for wall heat transfer are not detailed enough. Fortunately, this portion of FORTRAN subroutines is much more compact and easier to comprehend. Hence the second approach was to extract wall heat transfer subroutines from RELAP5/MOD3 FORTRAN program. The extracted subroutines were then modified mechanically in a modularized format. The programming efforts were focused on computational efficiency while maintaining the original mathematical models. The converted correlations were extensively verified against the RELAP5/MOD3 code calculations. When deviations were observed, further investigation of documentation and FORTRAN coding was required to make necessary changes.

Drift flux approach for simulating phase separation phenomena is one major area in which the present invention deviates from RELAP. The approach of the invention is to implement the well-known drift-flux correlations developed by Ishii, Kataoka and Ishii to compute $C_o$ and $v_{gj}$. Presently the simulated range of the model includes six flow regimes in a vertical pipe: bubbly, slug (small diameter), churn (large diameter), annular-mist, liquid dispersed regimes and low flow stratification. Correlations for CCFL and horizontal pipes also may be similarly developed. The flow regimes used for the selection of drift flux correlations are the RELAP5/MOD3 regimes.

Water Property

Water property calculation is another major area in which the present invention and RELAP deviates. The primary motivation for using a different approach is to improve computation efficiency and also to calculate property on the basis of a full range steam table, i.e., both normal and metastable regions. RELAP calculates water properties and property derivatives by a combination of table search and analytical (polynomial) equation. The metastable state properties are computed by means of an extrapolation from the corresponding saturation states. The calculations are quite inefficient for real time environment and the metastable state calculation is expected to have a larger error for a longer range of extrapolation.

The approach of the invention adopts an efficient direct table search method for all properties and property derivatives. A table is constructed by a number of selected grid points and corresponding grid point values. Values between grid points are obtained by linear interpolation between adjacent grid point values. Linear interpolation requires the least amount of computation operations, however, it demands a substantial amount of defined grid points to achieve acceptable error criteria. Due to the strongly non-linear nature of water properties (especially at low pressures and in metastable range), the grid points distribution can be optimized to achieve the highest calculational resolution with the smallest number of required grid points.

The process is preferably performed by an automatic optimization scheme and resulted in, for the two dimensional table for steam, 91 pressure points from 0.01 to 3 bar and 93 pressure points from 3 to 200 bar. 88 internal energy (u) points from 1850 to 3300 kJ/kg. In the table for water, 58 pressure points are used from 0.01 to 200 bar and 95 internal energy points from 30 to 1850 kJ/kg. Totally 21614 points in the whole range were selected. A one dimensional saturation table also is constructed using the same procedure.

BRIEF DESCRIPTION OF THE DRAWINGS

Further features of the invention, its nature and various advantages will be apparent from the accompanying drawings and the following detailed description of the invention in which:

FIGS. 38A–38C are a diagram of the code structure for a software program implementation of the present embodiment.

DETAILED DESCRIPTION OF THE INVENTION

Figure 1:
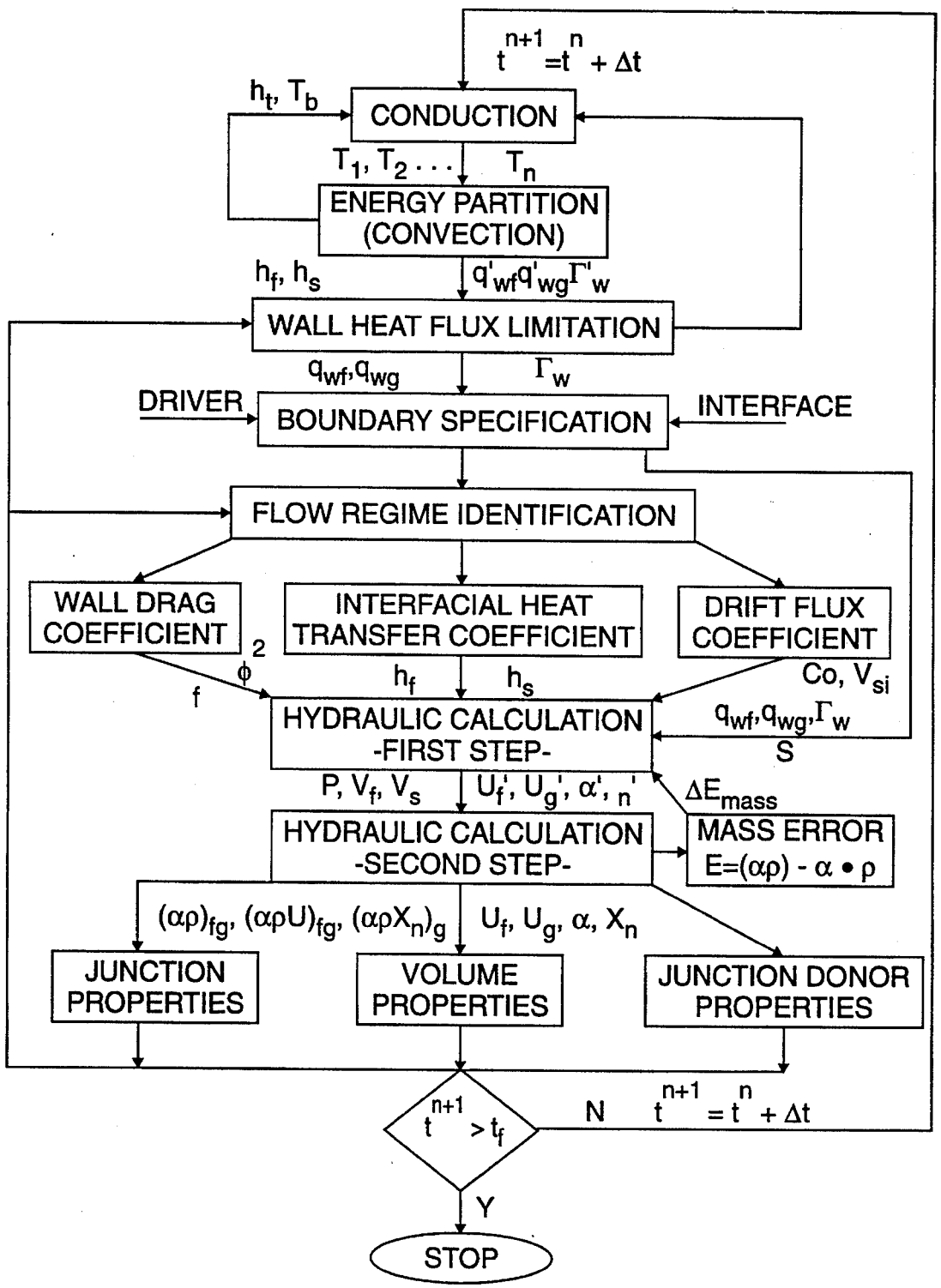
FIG. 1 is a flow chart illustrating the solution method of the solution set of equations in accordance with a preferred embodiment of the present invention.

The present invention is a generalized method of thermal hydraulic analysis developed for real time operator training as well as for best-estimate engineering analysis in both nuclear and non-nuclear power plants, based on either monitored or simulated power plant thermohydraulic parameter inputs. The present invention provides a generic transient analysis code which can be used for simulation of thermal non-equilibrium, non-homogeneous two phase flow systems involving steam-water mixture, non-condensible species, and non-volatile solute. Applications of the invention to a power plant system in the real time simulation environment include the simulation of thermohydraulic phenomena in the full range of reactor normal operation, abnormal operation and malfunctions.

The physical principles and numerical methodology of the present invention are, as noted, adopted from the RELAP5/MOD2 or MOD3 (hereafter collectively referred as "RELAP") state-of-the-art engineering code. In order to meet the real time simulation constraints, elements of the RELAP methodology are selectively merged with the real time simulation methodology. The selected elements of the RELAP methodology are the field equations (excluding the difference momentum equation), the interfacial mass balance equation, the state equations, flow regime maps, constitutive correlations, and the solution method. On the other hand, the adopted real time methodology encompasses a drift flux equation, drift flux correlations, a generic matrix solver, an optimal scheme for searching the thermodynamics state properties of steam/water, a VAD (Void Axial Distribution) scheme to resolve large gradients of void and heat flux distribution in core channels, and some treatments for improving numerical stability.

Preferably, the present invention is embodied in a software code for running on a suitable computer, e.g., applicant's THEATRe™ code which is set forth in the software appendix and described below. The present invention thus provides for creating a best-estimate simulation and analysis code for the real time environment that requires a rigorous assessment of the models used in the code. The assessment strategy is described below.

Advantageously, the present invention can be integrated consistently with other engineering analysis and simulation codes covering other aspects of power plant operations, such as core neutronics, multi-compartment containment models, balance of plant models and other simulations. Such products, and a product for integrating the codes into a comprehensive plant simulation and analysis code are also available from General Physics International Engineering & Simulation, Inc.

In the following discussion, the present invention is described in detail by topics, as indicated in the given headings identified by capital letters, and subtopics as indicated in the given headings identified by numerals and/or small letters. Section A provides an overall picture of the THEATRe™ code: a description of the modeling, major features, and assessment strategy. Section B presents system of equations and solution methods. Section C describes two flow regime maps, vertical flow regime map and horizontal flow regime map, used in both volumes and junctions.

Section D describes the correlations of interfacial heat and mass transfer between the gas phase and liquid phase, and discusses the modification to the correlation due to noncondensible gas effect. Section E presents the drift flux correlations. Section F gives a brief description of the wall friction correlations. Section G presents the correlations of wall heat transfer in various heat transfer modes and describes the heat transfer logic path and discusses the effect of noncondensible gas on the heat transfer. The heat structure, such as heat transmission in fuel rod, canister wall, core shroud, and heat loss through vessel wall to containment, is given in section H. Section I describes a scheme for searching the thermodynamic properties in steam table. Miscellaneous models such as critical flow model, VAD (Void Axial Distribution) model, recirculation pump model, boron tracking model, metal-water reaction model, and the radioactivity product release and tracking model are respectively described in section J. The following discussion also references publications which are provided as endnotes to the specification.

A. Overview of THEATRe™ Code

1. Modeling Strategy

The THEATRe™ code methodology represents an advanced best-estimate thermohydraulic engineering simulation code in a real time environment. The fundamental physical principles consist of a model with five basic two phase field equations plus a drift flux relationship, a complete set of RELAP flow regime maps and constitutive correlations for interfacial heat transfer, drift flux parameters, wall drag and wall heat transfer. These physical equations are solved by using a nodal momentum and nodal pressure type of RELAP two-step semi-implicit numerical scheme. The THEATRe™ code, in fact, illustrates the first successful integration of the best-estimate engineering simulation methodology with the state-of-the-art real time simulation methodology. The elements for the adopted RELAP methodology are listed as follows:

1. Five basic field equations:
gas mass continuity equation
liquid mass continuity equation
gas energy continuity equation
liquid energy continuity equation
mixture momentum equation
2. Noncondensible continuity equation
3. Five state equations:
gas density
liquid density
gas temperature
liquid temperature
saturation temperature
4. Interfacial mass balance equation
5. Constitutive correlations:
flow regime maps
interfacial heat transfer
wall drag
wall heat transfer
6. Solution method:
two-step semi-implicit scheme
7. Component models
Noncondensible gas model
critical flow model
centrifugal pump model On the other hand, the elements of the real time simulation methodology employed also represent state-of-the-art technology and are justifiable on the engineering analysis basis. These include the following:
1. Interfacial slip equation:
a drift flux equation
2. Drift flux correlations:
consistent with RELAP flow regime maps
3. Water property computation method:
full range two-dimensional table search steam tables
4. Solution method:
efficient matrix solvers
5. Heat structure model
6. Miscellaneous models:
void axial distribution model in the boiling water reactor (BWR) core
boron tracking model
water-metal reaction model
radioactivity model The choice of these combined models was made not only on the basis of a thorough historical and technological review, but was also based on the past real time simulation experiences and current research and development results. Historically, the most commonly used thermohydraulic models can be categorized into two types, namely two-fluid model (using 6 equations) and mixture model (3 equations).[1,2,3] The mixture model uses a single set of mass, energy and momentum equations to describe the behavior of mixture phase. Individual phases are simulated by correlation models, such as drift flux model. The two-fluid model considers each phase separately (i.e., gas and liquid) in terms of two set of mass, energy and momentum equations. Closure correlations are required to provide interfacial relationships. Models using 4 or 5 equations are also quite common. They can be viewed as advanced mixture models and their complexity lies in between the mixture and two-fluid models. The two-fluid model is considered more complete and rigorous than the mixture model, however, it presents considerable difficulties because of mathematical complications and of uncertainties in specifying interfacial interaction terms between two phases. Numerical instabilities caused by improper choice of interfacial-interaction terms in the phasic momentum equations are common. Thermohydraulic models (especially for simulators) are also discussed in terms of nodal or loop momentum methods and nodal or system pressure methods.[3,4] The Nodal Momentum Nodal Pressure (NMNP) method considers conservation of momentum, mass and energy for each fluid node. Examples are numerous: RELAP, TRAC, RETRAN, ATHLET, CATHARE, etc. On the other hand, the Loop Momentum and System Pressure (LMSP) method considers momentum balance for a closed loop (not for a node) and fluid properties are calculated based on a system pressure, for example, RAMONA. Theoretically, the NMNP method is evidently much more rigorous than the LMSP method.

The inventors' considerable efforts lead them to the following realizations. The drift flux model[5,6] is probably the most reliable and accurate analytical tool for standard two phase flow problems. The two energy equation approach is much more mechanistic and numerically stable than the one equation model. The switching algorithm required for the one energy model involves many more difficulties than the degeneracy problem for the two energy equation model. Furthermore, the one energy equation model requires substantial non physical treatment to calculate interfacial heat and mass transfers. The selection of NMNP or LMSP methods involve a larger degree of uncertainty, since it depends not only on the completeness of the theoretical model, it also depends on the real time numerical experiments. Accordingly, this work led to the adoption of RELAP type of NMNP method. Consequently, the RELAP code methodology was chosen as the foundation. The inventors also realized that advances in the RISC-based computation technology would now provide sufficient computation power for the use of best-estimate engineering methodology in the real time environment.

Thus, the approach adapted a computational methodology to full scope simulators. Integrated with the applicant's real time three-dimensional neutronics code product (CONcERT™)[7], the resulting platform not only greatly enhances operator training but it also enables engineering analysis of a wide range of power plant scenarios on full scope simulators.

2. Major Features

The optimum combination of the RELAP methodology and state-of-the-art real time simulation technology according to the present invention provides the capability to simulate the full range of thermohydraulic phenomena in a power plant system on the basis of physical mechanisms. The scope of simulation capability encompasses all operational conditions. They are classified into three categories:

1. reactor normal operation,
2. abnormal operation,
3. malfunctions.

Major features of the invention are outlined in the following sections. These features are listed for each adopted model or physical principle.

a. System of Equations

The system of equations includes five basic field equations, noncondensible gas equation, five state equation and two interfacial equations (see section B). This equation system provides a sound and solid physical basis for simulating generalized thermal hydraulic phenomena. It is noted that these equations are applied to each individual fluid node or junction. Thus, all the following listed capability features are applicable to each individual fluid node or junction. Specific features are listed as follows:

1. Simulation of fluid consisting of any combination of two components (water and noncondensible gas) and two phases (liquid and steam). The fluid conditions include complete thermal nonequilibrium between the two phases and nonhomogeneous two phase fluid movement.

2. Transient responses of fluid mass inventory, energy inventory and momentum inertia due to transport of fluid, interaction between liquid and gas, interaction between wall and fluid or changes of boundary conditions.

3. Transport and tracking of consistent fluid mass, energy and momentum in the simulated system from one fluid node to another. The transported mass and energy include liquid and gas phases. The transported momentum considers the mixture phase. The tracking of void inventory (thus liquid level) is a part of this feature.

4. Compression or expansion of fluid due to fluid movement, phase change, and temperature changes for each individual fluid phase.

5. Pressure force and gravitational force for the mixture phase fluid.

6. Change of mixture phase momentum resulting from phase changes.

7. Phase change (flashing and condensation) between gas and liquid due to temperature differences in the two phases for any given fluid conditions and flow patterns. It provides the flexibility to implement user desired correlations.

8. Nonhomogeneous two phase fluid movement between gas and liquid for any given fluid conditions and flow pattern. This includes concurrent and counter-current flow conditions. It provides the flexibility to implement user desired correlations.

9. Wall frictions for the gas and liquid phases are considered separately for any given fluid conditions and flow patterns. It provides the flexibility to implement for user desired correlations.

10. Heat transfer between fluid and solid boundary (for example, fuel rods, pipe wall, core shroud, canister wall, vessel wall), including phase change (boiling and condensation) for any given fluid conditions and flow patterns. It provides the flexibility to implement user desired heat transfer correlations.

11. Flexibilities of working fluid boundary condition include the following:

a. Mass injection or depletion, for example, feed and bleed, core spray, safety system liquid injection, charging and letdown, relief flow through safety relief valves, noncondensible air injection, etc.

b. Heat transfer into/out working fluid, for example, the addition of heat in the core or the removal of heat from the vessel wall.

c. Driving force, for example, centrifugal pump head.

b. Flow Regimes

Flow regimes consist of the following features:

1. Best-estimate various possible two phase flow patterns, for example, bubbly, slug, churn, annular-mist, droplet, inverted-annular, inverted-slug, low flow stratification. The vertical pipe and horizontal pipe are separately considered.

2. Flow regime maps allow the use of the most advanced correlations for each applicable flow pattern to accurately describe thermal nonequilibrium and nonhomogeneous phenomena.

c. Interfacial Heat Transfer Correlations

Interfacial heat transfer correlations consist of the following features:

1. Best-estimate flashing and condensation due to superheated liquid or subcooled liquid for each flow pattern in transient or steady state condition.

2. Best-estimate flashing and condensation due to superheated steam or subcooled steam for each flow pattern in transient or subcooled conditions.

3. Impact of the presence of noncondensible gas on the heat transfer efficiency.

d. Drift Flux Correlations

Drift flux correlations consist of the following features:

1. Best-estimate nonhomogeneous two phase flow in each flow pattern of the vertical pipe.

2. Concurrent and counter-current flow conditions, including counter-current flow limitation.

3. Water level calculation in low flow stratification conditions.

e. Wall Friction Correlations

Wall friction correlations consist of the following features:

1. Best-estimate wall friction calculations for single phase liquid, single phase gas, and two phase fluid in all possible flow patterns.

2. Wall frictions for liquid phase and gas phase in the two phase mixture.

f. Wall Heat Transfer Correlations

Wall heat transfer correlations consist of the following features:

1. Best-estimate wall convection and boiling correlations for single phase liquid and gas and for two phase mixture flow.

2. A full range of convection and boiling conditions, such as:

a. Convection to air-water mixture
b. Single-phase liquid convection at critical and super-critical pressure
c. Single-phase liquid convection at subcritical pressure
d. Subcooled nuclear boiling
e. Saturated nuclear boiling
f. Subcooled transition film boiling
g. Saturated transition film boiling
h. Subcooled film boiling
i. Saturated film boiling
j. Single-phase vapor convection
k. Condensation when void equals one
l. Condensation when void is less than one.

3. Impact of noncondensible gas on the heat transfer efficiency.

4. Wall heat transfer is accounted for at any fluid node with the attachment of heat structures, for example, core fuel rods, core shroud, canister wall and vessel wall.

5. Effects on wall heat transfer due to liquid level at low flow stratified conditions.

g. Heat Structure Model
The heat structure model features are:
1. Two types of heat structures are considered for:
a. structure with one convective boundary, for example, core fuel rods.
b. structure with two convective boundaries, for example, core shroud, canister wall, vessel wall with insulator on exterior surface.

2. Fuel temperatures are calculated at the surface and at the centerline. Fuel cladding temperatures are calculated at the cladding inner and outer surfaces.

3. Gap conductance and specific heat are considered as a function of gap average temperature.

4. Thermal inertia and heat capacity in heat structures, for example, fuel rods, vessel wall, are rigorously included in the calculation.

5. Heat loss, from fluid through vessel wall to containment air are calculated.

h. Water Property
Water property consists of the following features:
1. Accurate and efficient calculation of all thermodynamic properties, including:
a. the steam and liquid properties, i.e, pressure, internal energy, temperature, density, enthalpy, viscosity, compressibility, conductivity, specific heat.
b. property derivatives, i.e., derivatives of temperature with respect to pressure and internal energy, derivatives of density with respect to pressure and internal energy.

2. The range of properties includes:
a. normal states, i.e., saturation, superheated gas and subcooled liquid.
b. metastable states, i.e., superheated liquid and subcooled gas.

3. Property calculations are based on local fluid node pressure and internal energy.

i. Critical Flow Model
The critical flow model features are:
1. Best-estimate correlations for a full range of choked flow conditions: subcooled choking, two phase choking, and transition choking.

2. Accurate response to leaks and any size breaks can be simulated anywhere in the lines and piping modeled.

3. Vent flow or relief flow through the vent or safety relief valves.

j. Circulation Pump Model
The circulation pump model features are:
1. Circulation pump operation effects: trip, seizure, coastdown, rotational inertia, pump speed changes.
2. Abnormal circulation pump effects: cavitation, two phase flow, flow reversal, rotor seizure.
3. Heat generated from the operation of circulation pumps.

k. Void Axial Distribution Model
The void axial distribution model features are:
1. Detailed void distribution (for example, 12 points) calculation in the BWR core axial channel on the basis of 3 fluid nodes nodalization.
2. Accurate interfaces between core thermal hydraulics and neutronics in steady state and transient conditions.

l. Boron Tracking Model
The boron tracking model considers the tracking of boron in the fluid nodes according to fluid flow conditions.

m. Metal-Water Reaction Model
The metal-water reaction model features are:
1. Release and tracking of hydrogen from Zircaloy-water reaction.
2. Generation and release of heat resulting from Zircaloy-water reaction.

n. Radioactivity Model
The radioactivity model calculate the generation, release and tracking of fission product radioactivity (gas) in the coolant and release path.

3. Assessment Strategy
Due to the intrinsic complexities and uncertainties of two phase thermal hydraulics, the adequacy of any simulation code created in accordance with the present invention lies largely on the basis of code assessment results. Rigorous code assessment procedures should be imposed to guide the code development as well as in the final stage to prove the code adequacy. It will be appreciated by those of ordinary skill in the art that a conventional rigorous and comprehensive assessment approach can be categorized into three phases:

1. Confirmation of the code with idealized problems. These problems may have analytical or conceptualized solutions.
2. Verification of the code against separate effect test data.
3. Validation of the code against integral system test data or actual plant data.

Counterpart RELAP calculation results may be used as referenced benchmark data, whenever actual power plant data or test facility data are not available. It also will be understood that such code assessment is an ongoing effort that almost always results in improved code.

B. System of Equations and Solution Method

The system of equations of the present invention includes the six field equations (Equations 1–6),[8] the drift equation (Equation 7)[6] to balance the number of field equations and number of independent variables in the field equations (the "field variables"), and the linearized state equations (Equations 8–12).

As noted above, the two phase flow problem defined above requires the determination of the stated 12 variables per fluid node using the 12 equations for each fluid node (Equations 1–12). The two-step method is a predictor-corrector scheme since major computation load is completed in the first step leading to a prediction of the solution and, subsequently, the second step makes only minor corrections. The first step simultaneously solves 13 linearized equations per fluid node. The 13 equations include 11 linearized field and state equations (Equations 1–6 and 8–12), a drift equation (Equation 7), and an interfacial mass balance equation (Equation 13) for 13 variables (the above listed twelve variables plus interfacial mass transfer rate Γ).

A very efficient sparse matrix solver is preferably implemented for solving the equation set in the real time application. It is unique to a given system configuration and is automatically generated. The matrix solver uses a direct factorization method and a special algorithm to create two factorized matrices. The solver is written in such a way that factorization, and forward and backward substitutions are performed sequentially (that is, no do-loops and no if-checks for 0, 1 and −1). The solver is also written such that mathematical operations involving 0, 1 and −1 are eliminated.

More specifically, the matrix solver solves the system of equations, for example $$[A]X=B$$

in the following manner. The traditional LU method is used to decompose the [A] matrix into two factorized matrices [L] and [U]. So the system of equation can be rearranged in the form of $$[L][U]X=B$$

After this arrangement, the ([U]X) is solved first by back substitution of [L] and B matrices and X is solved again by the same procedures through [U] and the previously solved vector. In the back substitution process, many do-loops in the FORTRAN programming are needed in performing the calculation and there might be many redundant operations if many 0 and 1 are in the [L] and [U] matrices. In real time simulation, since the configuration is fixed, the relationship between each element in the [A] matrix is determined, so are each element in the [L] and [U] matrices, i.e., the 0 and 1 and −1 in [L] and [U] matrices can be identified before performing the calculation. The code is then generated by expanding the do-loop along with the algebraic operation to direct algebraic operations and eliminate those unnecessary operations, e.g., multiplications and additions of 0 and 1 and −1, to minimize the computation time. Also for a fixed nodalization, the operations involved in this solution procedure is fixed so the computational time is within a narrow interval of timing while other method of matrix solution, e.g., iterative method, cannot control the computation time if there is any convergence problem. The overall solution method is illustrated in the flow chart of solution method in FIG. 1.

The non-condensible gas is assumed to be present only in the gaseous phase. The properties for the gaseous phase are calculated assuming a Gibbs-Dalton mixture of steam and ideal non-condensible gas. A Gibbs-Dalton mixture is based upon the following assumptions:

1. $P=P_n+P_s$

2. $U_g=X_nU_n+(1-X_n)U_s$

3. $V_g=X_nV_n+(1-X_n)V_s$ where $P_s$ and $P_n$ are the partial pressures of the steam and the non-condensible components, respectively. The internal energies, $U_s$, $U_n$, and the specific volumes, $V_s$, $V_n$, are evaluated at the gas temperature and the respective partial pressure. The steam properties are obtained from the steam tables. The non-condensible state equations are:

4. $P_nV_n=R_nT_n$

5. $U_n=C_0T_g+½D_0(T_g-T_0)^2+U_0$ where $R_n$, $C_0$, $D_0$, and $U_0$ are constants. These five equations combined with two state equations for gas temperature and steam specific volume, are presented as a nonlinear problem of 7 equations. Given P, $U_g$, and $X_n$, these seven equations can be rearranged to implicitly solve $P_s$ and $U_s$. The derivatives of $U_s$ and $P_s$ with respect to P, $U_g$, and $X_n$ can also be obtained from these equations by the use of the chain rule and implicit differentiation.

C. Flow Regimes

The flow regime maps relevant to a BWR system include a vertical flow regime map and a horizontal flow regime map. Both maps are applied to fluid volumes and fluid junctions. The flow regime map determines a proper flow pattern at a fluid volume or a fluid junction for the current flow conditions. The selected flow pattern at a fluid volume then provides proper correlations for interfacial heat transfer coefficients and the selected flow pattern at a fluid junction provides proper correlations for drift flux parameters and wall drag coefficients. The vertical and horizontal maps are used according to inclination angle of the fluid volume or junction. The criteria are as follows:

$15°≦ψ≦90°$—Vertical flow $0°≦ψ≦15°$—Horizontal flow

1. Vertical Volume Flow Regime Map

Figure 2:
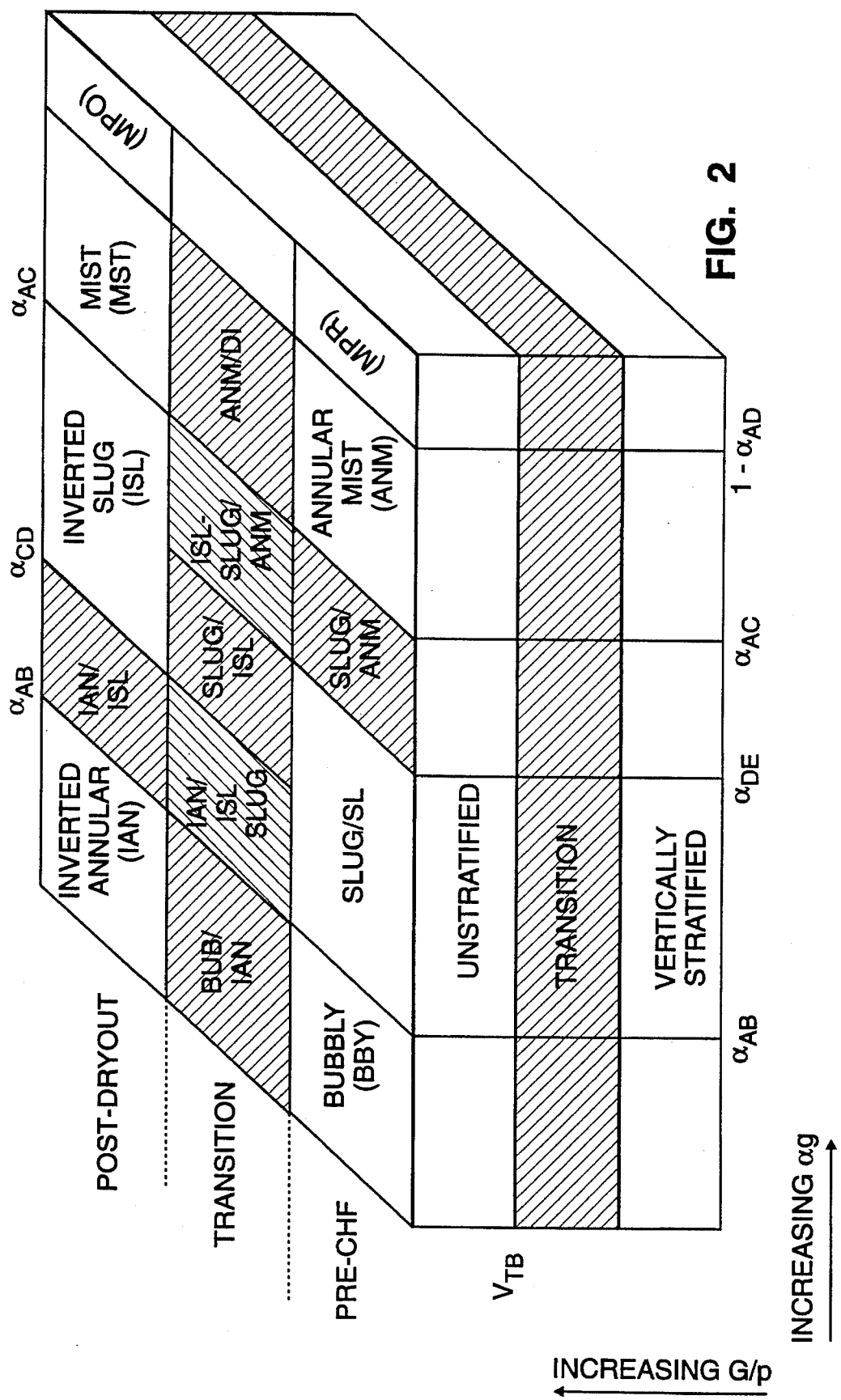
FIG. 2 is a schematic diagram of a vertical flow regime map.
Figure 3A:
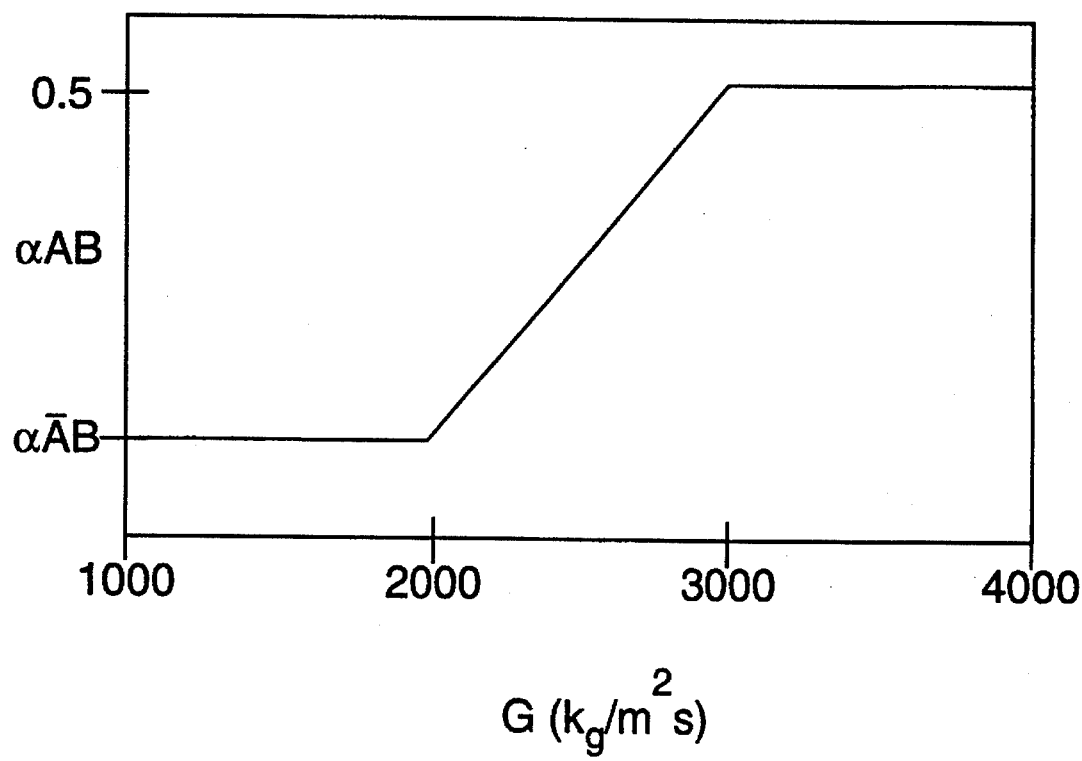
FIGS. 3A and 3B are illustrations of the vertical flow regime transition parameters of the flow regime map of FIG. 2.
Figure 3B:
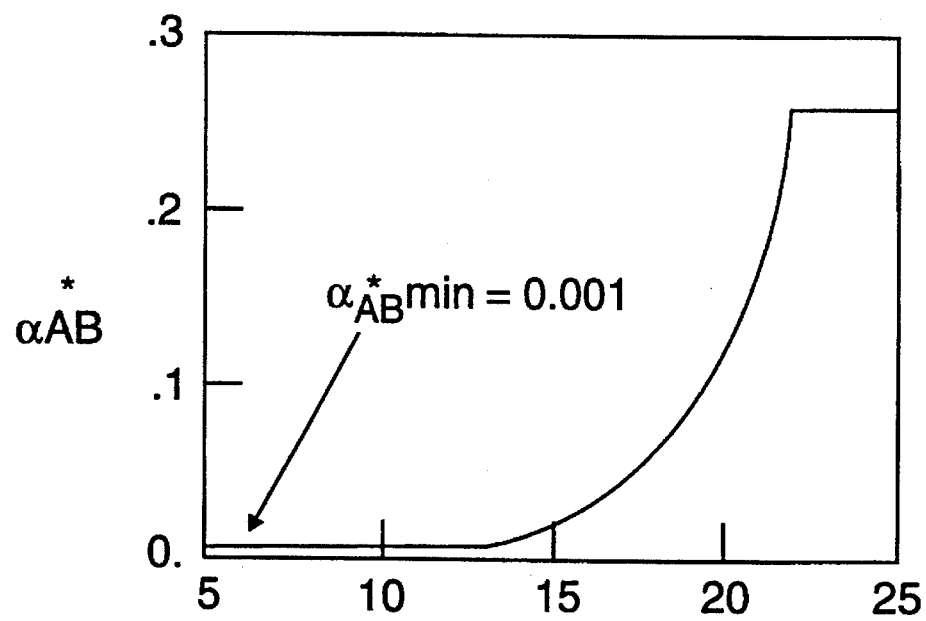

A schematic of the vertical flow regime map[9] is shown in FIG. 2. The map consists of a total of 29 flow patterns (including transition regions). These patterns are determined on the basis of three conditions: void fraction, fluid velocity, and the heat transfer conditions (either pre-CHF or post-CHF). The pre-CHF condition includes bubbly,[10,11] slug,[11,12,13] annular mist,[14] and dispersed (droplet or mist) flows. The post-CHF condition encompasses inverted annular, inverted slug and dispersed (droplet or mist) flows.[9] The vertically stratified pattern is implemented for sufficiently low mixture velocity G/ρ,[15] The flow pattern transition criteria are summarized in Table I and are illustrated in FIGS. 3A and 3B.

2. Horizontal Volume Flow Regime Map

Figure 4:
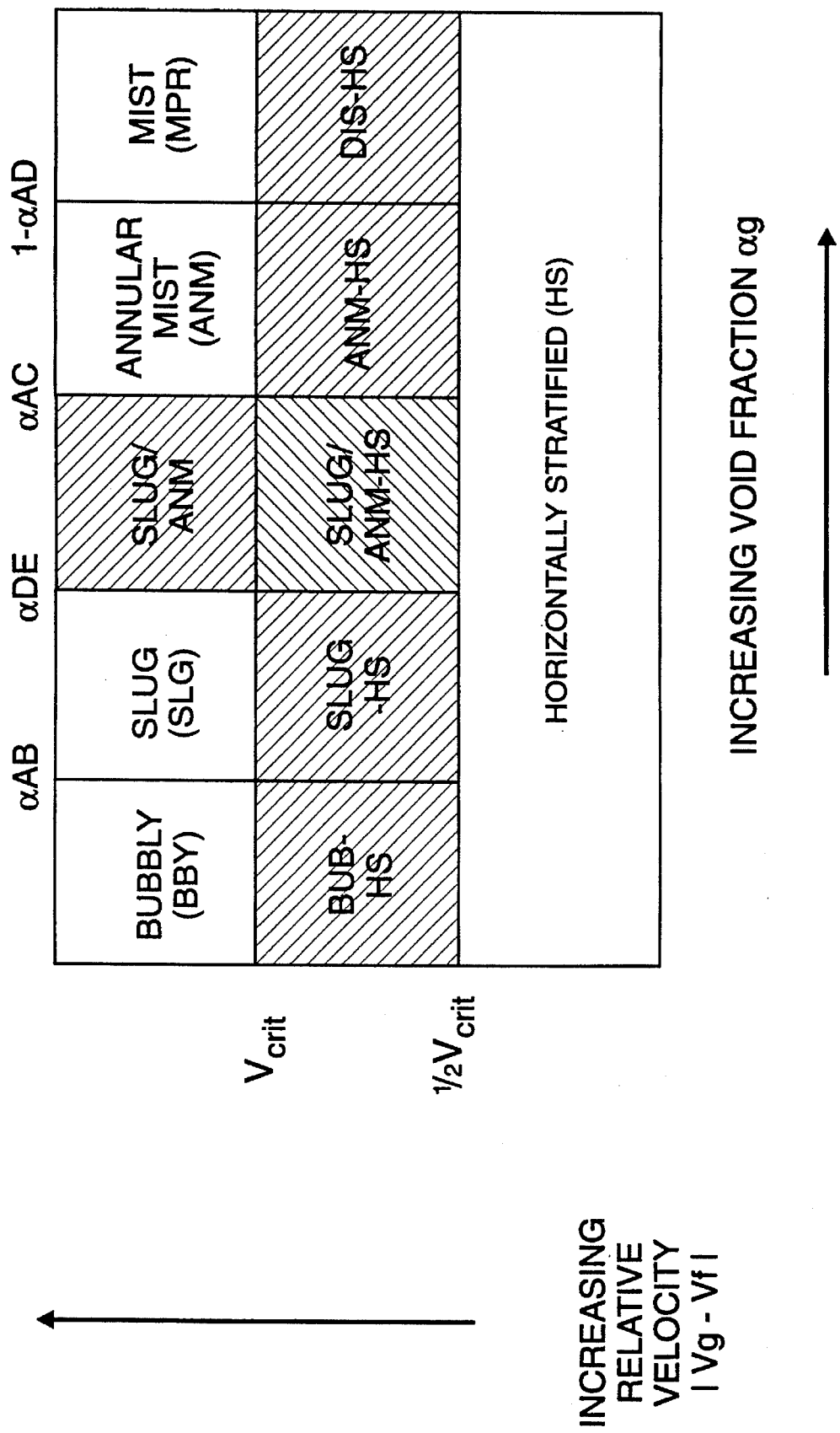
FIG. 4 is a schematic diagram of a horizontal flow regime map.
Figure 5:
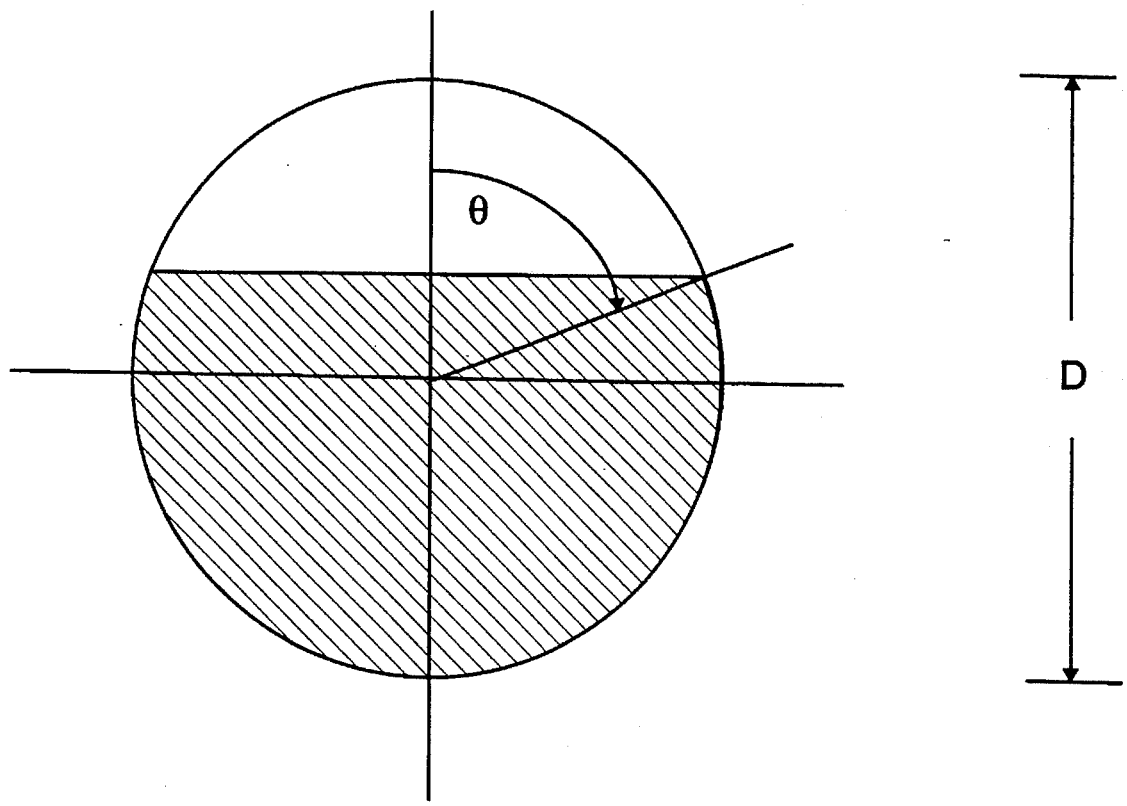
FIG. 5 is a schematic diagram of the horizontally stratified flow geometry of the flow regime map of FIG. 4, including the stratification angle theta.

A schematic of the horizontal flow regime map[16] is shown in FIG. 4. The map consists of a total of 11 flow patterns (including transition regions). These patterns are determined on the basis of void fraction and relative gas and liquid velocity. Non-stratified conditions include, bubble,[10,17,18] slug,[16,19] annular mist, and dispersed (droplets or mist). The horizontally stratified[16,20] pattern is used for low relative gas and liquid velocity. Transitions regions are indicated as hatchings in FIG. 4. Flow pattern transition criteria are given in Table II. The stratification angle is illustrated in FIG. 5.

TABLE I

Summary of Vertical Flow Regime Transition.

| Regime transitions | Equations | References |
|---|---|---|
| $\alpha_{AB}$ | $= \alpha_{AB}^*$ for $G <= 2000$ kg/m² − s<br>$= \alpha_{AB}^* + 0.001(0.5 - \alpha_{AB}^*)(G-2000)$<br>for $2000 < G < 3000$ kg/m² − s<br>$= 0.5$ for $G >= 3000$ kg/m² − s<br>where<br>$\alpha_{AB}^* = \max\{0.25 \min[1,(0.045 D^*)^8],10^{-3}\}$<br>$D^* = D[g(\rho_f - \rho_g)/\sigma]^{1/2}$ | Taitel, Bornea, and Dukler (TDB)[10,11,12] |
| $\alpha_{DE}$ | $= \alpha_{AC} - 0.05$<br>engineering judgement | Engineering judgement |
| $\alpha_{AC}$ | $= \max\{\alpha_{AM}^{min}, \min[\alpha_{Crit}^f, \alpha_{Crit}^*, \alpha_{BS}^{max}]\}$<br>$\alpha_{AM}^{min}:(=0.5)$ min. void fraction at which annular flow can sensibly exist.<br>$\alpha_{BS}^{max}:(=0.9)$ max. void fraction at which bubbly-slug flow can exist.<br>$\alpha_{Crit}^f = [gD(\rho_g - \rho_f)/\rho_g]^{1/2}/v_g$ upflow<br>$= 0.75$ downflow/countercurrent<br>$\alpha_{Crit}^* = 3.2[g\sigma(\rho_f - \rho_g)/\rho_g^2]^{1/4}/v_g$ | McQuillan and Whalley[14] |
| 1 − $\alpha_{AD}$ | $\alpha_{AD} = 10^{-5}$<br>numerical judgement<br>fluid velocity | Numerical judgement TDB[10] |
| Stratification | $v_m < v_{TB}$, i.e.<br>$(\alpha_g \rho_g |v_g| + \alpha_f \rho_f |v_f|)/$<br>$(\alpha_g \rho_g + \alpha_f \rho_f) <$<br>$0.35[gD(\rho_f - \rho_g)/\rho_f]^{1/2}$<br>void fraction<br>1. $\alpha_{gL} > 0.7$<br>2. $\alpha_{gL} - \alpha_{gK} > 0.2$ or<br>$\alpha_{gK} - \alpha_{gI} > 0.2$<br>3. $\alpha_{gI} = <\alpha_{fK} = <\alpha_{gL}$<br>4. $\alpha_{fK} - \alpha_{gI} > 0.2$ | |

TABLE II

Summary of Horizontal Regime Transition

| Regime Transitions | Equations | References |
|---|---|---|
| $\alpha_{AB}$ | $= 0.25$ $G <= 2000$ kg/m²s<br>$= 0.25 + (0.5 - 0.25)(G-2000)10^3$<br>$2000 < G < 3000$ kg/m²s<br>$= 0.5$ $G >= 3000$ kg/m²s<br>0.25 (lower limit)<br>: Bubble spacing a half of bubble radius<br>0.5 (high limit)<br>: Adjacent bubbles barely touch each other in a cubic lattice | Taitel, Bornea, and Dukler[10,17,18] |
| $\alpha_{DE}$ | 0.75 (transitional width) | No references |
| $\alpha_{AC}$ | $\alpha_{AC} = 0.8$ | No references |
| $\alpha_{AD}$ | $10^{-7}$ (numerical consideration) | Numerical judgement |
| Stratification | $v_g > v_{crit}$ or<br>$|v_g - v_f| > v_{crit}$<br>$v_{crit} = 0.5[(\rho_f - \rho_g)g\alpha_g A/(\rho_g D\sin\theta)]^{1/2}$<br>$(1 - \cos\theta)$ | Taitel and Dukler[16] |

3. Junction Flow Regime Map

The application of a flow regime map to fluid junctions requires the determination of junction average void fraction and mass flux. The junction average void fraction is determined by the volume average of the adjacent volume void fractions, that is:

$$\alpha_{gj} = \frac{\alpha_{gjik}V_{jik} + \alpha_{gjok}V_{jok}}{V_{jik} + V_{jok}} \quad (14)$$

where $_{jik}$ and $_{jok}$ are the index of inlet volume and outlet volume of a junction j respectively. The junction mass flux is determined by:

$$G_j = \alpha_{gj}\rho_{gj}v_{gj} + \alpha_{fj}\rho_{fj}v_{gj} \quad (15)$$

where:

$$\rho_{gj} = \frac{\rho_{gjik}V_{jik} + \rho_{gjok}V_{jok}}{V_{jik} + V_{jok}} \quad (16)$$

$$\rho_{fj} = \frac{\rho_{fjik}V_{jik} + \rho_{fjok}V_{jok}}{V_{jik} + V_{jok}} \quad (17)$$

D. Interfacial Heat and Mass Transfer

The interfacial heat and mass transfer relationship is described in Equation 13. The transfer rate $\Gamma$ is determined by the temperature gradient between each phase and the interface. The temperature of the interface is assigned the saturation value for the local pressure. Both superheated and subcooled conditions are allowed for each phase, therefore, the heat transfer direction may be either into or away from the interface for each phase. All of the thermal energy transferred to the interface from either side contributes to vaporization, that is, positive $\Gamma_g$. Conversely, all of the heat transfer away from the interface contributes to condensation, that is, negative $\Gamma_g$. In other words, superheated liquid and superheated gas contribute to vaporization, while subcooled liquid and subcooled gas contribute to condensation. The net rate of mass transfer is the summation of all contributions from each side of the interface.

The corresponding heat transfer correlations are required at each side of the interface and for two thermodynamic states (superheated and subcooled). Thus, for each flow pattern, one specific correlation is used for each of the four states, that is, superheated liquid[9,21,22] (SHL), subcooled liquid[11,22] (SCL), superheated gas[21,22] (SHG), and subcooled gas (SCG). These coefficients are expressed as the volumetric heat transfer coefficient (w/m³.K), that is, $$H_{ip} = h_{ip} \, a_{gf}$$

where:

$H_{ip}$ = volumetric interfacial heat transfer coefficient for phase p (w/m³.K)

$h_i$ = interfacial heat transfer coefficient for phase p (w/m².K)

$a_{gf}$ = interfacial area per unit volume (m²/m³)

The stabilizing and smoothing features for the transitions between flow regimes are also implemented. Furthermore, the treatment to incorporate noncondensible gases effects is included.

1. Correlations

Table III summarizes the interfacial area per unit volume ($a_{gf}$) and the interfacial heat transfer coefficient for phase p ($h_{ip}$) for the various flow patterns. The superscript M indicates that the correlation has been modified from the published value. The values indicated by the large numbers (such as $3 \times 10^6$, $10^4$) are used to drive the phasic temperature to the saturation temperature.

TABLE III

Summary of Interfacial Areas and Heat Transfer Coefficients.

| Flow Type | $a_{gf}$ | $h_{if}$, SCL | $h_{if}$, SHL | $h_{ig}$, SHG | $h_{ig}$, SCG |
|---|---|---|---|---|---|
| Bubbly | $3.6\, \alpha_{bub}/d_b$ | Unal[M 11] | Lee-Ryley[M 21] | $10^4\, f_{sg}$ | $10^4\, f_{sg}$ |
| Slug: | | | | | |
| Bubbles | $3.6\, \alpha_{gs}(1-\alpha_{TB})/d_b$ | Unal[M 11] | Lee-Ryley[M 21] | $10^4\, f_{sg}$ | $10^4\, f_{sg}$ |
| Taylor Bubble | $4.5\, \alpha_{TB}(2.0)/D$ | Seider-Tate[M] | $3 \times 10^6\, f_{sf}$ | Lee-Ryley[M 21] | $10^4\, f_{sg}$ |
| Annular mist: | | | | | |
| Drops | $3.6\, \alpha_{fd}(1-\alpha_{ff})/d_d$ | Brown[M] $f_{sf}$ | $K_f\, f_{sf}/d_d$ | Lee-Ryley[M 21] | $10^4\, f_{sg}$ |
| Liquid film | $4(1-\alpha_{ff})^{1/2}(2.5)/D$ | Theofanous[M] f(v) | $3 \times 10^6$ f(v) | Dittus-Boelter[22 M] f(v) | $10^4\, f_{sg}$ f(v) |
| Horizontal Stratified | $4\sin\theta/\pi d$ | Dittus-Boelter[22] | Dittus-Boelter[22] $f_{sf}$ | $10^4\, f_{sg}$ Dittus-Boelter[22] | $10^4\, f_{sg}$ |
| Vertically Stratified | $A_c/v$ | 14.7 $K_f$ | 14.7 $K_f$ | 81.4 $K_g$ | 8.14 $K_g$ |
| Inverted annular: | | | | | |
| Bubbles | $3.6\, \alpha_{bub}(1-\alpha_g)/d_b$ | Unal[M 11] | Lee-Ryley[M 21] | $10^4\, f_{sg}$ | $10^4\, f_{sg}$ |
| Vapor film | $4(1-\alpha_B)^{1/2}(2.5)/D$ | Dittus-Boelter[22 M] | $3 \times 10^6$ | $K_g\, f_{sg}/D$ | $K_g\, f_{sg}/D$ |
| Inverted Slug: | | | | | |
| Drops | $3.6\, \alpha_{drp}(1-\alpha_B)/d_d$ | Brown[M] $f_{sf}$ | $K_f\, f_{sf}/D$ | Lee-Ryley[M 21] | Lee-Ryley[M 21] |
| Taylor drop | $4.5(\alpha_B)(2.5)/D$ | Brown[M] $f_{sf}$ | $K_f\, f_{sf}/D$ | $K_g\, f_{sg}/D$ | $K_g\, f_{sg}/D$ |
| Mist (dispersed) | $3.6(\alpha_{drp})/d_d$ | Brown[M] $f_{sf}$ | $K_f\, f_{sf}/D$ | Lee-Ryley[M 21] $f_{sg}$ | $10^4\, f_{sg}$ |
| Remarks | $f_{sg}$ = function of $\Delta T_{sg} = T^s - T_g$  $f_{sf}$ = function of $\Delta T_{sf} = T^s - T_f$ | SCL: subcooled liquid  M: modified | SHL: superheated liquid | SHG: superheated gas | SCG: subcooled gas |

2. Modifications to Correlations-Noncondensible Gas

The presence of a noncondensible gas is represented by a fraction Q of the volume mixture gas void fraction. The effect of a noncondensible gas on the interfacial heat transfer is represented by a multiplier that modified the volumetric heat transfer coefficient, $H_{if}$ and $H_{ig}$. The multiplier is applied to $H_{if}$ and $H_{ig}$ for all flow patterns or transition regions depending on the thermodynamic state (SHL, SCL, SHG, SCG). The modifications may be described as follows:

$H_{if} = H_{if}^{REG}$ F(Q, flow pattern), $H_{ig} = H_{ig}^{REG}$ F(Q, flow pattern), where:
$REG$ = regular flow pattern or transition region (without noncondensible gas),
F = a multiplier which is a function of Q (fraction of $\alpha_g$) and flow pattern.

3. Flow Regimes Transitions

At each flow transition region, an exponential interpolation scheme is incorporated to prevent the numerical instability which might arise when abruptly switching from one flow pattern to another. In most cases, the correlations from one pattern is exponentially reduced, while that for the other is exponentially increased from a negligible amount to full value. The exponential interpolation has the form:

$C = (C_1)^f (C_2)^{1-f}$ where:

C, $C_1$, and $C_2$ are the coefficients;
f is a function of void fraction and it takes on values from 0 to 1.

E. Drift Flux Correlations

In view of the drift flux equation listed in Equation 7, two drift flux parameters require closure correlations. One is the distribution parameter, $C_0$, and the other is the drift velocity, $V_{gj}$. In the literature, various correlations exist for the determination of $C_0$ and $V_{gj}$. The present invention preferably adopts the well-known drift flux model developed by Ishii,[5] Kataoka and Ishii.[6] Ishii's correlations have been extensively validated against experimental data. They are also widely adopted in engineering analysis codes, for example, RELAP. The drift flux correlations encompasses six basic flow patterns for the vertical pipe: bubbly, slug (small diameter), churn (large diameter), annular-mist, liquid dispersed regimes, and low flow stratification. Table IV provides a summary of the correlations used in each flow pattern.

Historically, the drift flux approach is applied to two phase flow conditions where the net buoyancy force has a significant effect on the relative motion. It is believed that a fully validated drift flux correlations for horizontal flow conditions may be obtained by application of the principals set forth herein.

TABLE IV

Summary of Drift Flux Correlations.

| Flow Regimes | $C_0$ | $V_{gf}$ |
|---|---|---|
| Bubbly | $(1.2 - 0.2(\rho_g/\rho_f)^{1/2})(1 - e^{-18\alpha})$ | $2^{1/2}(\sigma g \Delta \rho/\rho_f^2)^{1/4}(1 - \alpha)^{7/4}$ |
| Slug (small diameter) | $(1.2 - 0.2(\rho_g/\rho_f)^{1/2})(1 - e^{-18\alpha})$ | $0.35(gD\Delta\rho/\rho_f)^{1/2}$ |
| Churn-Turbulent (large diameter) | $(1.2 - 0.2(\rho_g/\rho_f)^{1/2})(1 - e^{-18\alpha})$ | $2^{1/2}(\sigma g \Delta \rho/\rho_f^2)^{1/4}$ |
| Annular-Mist | $1 + (1 - \alpha)(1 - E_d) / \{\alpha + [(1 + 75(1 - \alpha))(\rho_g/\rho_f)/\alpha^{1/2}]\}^{1/2}$ $E_d = (\alpha_f - \alpha_{fT})/\alpha_f$ $\alpha_{fT} = \alpha_f c_f \exp[-7.5 \cdot 10^{-5}(\alpha_g v_g/v_{crit})^6]$ $c_f = 10^{-4} \rho_f \alpha_f v_f D/\mu_f$ $v_{crit} = 3.1[\sigma g(\rho_f - \rho_g)]^{1/4}/\rho_g^{1/2}$ | $(C_0 - 1)[(\Delta \rho g D(1 - \alpha)(1 - E_d)/(0.015 \rho_f)]^{1/2} +$ $[E_d(1 - \alpha)/(\alpha + E_d(1 - \alpha))]2^{1/2}(\sigma g \Delta \rho/\rho_f^2)^{1/4}$ |
| Stratified Flow (small diameter) | $(1.2 - 0.2(\rho_g/\rho_f)^{1/2})(1 - e^{-18\alpha})$ | $0.0019 D_H^{*\ 0.809}$ $(\rho_g/\rho_f)^{-0.157} N_{\mu f}(\sigma g \Delta \rho/\rho_f^2)^{1/4}$ |
| Stratified flow (large diameter) | $(1.2 - 0.2(\rho_g/\rho_f)^{1/2})(1 - e^{-18\alpha})$ | $0.03(\rho_g/\rho_f)^{-0.157} N_{\mu f}(\sigma g \Delta \rho/\rho_f^2)^{1/4}$ |

F. Fall Friction

The terms, FWG ($\alpha_g \rho_g v_g$) and FWF ($\alpha_f \rho_f v_f$) in the sum momentum equation (Equation 6), represent the pressure loss due to wall shear from cell center to cell center of the neighboring volumes connected by the flow junction. There are possibilities of wall shear of single-phase liquid, single-phase vapor, or two phase mixture. The wall friction is dependent not only on the phase of fluid but also on the flow regime characteristics.

In the present invention, the wall friction model is preferably based on a two phase multiplier approach in which the two phase multiplier is calculated from the heat transfer and fluid flow service (H.T.F.S.) modified. Baroczy correlation.[23] The individual phasic wall friction are calculated by apportioning the two phase friction between the phases using a technique derived from the Lockhart-Martinelli model.[24,25,26] The model is based on the assumption that the frictional pressure drop may be calculated using a quasi-steady form of momentum equation. The wall friction term for each phasic component can be simplified by the H.T.F.S. correlation and the Lockhart-Martinelli model, which results in:

$$FWF(\alpha_f \rho_f) = \alpha_{fw} [\rho_f \lambda_f |v_f|/2D] \{\lambda_f \rho_f (\alpha_f v_f)^2 + C [\lambda_f \rho_f (\alpha_f v_f)^2 \lambda_g \rho_g (\alpha_g v_g)^2]^{1/2} + \lambda_g \rho_g (\alpha_g v_g)^2\} [\alpha_{gw} \lambda_g \rho_g v_g^2 + \alpha_{fw} \lambda_f \rho_f v_f^2]$$

for the liquid, and:

$$FWG(\alpha_g \rho_g) = \alpha_{gw} [\rho_g \lambda_g |v_g|/2D] \{\lambda_f \rho_f (\alpha_f v_f)^2 + C [\lambda_f \rho_f (\alpha_f v_f)^2 \lambda_g \rho_g (\alpha_g v_g)^2]^{1/2} + \lambda_g \rho_g (\alpha_g v_g)^2\} [\alpha_{gw} \lambda_g \rho_g v_g^2 + \alpha_{fw} \lambda_f \rho_f v_f^2]$$

for the vapor.

It should be noted that flow regimes effects are included in the term ($\alpha_{fw}/\alpha_f$) and ($\alpha_{gw}/\alpha_g$) for the liquid and the vapor, respectively. These terms are such that:

$$\alpha_{fw} = 1 - \alpha_{gw}$$

$$\alpha_f = 1 - \alpha_g$$

In the flow regime map, seven flow patterns are modeled, which are: for pre-CHF heat transfer, the bubbly, slug, and annular mist; for post-CHF heat transfer, the inverted-annular, inverted-slug and mist; and for stratified flow, the vertically and horizontally stratified. For the transition regime between pre- and post-CHF heat transfer, an interpolation scheme is implemented. Table V gives a summary of flow regime factors for phasic wall friction. Table VI is a summary of the friction factor model to link the laminar, laminar-turbulent transition, and turbulent-full turbulent transition regimes.

TABLE V

Summary of Flow Regime Factor for Phasic Wall Friction.

| Flow Regimes | Flow Regime Factors for Phasic Wall Friction |
|---|---|
| Bubbly | $\alpha_{fw} = \alpha_f$; $\alpha_{gw} = \alpha_g$ |
| Slug | $\alpha_{fw} = 1 - \alpha_{gs}$; $\alpha_{gw} = \alpha_{gs}$ $\alpha_{gs} = \alpha_{B-s} \exp[-8(\alpha_g - \alpha_{B-S})/(\alpha_{S-A} - \alpha_{B-S})]$ (a*) $\alpha_{B-S}$ is at the bubbly-to-slug flow regime transition |
| Annular-Mist | $\alpha_{fw} = (\alpha_{fT})^{1/4}$; $\alpha_{gw} = 1 - (\alpha_{fT})^{1/4}$ $\alpha_{fT} = \alpha_f C_f \exp -7.5 \times 10^{-5} (\alpha_g v_g/u_c)^6$ (b*) $u_c = 3.2 [g\sigma(\rho_f - \rho_g)]^{1/4}/\rho_g^{1/2}$ |
| Inverted-Annular | $\alpha_{gw} = (\alpha_{gg})^{1/4}$; $\alpha_{fw} = 1 - (\alpha_{gg})^{1/4}$ $\alpha_{gg}$ is the inverted form of equation (b*) |
| Inverted-Slug | $\alpha_{fw} = \alpha_{fs}$; $\alpha_{gw} = 1 - \alpha_{fs}$ $\alpha_{fs}$ is the inverted form of equation (a*) |
| Mist | $\alpha_{fw} = \alpha_f$; $\alpha_{gw} = \alpha_g$ |
| Vertically Stratified | $\alpha_{fw} = \alpha_f$; $\alpha_{gw} = \alpha_g$ |
| Horizontally Stratified | $\alpha_{fw} = 1 - \theta/\pi$; $\alpha_{gw} = \theta/\pi$ |

TABLE VI

Summary of The Friction Factor Model.

| Flow Regimes | Friction Factor Model |
|---|---|
| Laminar (0 <= Re => 2000) | $\lambda_L = 64/Re$ |
| Laminar-Turbulent Transition (2000 <= Re => 4000) | $\lambda_{L,T} = 5.285[1.189 - (4000/Re)^{0.25}](\lambda_{t,4000} - \lambda_{L,2000}) + \lambda_{L,2000}$ |
| Turbulent-Full Turbulent (4000 <= Re =< Re_c) | $\lambda_{t,u} = \{[1 - (4000/Re)^{0.25}]/[1 - 4000/Re_c)^{0.25}\}(\lambda_u - \lambda_{t,4000}) + \lambda_{t,4000}$ $Re_c = 378.3/[(2\epsilon/D)\lambda_u]$ (the critical Reynolds number) $\lambda_u = [1.74 - 2 \log_{10}(2\epsilon/D)]^{-2}$ ($\epsilon$ is the surface roughness) |
| Remarks | |

G. Wall Heat Transfer coefficients

Figure 6A:
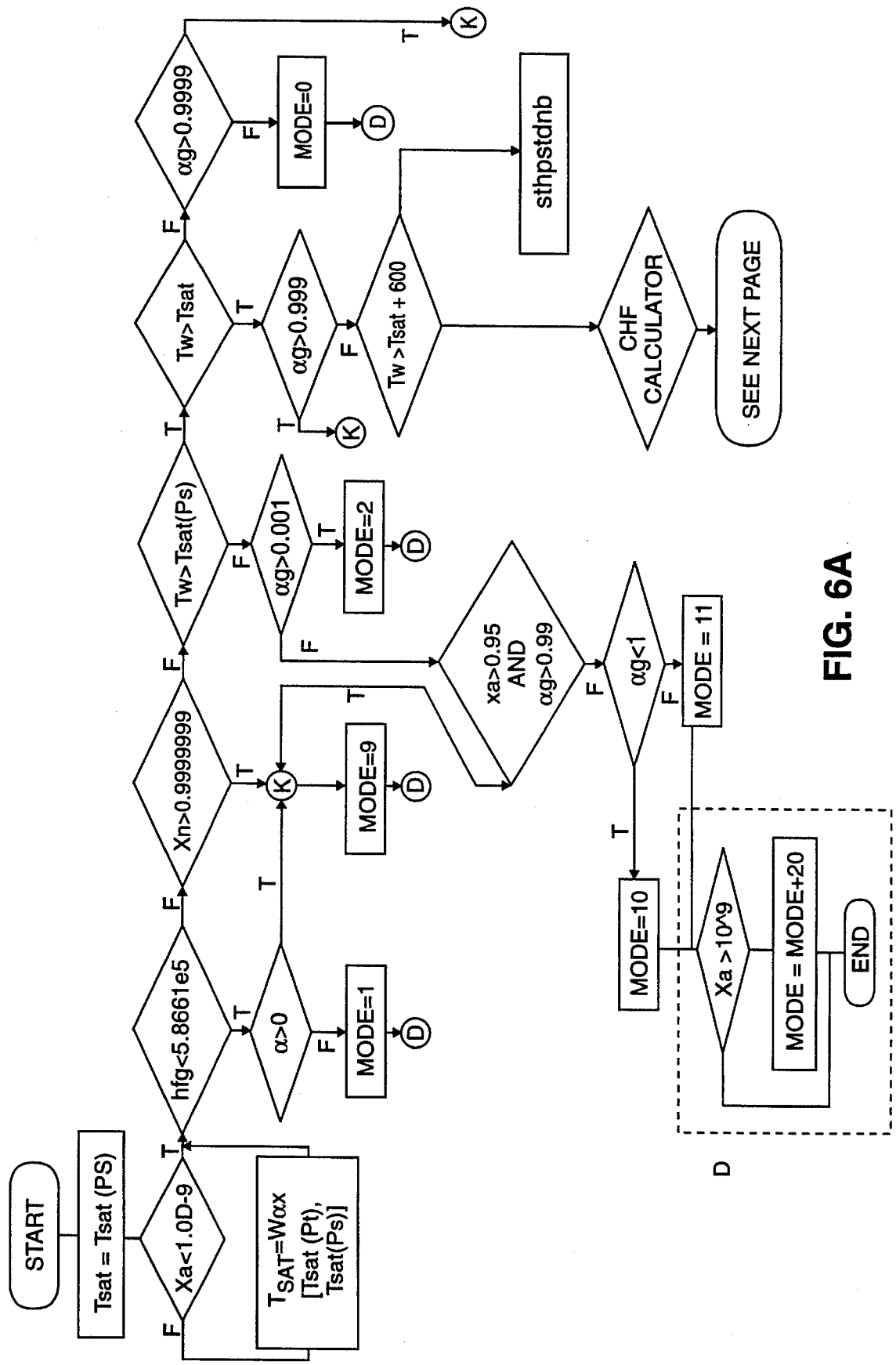
FIGS. 6A and 6B are a flow chart illustrating the logic map of the wall heat transfer selection.
Figure 6B:
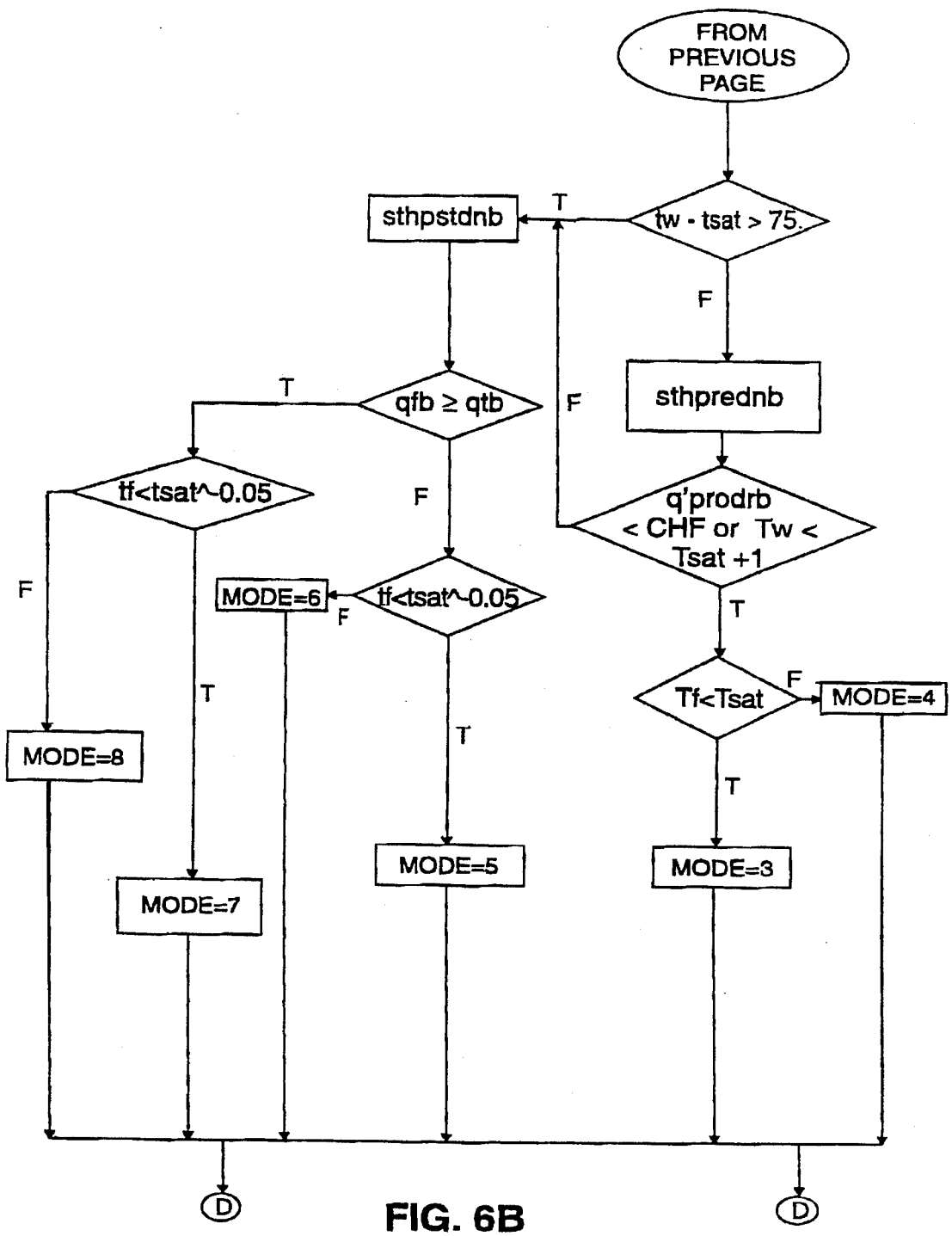

A boiling curve is used to govern the selection of the wall heat transfer correlations. The comprehensive RELAP heat transfer mode decision logic[27] is modified and used to determine an appropriate heat transfer mode and the related heat transfer coefficient correlations for the applied flow conditions. Referring to FIG. 6, the decision logic map includes a total of six key factors to govern the selection of a heat transfer mode. These include (1) pressure, (2) wall temperature, (3) noncondensible gas, (4) vapor void fraction, (5) heat flux, and (6) film boiling heat flux. The heat transfer modes included in the logic path cover the full range of convection and boiling conditions for reactor application. These modes are designated as follows.

Mode 0 Convection to noncondensible-water mixture

Mode 1 Single-phase liquid convection at critical and supercritical pressure

Mode 2 Single-phase liquid convection at subcritical pressure

Mode 3 Subcooled nuclear boiling

Mode 4 Saturated nuclear boiling

Mode 5 Subcooled transition film boiling

Mode 6 Saturated transition film boiling

Mode 7 Subcooled film boiling

Mode 8 Saturated film boiling

Mode 9 Single-phase vapor convection

Mode 10 Condensation when void equals one

Mode 11 Condensation when void is less than one.

The noncondensible gas effects are included in each heat transfer mode calculation. If the noncondensible quality is greater than 0.0001, then 20 is added to the mode number. Thus mode number can be 20 to 31.

The total wall heat flux includes the heat flux to the gas phase and the heat flux to the liquid phase:

$$q = htcg(T_w - T_g) + htcf(T_w - T_{ref})$$

where the liquid reference temperature ($T_{ref}$) can be either the local liquid temperature or the saturation temperature, depending on the htcf correlation. Thus, calculation of the wall heat flux to each phase requires the heat transfer coefficients of gas (htcg) and liquid (htcf). Both coefficients need correlations to determine their values. In addition, the calculation of the wall flashing/condensing term ($\Gamma_w$) also requires a separate correlation. Both the phasic wall heat fluxes and the $\Gamma_w$ term are supplied to the fluid energy and continuity equations. Table VII shows a summary of the liquid and gas heat transfer coefficients as well as the $\Gamma_w$ term for each heat transfer mode.

TABLE VII

Wall Heat Transfer Partition.

| Heat Transfer Mode | Heat Transfer Coefficient and Wall Flashing Term |
|---|---|
| Condensation (10,11) | htcg = max(turb-conv,lam-cond,turb-cond)[a] (1-wet fraction). htcf = max(turb-conv,nat-conv)[a] (wet wall fraction). gamw = proportional to the gas phase heat flux. |
| Single Phase (0,1,2,9) | htcg = max(lam-conv,turb-conv,nat-conv)[a]; $\alpha_g = 1$. htcf = max(lam-conv,turb-conv,nat-conv)[a]; $\alpha_f = 0$. gamw = 0. |
| Nuclear Boiling (3,4) | htcg = 0. htcf = micro.(h) and macro.(h) terms. [Chen[28]] gamw = fraction of heat flux to liquid. [Lahey, Saha-Zuber] |
| Transition | htcg = max(lam-conv,turb-conv,nat-conv)[a] |

TABLE VII-continued

Wall Heat Transfer Partition.

| Heat Transfer Mode | Heat Transfer Coefficient and Wall Flashing Term |
|---|---|
| Boiling (5,6) | (1-wet wall fraction). htcf = (wet wall fraction) (critical heat flux)/ (tw-tsat). [Chen[28], Groeneveld[29]] gamw = fraction of heat flux to liquid phase. [Lahey, Saha-Zuber] |
| Film Boiling (7,8) | htcg = max(lam-conv,turb-conv,nat-conv)[a]. htcf = radiation heat flux to liquid drops(tw-tsat) [Sun[30]] + void weighted modified Bromely.[31] gamw = fraction of heat flux to liquid phase. |
| Correlations in References | a. lam-conv [Kays[32]]; turb-conv [Dittus-Boelter[22], Douglas-Rohsenow]; nat-conv [McAdams[33]]; turb [Bayley or Eckert-Jackson]; lam-cond [Nusselt]; turb-cond [Carpenter-Colburn]. |

H. Heat Conduction

The heat structure models which account for heat transmission and heat loss to containment play an important role in the present invention. A quasi steady state analytical method is preferably used to calculate the temperature profile in a heat structure. A temperature profile in a specific material region is postulated and the Newmann condition is the boundary condition in calculation. Two types of heat conduction modules are developed according to their boundary conditions and geometric consideration. The first scheme is developed for fuel rod heat structures. It is a cylindrical coordinate heat conduction problem with only one side convective boundary. The one dimensional (in radial direction) temperature profile is solved. The second scheme is developed for the heat structures with two side convective boundaries. This scheme is suitable for the temperature calculation for core shroud, canister wall, steam generator tubing, reactor vessel wall, and piping wall. After the temperature field is obtained, the wall temperature is used to select the heat transfer regime in the wall convection model and calculate wall heat fluxes into the coolant. Also the average fuel temperature is used to compute fuel the temperature coefficient in the feedback of neutronic calculation. In the interface between the present invention, thermohydraulic analysis, and a core neutronic analysis, e.g., the aforementioned CONcERT™ product, the neutronic power is supplied as the heat source terms in the heat conduction model.

1. Fuel Rod

Figure 7:
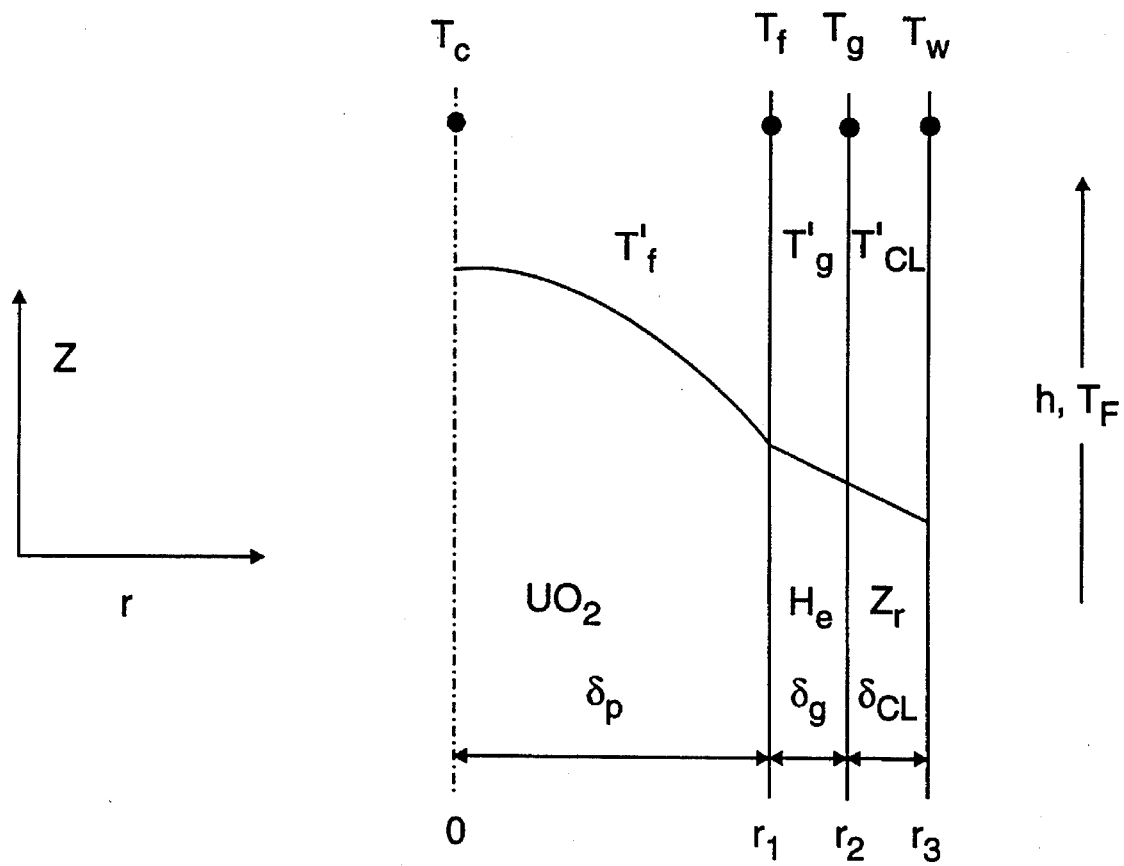
FIG. 7 is a diagram of the fuel rod geometry.

FIG. 7 depicts the geometry of a fuel rod. A fuel rod consists of the fuel pellet region $UO_2$, gap region $H_e$, and cladding region $Z_r$ (Zircaloy). The governing equation is the cylindrical coordinate conduction equation.

$$\frac{\partial^2 T}{\partial r^2} + \frac{1}{r} \frac{\partial T}{\partial r} + \frac{q'''}{k} = \frac{1}{\alpha} \frac{\partial T}{\partial t} \qquad (18)$$

where $$\alpha = \frac{k}{\rho c_p} \qquad (19)$$

In the fuel pellet region $UO_2$, a parabolic temperature distribution assumption is made. In the gap $H_e$ and cladding $Z_r$ regions, since the thickness is very thin compared to the pellet diameter, a linear profile is postulated. The thermal conductivity and specific heat in each region are function of last time step average temperature. The heat generation term (S), coolant temperature ($T_F$) and heat transfer coefficient (h) are last time step values during the calculation. Only the radial conduction heat transfer is considered. Energy conservation concepts are utilized to derive finite difference equations. Eventually four unknown temperatures, centerline temperature ($T_c$), fuel pellet surface temperature ($T_f$), fuel gap temperature ($T_g$) and cladding surface temperature ($T_w$) are solved simultaneously.

2. Steam Generator Tubing, Canister Wall, Vessel Wall, and Core Shroud

Figure 8:
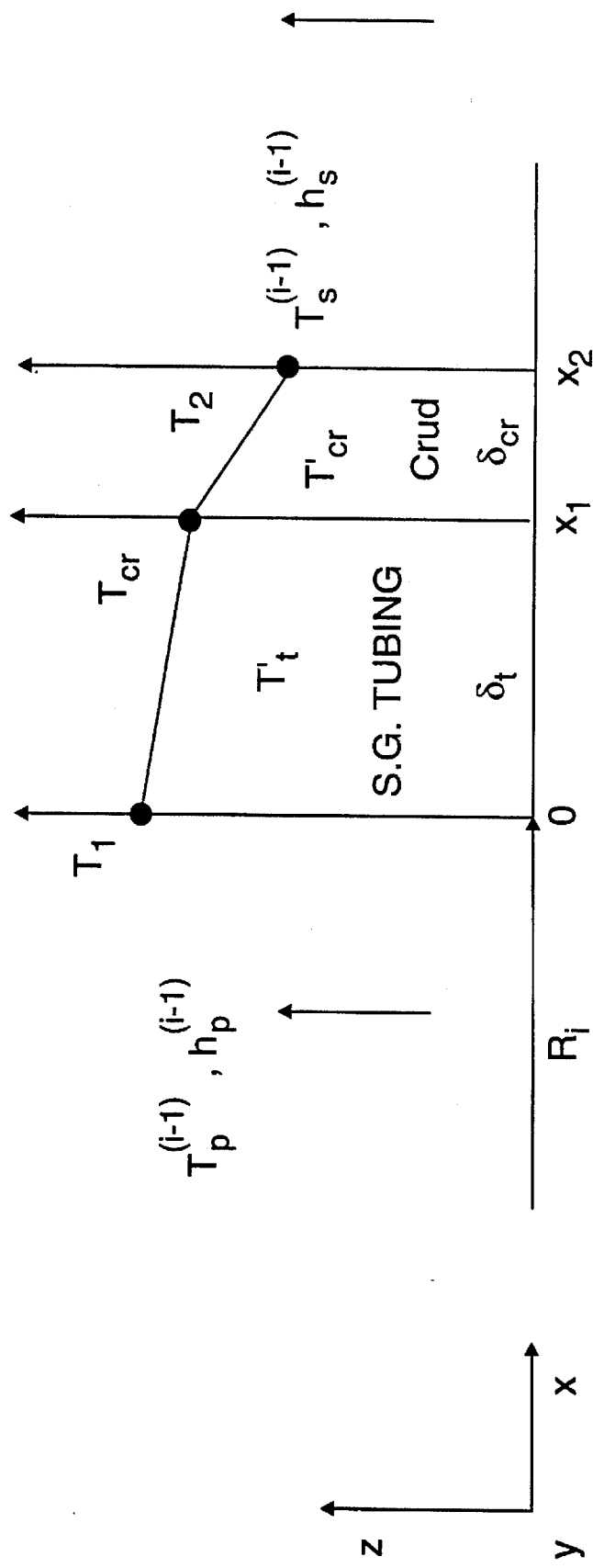
FIG. 8 is a schematic cross sectional view of steam generator tubing, canister wall, core shroud, or vessel wall (also piping wall)

FIG. 8 is a schematic cross section view of steam generator tubing, canister wall, core shroud, or vessel wall (also piping wall). It may consist of two layers of heat structures, one is the tubing (vessel) wall and the other is crud (or insulator for vessel wall or piping wall). In the steam generator, the crud is only developed in the secondary side for PWR plant. The characteristics of this type of heat structure is that there is two sides convection heat transfer on the wall surface. The governing equation for this type of heat structure is:

$$\frac{\partial^2 T}{\partial x^2} + \frac{q'''}{k} = \frac{1}{\alpha} \frac{\partial T}{\partial t}, \qquad \alpha = \frac{k}{\rho C_P} \tag{20}$$

In the calculation, the thickness of the tubing wall (vessel wall) is assumed very thin compared to the tubing diameter, that is, $R_i > \delta_t$, $\delta_{Cr}$. Thus rectangular coordinate conduction heat transfer is calculated. The temperature profiles in both regions are assumed linear. The bulk temperature and heat transfer coefficients are last time step values. Another assumption made is that the energy storage term is not considered in the crud (or insulator) region. To obtain the temperatures at each interface ($T_1$, $T_2$, $T_{cr}$), three energy conservation conditions are necessary in deriving the finite difference equations. As to the boundary conditions, the heat transfer coefficients are calculated in wall heat transfer models and the bulk temperature ($T_p^{(i-1)}$, $T_s^{(i-1)}$) is equivalent bulk temperatures obtained from two phasic temperatures, last time step wall heat transfer coefficients, and wall temperature. In the application of heat loss slabs (such as heat loss from reactor vessel wall to primary containment), heat transfer coefficient (in air) and the secondary bulk temperature are best estimated by the user and by the other systems (Primary Containment).

I. Water Properties

The thermodynamic property calculation requires accuracy and speed to meet real time constraint. The thermodynamic properties needed in a full range power plant operation covers not only normal states (saturation, subcooled liquid and superheated steam) but also metastable states (superheated liquid and subcooled gas). In particular ranges, the water properties behave highly nonlinearly. For example, at low pressure range, the specific volume changes dramatically for small pressure disturbances. It is not likely that a simple equation can accurately compute the results. Thus, only high order polynomials are sufficient to describe the property trend. In real time environments, the polynomial calculation of properties require a great deal of computation time. To alleviate these difficulties, a table search method is implemented for use in the present invention.

The 1984 NBS/NRC steam table package is one state-of-the-art tool to calculate water properties. This package uses density and temperature as its independent variables to compute the Helmholtz function which consists of the following three parts, basic term for equation of state, residual term according to experimental result, and ideal gas correction term. All the properties are derived from the Helmholtz function through the Maxwell equation. For the transport properties, such as viscosity and surface tension coefficient, this package computes using the IAPS[34] equations. The package covers the range from normal to metastable states. It is ideal for developing steam tables for using in the present invention in terms of its accuracy and range. However, its independent variable choice is different. A change of independent variable is necessary before executing the package. There is a twofold reason to choose pressure and internal energy as independent variables in the present invention. The first is trying to avoid the singularity occurring at transition from two phase to single phase, especially for property derivatives. For example, in the case of single phase liquid, the dp/dρ term approaches infinity as temperature nears room temperature. Secondly, the solution method of the present invention is based on RELAP. Pressure and internal energy are the independent variables chosen by RELAP.

In a table lookup method, two factors determine the performance, one is the grid distribution spanning the table and the other is the searching scheme. The grid point selection affects the accuracy of the table since the final results are from linear interpolation of the grid points properties. For those highly nonlinear regions, (for example, low pressure, metastable), a finer grid should be selected to minimize the deviation from original package results. A grid optimization scheme may be implemented by taking advantage of grid transformation techniques. This optimization reduces the error under 0.5% maximum relative deviation. More points should be allocated in the neighborhood of fast property change. Since the change of properties vary differently in the whole domain of the power plant operation, it's not easy to find a general gridding rule. In a steam table suitable for the present invention, the whole domain is subdivided into twelve subregions according to the variation of properties. In each subdomain, a grid transformation technique is applied to generate the grid points. Coordinate transform is used to refine the grids in the area where a steep change of properties occurs.

The table lookup method to calculate the properties for use in the present invention involves two movements. The first movement is grid searching. To refrain from searching the desired interval from the beginning point, the index anchoring the interval for the last time step is stored. As time marches, the search starts from the anchoring point to either direction (depending on the input parameter) until a desired interval is found in which the input independent variable falls in between. The index of the anchoring point is stored for the subsequent interpolation and defined as the lower side grid point (less value) for the interval. For two dimensional search (pressure and internal energy), an index for each independent variable is needed. If the input parameters are out of range of the steam table, the properties are reset to the boundary grid values. The second movement is the interpolation. A two-dimensional linear interpolation is used for two dimensional tables and one-dimensional linear interpolation is used for the saturation table.

After the optimization, the final products are two two-dimensional water properties tables, one for steam state and the other for liquid state. Table VIII summarizes the final specification of the steam tables. In this table, the test points with relative errors greater than 0.5% are almost always located in the low pressure range (pressure less than 0.1 bar) and metastable range (internal energy is within 1700 to 2100 kj/kg). The one-dimensional saturation table is developed by using the same grid point distribution as the steam table with some extra points in the region where the pressure is greater than 200 bars. The saturation table has higher resolution than the two-dimensional tables.

TABLE VIII

Summary of Steam Table Package.

| Tables | Range | Table Entries | Optimized Grids | Grid and Test Points | Deviation Estimate |
|---|---|---|---|---|---|
| Steam (2-D) | $p = 0.01\sim200$ bar $U = 1850\sim3300$ kj/kg | $P, U_g, T_g, \rho_g, h_g,$ $v_g, \beta_g, k_g, Cp_g, \mu_g,$ $\frac{\partial T_g}{\partial p}, \frac{\partial T_g}{\partial U_g}, \frac{\partial v_g}{\partial p}, \frac{\partial v_g}{\partial U_g}$ | $91(p = 0.01\sim3$ bar) $93(p = 3\sim200$ bar) $88(U = 1850\sim3300$ kj/kg) | 16104 (grid) 46827 (test) | <0.5% for 93.5% of test points |
| Water (2-D) | $p = 0.01\sim200$ bar $U = 30\sim1850$ kj/kg | $P, U_f, T_f, \rho_f, h_f,$ $v_f, \beta_f, k_f, Cp_f, \mu_f,$ $\frac{\partial T_f}{\partial p}, \frac{\partial T_f}{\partial U_f}, \frac{\partial \rho_f}{\partial p}, \frac{\partial \rho_f}{\partial U_f}$ | $58(p = 0.01\sim200$ bar) $95(U = 30\sim1850$ kj/kg) | 5510 (grid) 13441 (test) | >5% for 0.53% of test points (at $p = 0.01\sim0.1$ bar and $U = 1700\sim2100$ kj/kg) |
| Saturation (1-D) | $p = 0.01\sim202.47$ bar $T^s = 280.1\sim639.9$ K | $U_f^s, U_g^s, \rho_f^s, \rho_g^s,$ $v_f^s, v_g^s, h_f^s, h_g^s, \sigma, \frac{dT^s}{dp}$ | 200 | 200 (grid) 199 (test) | <0.1% |

J. Miscellaneous Models

A variety of generic models are needed to complete system models in the THEATRe™ code. These include critical flow model, Void Axial Distribution (VAD) model, recirculation pump model, boron tracking model, metal-water reaction model, and radioactivity model. A brief summary of each of these models is described below.

1. Critical Flow Model

The critical flow model is an essential module for simulation of a pipe break flow or nozzle flow transients. The critical flow model is used to predict if the flow is choked at break or nozzle, and if it is, to establish the discharge boundary condition. Based on the fluid state changing throughout the break flow process, the model can be categorized into either a subcooled choking model, a transition choking model, or a two phase choking model. The choking criteria and sonic speed calculation for each mode follow the methodology of RELAP. Upstream node properties are used to evaluate the choking criteria.

In the selection of choking flow model, if the equilibrium quality (x) is less than 0.001%, the subcooled choking model is invoked. The key element in this calculation is the Alamgir-Lienhard-Jones (ALJ)[35,36] pressure undershoot model. The phrase "pressure undershoot" means that the pressure at the choke plane is usually lower than the saturation pressure based upon liquid temperature when the flow begins to have vapor generation. The generation of vapor will dramatically reduce the sound propagation speed and will result in choke flow. If no vapor generates in the flow path, the flow is not easy to choke since the sonic velocity is extremely high, due to the incompressibility of liquid. The pressure undershoot is modeled as follows:

$$\Delta P = P_{sat} - P_t \quad (21)$$

$$= 0.258 \frac{\sigma^{\frac{3}{2}} T_R^{13.76}}{\sqrt{k_B T_c}} \frac{V_g}{V_g - V_f} [1 +$$

$$2.078E-8 \left( \rho_f \frac{1}{A_t} \frac{dA_t}{dx} V_c - \right.$$

$$\left. 6.9984E-2 \left( \frac{A_t}{A} \right)^2 \rho_f \frac{V_c^2}{2} \right.$$

Trapp-Ransom two phase characteristic choking model[37] is adopted to determine two phase choking criterion. The characteristic method starts from four conservation equations, that is, one mixture mass, two phasic momentum and one mixture energy. After making a thermal equilibrium assumption, the characteristic analysis gives the choking criterion based upon the assumption that the roots of the characteristic polynomial should be greater than zero. Thus the choking criterion obtained is:

$$\frac{\alpha_g \rho_f V_g + \alpha_f \rho_g V_f}{\alpha_g \rho_f + \alpha_f \rho_g} = a_{HE} \quad (22)$$

where $a_{HE}$ is the two phase homogeneous sound speed and is defined as follows:

$$a_{HE} = V \frac{dP^s}{dT} / \left[ X \left( \frac{C_{pg}}{T_g} + V_g \frac{dP^s}{dT} \left( \kappa_g \frac{dP^s}{dT} - 2\beta_g \right) \right) + \right.$$

$$\left. (1-X) \left( \frac{C_{pf}}{T_f} + V_f \frac{dP^s}{dT} \left( \kappa_f \frac{dP^s}{dT} - 2\beta_f \right) \right) \right]^{0.5} \quad (23)$$

where $$\frac{dP^s}{dT} = \frac{h_g - h_f}{T^s(V_g - V_f)} \quad \text{(Clapeyron's equation)} \quad (24)$$

Figure 9A:
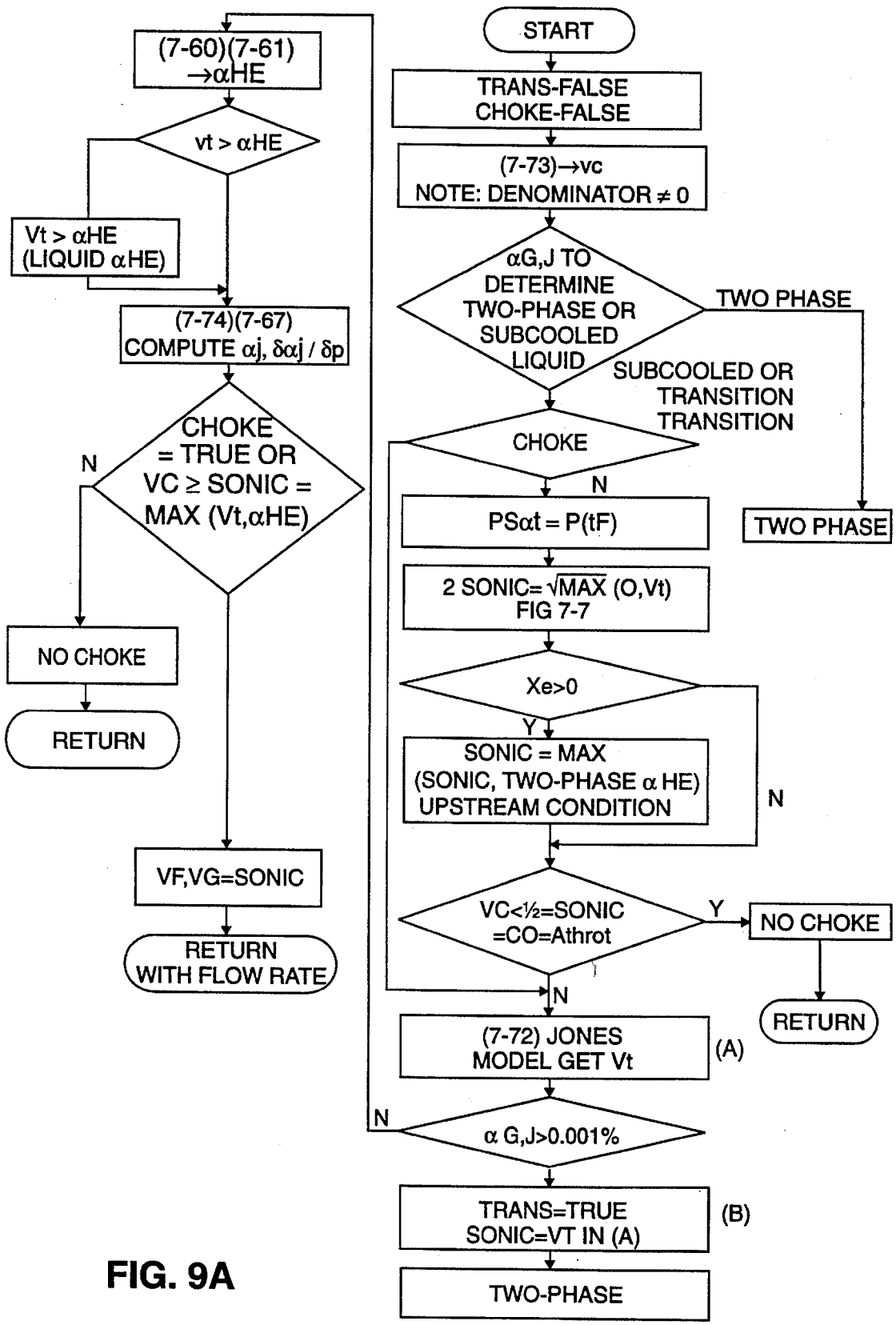
FIGS. 9A and 9B are a flow chart of the logic used to check the choking status of a critical flow model.
Figure 9B:
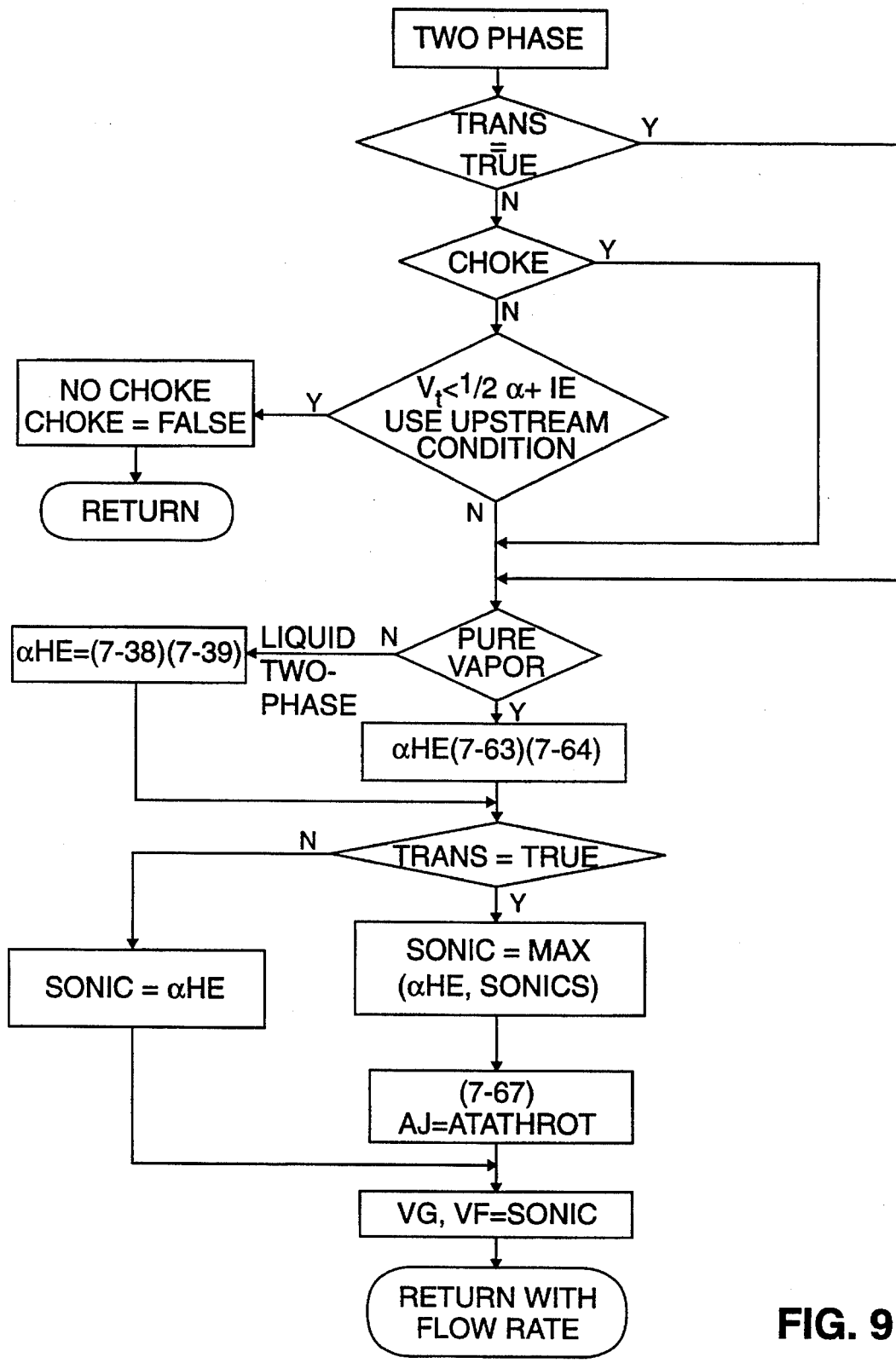

The above models are included in the THEATRe™ code and the choking logic is modified from RELAP. The break flow calculation is the only deviation between RELAP and THEATRe. In RELAP, it implicitly solves 2×2 momentum equation along with choking criterion to obtain choking plane velocities. In the THEATRe™ code, due to the limitation of fixed nodalization, the break flow is computed based upon the sonic velocities if the choking status is determined as YES. The logic to check the choking status is in FIGS. 9A and 9B.

2. VAD (Void Axial Distribution) Model

An accurate calculation of the detailed BWR core void axial distribution is required to correctly simulate feedback phenomena of thermal hydraulics and neutronics. Usually the approach used in engineering safety analysis is to implement a fine-node configuration for the simulated BWR code (for example, 12 axial nodes for Grand Gulf RETRAN model[38]). However, in current real time simulation environment, only coarse node (as much as 3 axial nodes) can be allowed. This constraint is determined by the Courant stability criterion subjected to larger time steps (1/12 seconds). It is evident that the accuracy of 3-node configuration is less than satisfactory and therefore, a detailed core void distribution scheme is desired to enhance the accuracy.

If a BWR core is modeled by a coarse-node configuration, the void inventory will tend to be over-estimated by an advanced simulation code using donor cell concept.[39] For a 3-node scheme, the error resulting from overestimation of void can be as high as 0.1 for core coverage void, and 0.25 for the void in the bottom node. As a consequence, transient responses of level and pressure will be significantly distorted. This type of code performance can be applied to virtually all engineering simulation code using NMNP methodology, for example, RELAP and RETRAN. Therefore, to accurately estimate core void inventory using a coarse-node scheme (for example, 3 nodes), a special detailed void distribution scheme needs to be integrated with the NMNP solution scheme.

Figure 10:
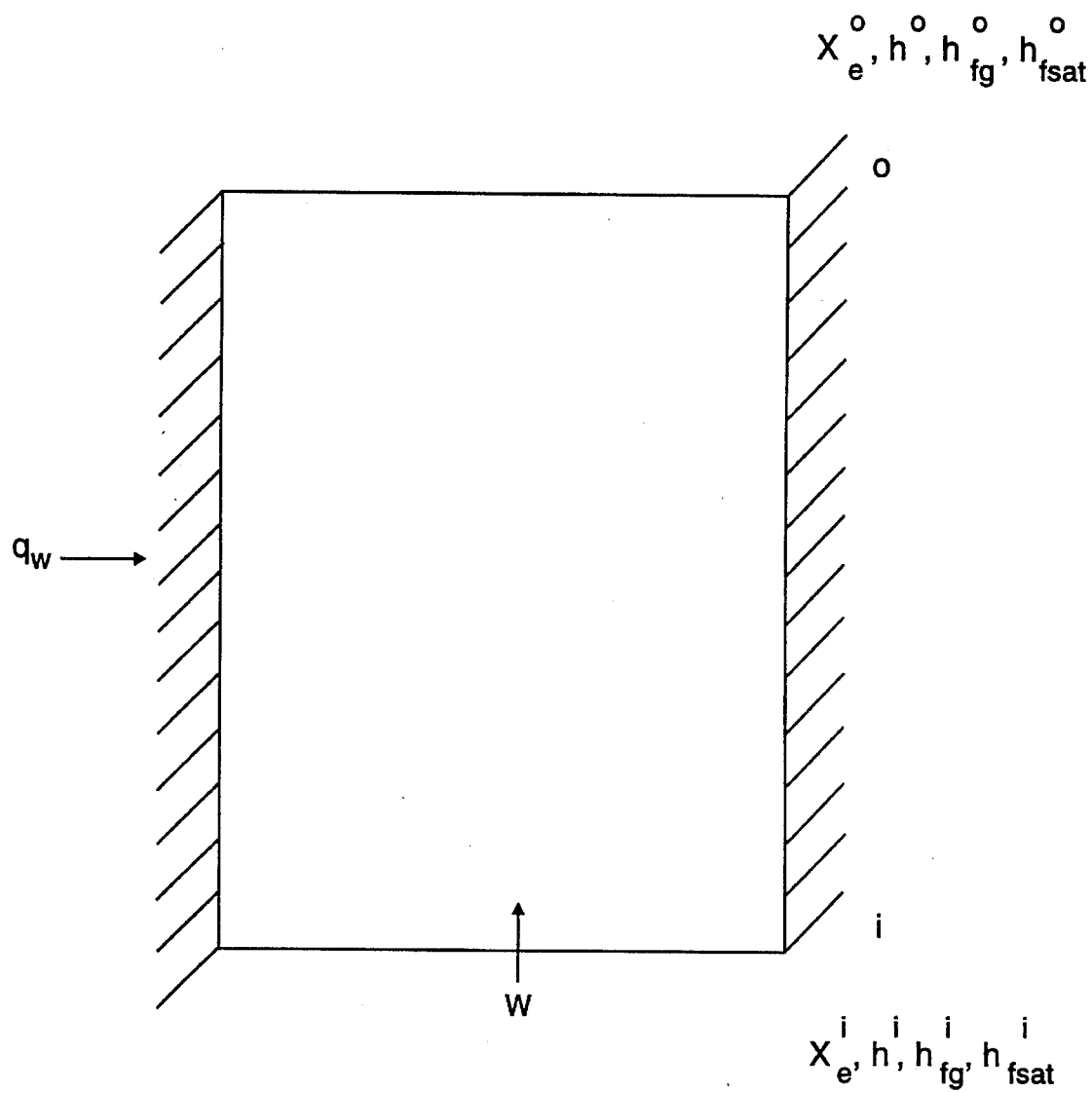
FIG. 10 is a schematic diagram of a heated control volume.

The basic concepts of the detailed core void axial distribution method is commonly known. These concepts can be derived from standard thermal hydraulic test books.[40,41,42] In summary, the computation of void distribution requires calculations of equilibrium quality and flow quality. The thermodynamic equilibrium quality[40,41,42] is commonly defined as:

$$X_e = \frac{h - h_{fsat}}{h_{fg}} \quad (25)$$

where $h$ is the mixture enthalpy, $h_{fsat}$ is saturated liquid enthalpy, and $h_{fg}$ is latent heat of vaporization. This quality can be easily calculated by a simple steady state energy balance on a heated channel. For a heated control volume (See FIG. 10), the heat balance equation can be shown as $$W(h^o - h^i) = q_w \quad (26)$$

where $q_w$ is the total wall heat added to the fluid, $W$ is the total mass flow rate, and $h^o$ and $h^i$ are the mixture enthalpies of the fluid at the outlet and inlet positions respectively. Combining Equations 25 and 26, the outlet equilibrium quality ($X_e^o$) can be obtained by the following equation:

$$X_e^o = X_e^i \cdot \left(\frac{h_{fg}^i}{h_{fg}^o}\right) - \left(\frac{h_{fsat}^o - h_{fsat}^i}{h_{fg}^o}\right) + \frac{q_w}{w \cdot h_{fg}^o} \quad (27)$$

Therefore, if fluid properties ($h_{fsat}^o$, $h_{fsat}^i$, $h_{fg}^o$, $h_{fg}^i$), wall heat ($q_w$), mass flow ($W$), and inlet equilibrium quality ($X_e^i$) are known, the outlet quality ($X_e^o$) can be calculated. By applying Equation 27 to a heated channel, a detailed equilibrium quality distribution can be determined. For example, for a channel divided into 12 segments (see FIG. 11), the equilibrium qualities at n=1 to 12 can be calculated, provided that the inlet quality ($X_e^n$ at n=0) distribution of fluid properties ($h_{fsat}^n$ and $h_{fg}^n$ for n=1–12), flow rate (W for j=1–4) and wall heat ($q_w^m$ for m=1–12) are known, that is:

$$X_e^n = X_e^{n-1} \cdot \left(\frac{h_{fg}^n}{h_{fg}^{n-1}}\right) - \left(\frac{h_{fsat}^n - h_{fsat}^{n-1}}{h_{fg}^n}\right) + \frac{q_w^m}{w^j \cdot h_{fg}^n} \quad (28)$$

where n=1–12, m=n, j=1 for m=1–2, j=2 for m=3–6, j=3 for m=7–10, j=4 for m=11–12.

Figure 11:
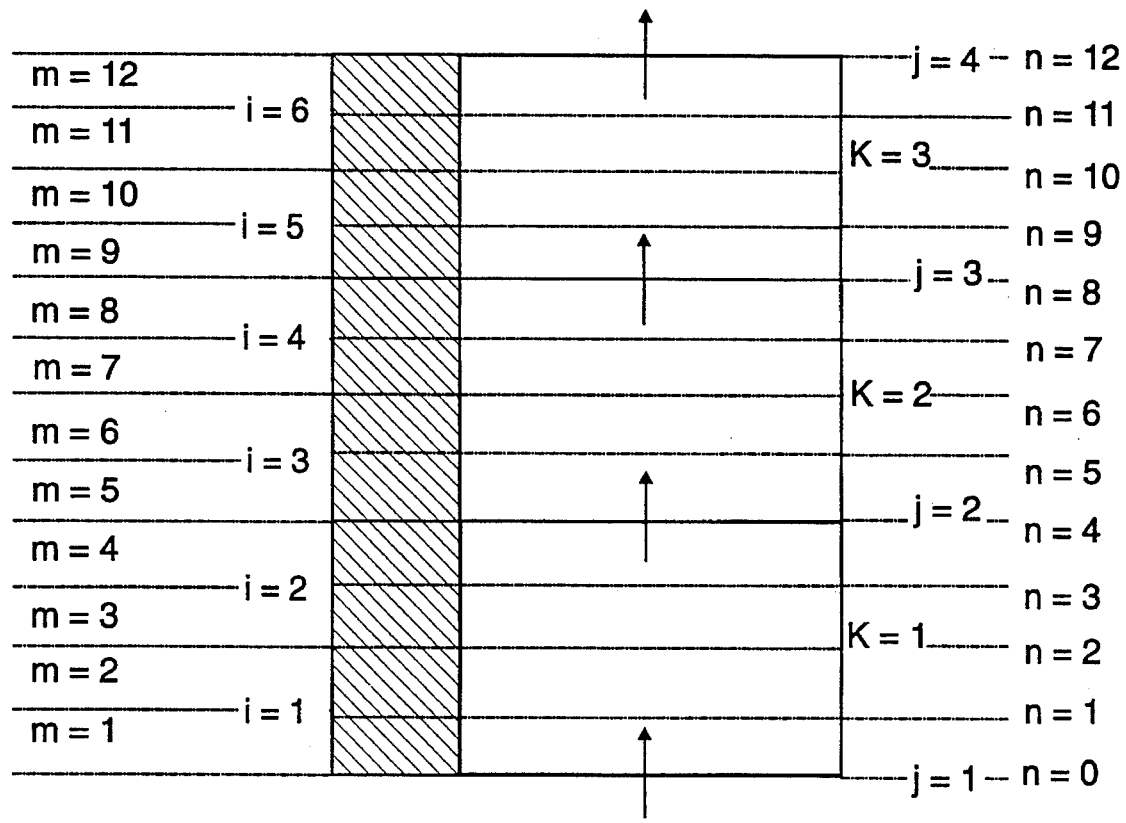
FIG. 11 is a schematic diagram of a void axial distribution nodalization scheme for a boiling water reactor core channel.
Figure 11:
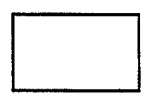
Figure 11:
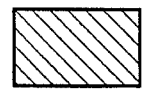

FIG. 11 illustrates a coarse node core fluid channel. It includes three axial fluid nodes (k=1 to 3), four axial fluid junctions (j=1 to 4) and six heated slabs (i=1 to 6). For this configuration, the coarse nodes have liquid saturation enthalpy ($h_{fsat}$) and latent heat ($h_{fg}$) at k=1 to 3. At the inlet of the channel (n=0), fluid properties are also produced at the coarse nodes (h, $h_{fsat}$ and $h_{fg}$). With all these calculated values, $h_{fsat}$ and $h_{fg}$ at n=1 to 12 can be obtained by a simple linear interpolation method based on axial flow length. The mass flow rates (W) are given for original coarse nodal junctions at j=1 to 4 and the mass flow rates in between two adjacent junction points are assumed equal to the value of the same junction cell. For example, m=3,4,5 and 6 belongs to a junction cell j=2. Therefore, $w^j$ (j=2) is used in equation 28 to calculate $X_e^n$ for n=3,4,5 and 6. The wall heat is provided at the six axial heat slabs (i=1–6). Each heat slab wall heat is partitioned into two parts: for the upper half and lower half of the slab. The heat partition is based on a proportional ratio, which is the ratio of neutronic powers generated in the two associated neutronic nodes. Note that two neutronic nodes (m and m') are coupled with one heat slab (i). For example:

$$q_w^m = q_w^i \cdot \left(\frac{Q_N^m}{Q_N^m + Q_N^{m'}}\right) \quad (29)$$

where $Q_N^m$, $Q_N^{m'}$ represents the neutronic power in the two neutronic nodes m and m' respectively.

The calculation of flow quality is based on the following equation:

$$X = \frac{X_e h_{fg} + h_{fsat} - h_f}{h_g - h_f} \quad (30)$$

where $h_f$ and $h_g$ are liquid enthalpy and gas enthalpy respectively. This equation originates from a simple relationship between flow quality and equilibrium quality, that is, $$(w_g + w_f)h = w_g h_g + w_f h_f \quad (31)$$

It simply means that the total fluid energy carried by mixture phase (the product of mixture flow and mixture enthalpy) should be identical to the summation of energy carried respectively by the liquid and gas phases (sum of the product of phasic enthalpy and flow). Equation 30 can be derived by coupling Equation 31 with the definition of equilibrium quality (Equation 25) and the definition[40,41,42] of flow quality (X), which is known as:

$$X = \frac{w_g}{w_g + w_f} \quad (32)$$

By applying Equation 30 to n=1–12, flow qualities at n=1–12 can be calculated, provided that $X_e$, $h_{fg}$, $h_{fsat}$, $h_f$ and $h_g$ are known. $X_e^n$, n=1–12 has been determined in the previous step and $h_f$ and $h_g$ can be obtained by the linear interpolation method (similar to the calculation of $h_{fg}$ and $h_{fsat}$ in the previous step).

Finally, void fraction can be obtained by a well-known Zuber-Findley void-quality relationship[41]:

$$\alpha_g = \frac{1}{C_o\left(1 + \frac{1-\chi}{\chi}\frac{\rho_g}{\rho_f}\right) + \frac{v_{gj}\rho_g}{\chi G}} \quad (32)$$

where $\rho_f$ and $\rho_g$ are liquid density and gas density respectively and $C_0$ and $V_{gj}$ are drift flux parameters. By applying this relationship to n=1–12, void fraction at n=1–12 can be calculated, provided that X, $\rho_g$, $\rho_f$, $C_0$ and $V_{gj}$ are known. X has been calculated in the previous step. The gas and liquid densities ($\rho_g$, $\rho_f$) at n=1–12 can be calculated by the linear interpolation method used in the calculation of fluid enthalpies in the previous step. Note that $C_o$ and $V_{gj}$ are provided at the junction cells (i.e., j=1–4). Therefore, similar to the assignment of W, $C_o$ and $V_{gj}$ points belonging to the same junction cell are assigned the values of the junction For example, $C_o^j$, $V_{gj}^j$ j=2 are assigned to n=3,4,5 and 6.

In summary, the VAD model requires a substantial amount of information from coarse nodes, including $X_e$(j= 1), W(j=1–3), $h_{fsat}$(j=1 and k=1–3), $h_{fg}$(j=1 and k=1–3), $h_f$(j=1 and k=1–3), $h_g$(j=1 and k=1–3), $\rho_g$(j=1 and k=1–3), $\rho_f$(j=1 and k=1–3), $C_o$(j=1–4) and $V_{gj}$(j=1–4). These values are supplied into the VAD model to perform calculations of interpolation, equilibrium quality, flow quality and finally the void fraction. The calculated void fraction distribution (n=1–13) is then fed back to the coarse nodes to determine a proper donor cell void fraction at each junction (j=2–4). With these new donor cell void fractions, the the next time step computation is made. The integrated THEATRe™-VAD code has been validated against a BWR core void distribution data obtained by the SIMULATE-E code.[43]

3. Recirculation Pump Model

The four quadrants homologous curves in term of the dimensionless similarity parameters (the head ratio, volumetric flow ratio, pump speed ratio, and torque ratio based on the rated values) are used to characterize the pump performance. These homologous curve data are provided by pump manufacturer. The fully degraded two phase performance curve (difference head, difference torque) and the two phase multiplier expressed as a function of void fraction, are also implemented to simulate pump performance in two phase condition. A table lookup method is to interpolate the homologous curve to get pump head and pump torque. The pump speed is calculated by a angular momentum balance from the motor torque, frictional torque and hydraulic torque. The pump heat is computed from the multiplication of pump speed and hydraulic torque. All the scenario of reactor coolant pump in a complete power plant operation can be accurately simulated such as startup, coast-down, variation speed, rotor seizure, . . . etc. Auxiliary systems, such as an electric motor, speed control system, oil circulation system, and seal water, also may be simulated, using the G-Flow™ simulation code available from General Physics International Engineering & Simulation, Inc., and integrated.

4. Boron Tracking Model

An Eulerian boron tracking model may be used that simulates the transport of a dissolved component in the liquid phase. To reduce computational cost, the following assumptions are made:
(1) liquid properties are not altered by the presence of the solute.
(2) Solute is transported only in the liquid phase and at the velocity of the liquid phase.
(3) Energy transported by the solute is negligible.
(4) Inertia of the solute is negligible.
(5) Solute is transported at the velocity of the vapor phase if no liquid is present. Under these assumptions, only one additional field equation for the conservation of the solute is required.

5. Zircaloy-Water Reaction Model

The Zircaloy-Water reaction will take place between the fuel cladding and steam when the clad temperature exceeds about 1200° C. The chemical reaction is expressed as follows:

$Zr + 2\ H_2O \rightarrow ZrO_2 + 2\ H_2 + Heat$

The reaction rate is empirically given by:

$m_o'' = A\ e^{-B/T}/m_o''$ where:
$m_o''$: total oxygen consumed (kg/m²)
A,B: empirical constants
T: clad temperature °K The mass of Zircaloy consumed in one time step dt can be expressed as:

$$dm_{Zr} = \pi l\ \sigma_{Zr}\ (r(t)^2 - r(t+dt)^2)$$

where:
$\rho_{Zr}$: density of $ZrO_2$
r(t): reacting surface radius at time t

The mass of hydrogen generated in one time step dt will be:

$dm_{H2} = (4/91.22)\ dm_{Zr}$

The heat released per kg of oxidized Zr due to this reaction is: Heat=empirical constants * $dm_{Zr}$ (watt)

6. Radioactivity Model

The transport equation of radioactive material in liquid phase is as follows:

$$\frac{\partial}{\partial t}(\rho_{Rfi}) + \frac{1}{A}\frac{\partial}{\partial x}(C_{Rfi}\alpha_f\rho_f v_f A) = -\Gamma X_i C_{Rfi} + S_f C_{sRfi} - \lambda_i R_{fi} A_i J_n \quad (34)$$

The similar transport equation for $\sigma_{Rgi}$ in gas phase is also simulated. If the mineral content of coolant in reactor vessel is kept low enough, the main radioactivity will be produced by the neutron captured by the oxygen in the water. The most important of the oxygen reactions is the $O^{16}$ (n,p) $N^{16}$ reaction. The other important sources for radioactive material are fission products which may be separately calculated and provided, e.g., by the CONCERT™ product. A constant leakage rate of fission product into coolant is assumed at normal operation conditions. When fuel cladding failure happens, the leakage rate will be dependent on malfunction severity and/or number of rods failure.

EXAMPLES

Set forth below is a discussion describing validation of the THEATRe™ code representing a full range of significant events occurring in a plant. These encompass three categories of phenomena:
1. a complete cycle of plant normal operational conditions, i.e., from midloop, via cold shutdown, hot shutdown to hot full power conditions,
2. abnormal transients, such as reactor scram and turbine trip, and 3. accidental malfunctions, such as small break LOCA and large break LOCA. Since the volume of validation results acquired is enormous, only key parameters for each phenomenon are described.

Three sources of information are used in the THEATRe™ code validation effort. The first source is the plant data, which ideally should be used for all simulation benchmarks. However, the plant data may not be available or well documented, thus in this application, plant data is used only for benchmarking plant normal operation simulation. The second source of benchmark data is simple analytical solutions. Usually these are hands-on mass and energy conservation calculations. Several analyses are performed for validating the simulation of plant normal operations. The third source represents the results of counterpart RELAP calculations. This approach is used for the validation of anticipated and abnormal transients. It is noted that at the present study the RELAP nodalization scheme for the RCS system is identical to the THEATRe™ scheme. The purpose of using similar nodalization scheme for both codes is to obtain meaningful comparison when both codes are subjected to similar real time calculational framework. This approach implies that the number of fluid cells used in the RELAP calculations may appears to be less than that required for the engineering analysis. However, the number of nodes is sufficient to produce reasonable results. In this respect, the RELAP calculations are not treated as the "correct" data. Whenever a deviation occurs between RELAP and THEATRe™, justification for the THEATRe™ results is provided. Thus, in this approach, the validity of THEATRe™ code calculation can be qualitatively determined and the real time simulation capability of both codes can be understood.

Code validation involves comparison of the calculational results against benchmark data. It is evident that to obtain accurate comparison, initial and boundary conditions (IB) for the THEATRe™ code calculations should be as close as possible ("identical") to those for the plant data or benchmark calculations. This is not an easy task, particularly, if the THEATRe™ code resides in the plant simulator and has interfaces with complex balance-of-plant system models, then the IB conditions will be determined by the dynamic interaction of the two interfacing systems. To provide the RELAP code the same IB conditions will require unnecessary tedious work. Thus, for the purpose of comparison analysis, IB conditions for the THEATRe™ code are calculated by simple subroutine (drivers). Subsequently, "similar" conditions, which may not be "identical", are imposed on the RELAP calculations.

It is important to note that there are substantially different transient phenomena take place in a PWR type integral thermal hydraulic system and they involve complex interactive cause-and-effect relationships. The strong coupling relation implies that a small deviation of one parameter, that is an IB condition, may be greatly amplified and reflected into other parameters. In fact, this has been a subject of intensive research in the nuclear community. Computer simulation of this type of phenomena thus requires "igorous" control on the IB conditions. In view of this aspect, an approach to compare the THEATRe™ and RELAP calculations can be taken in which both calculations use "identical" IB conditions. However, practically speaking, this requirement imposes a tremendous amount of tedious work which may not obtain a conclusive-understanding of the code performance. A more meaningful approach is to switch the focus away from achieving identical IB conditions on to analyzing the consequences of existing deviations.

Figure 12:
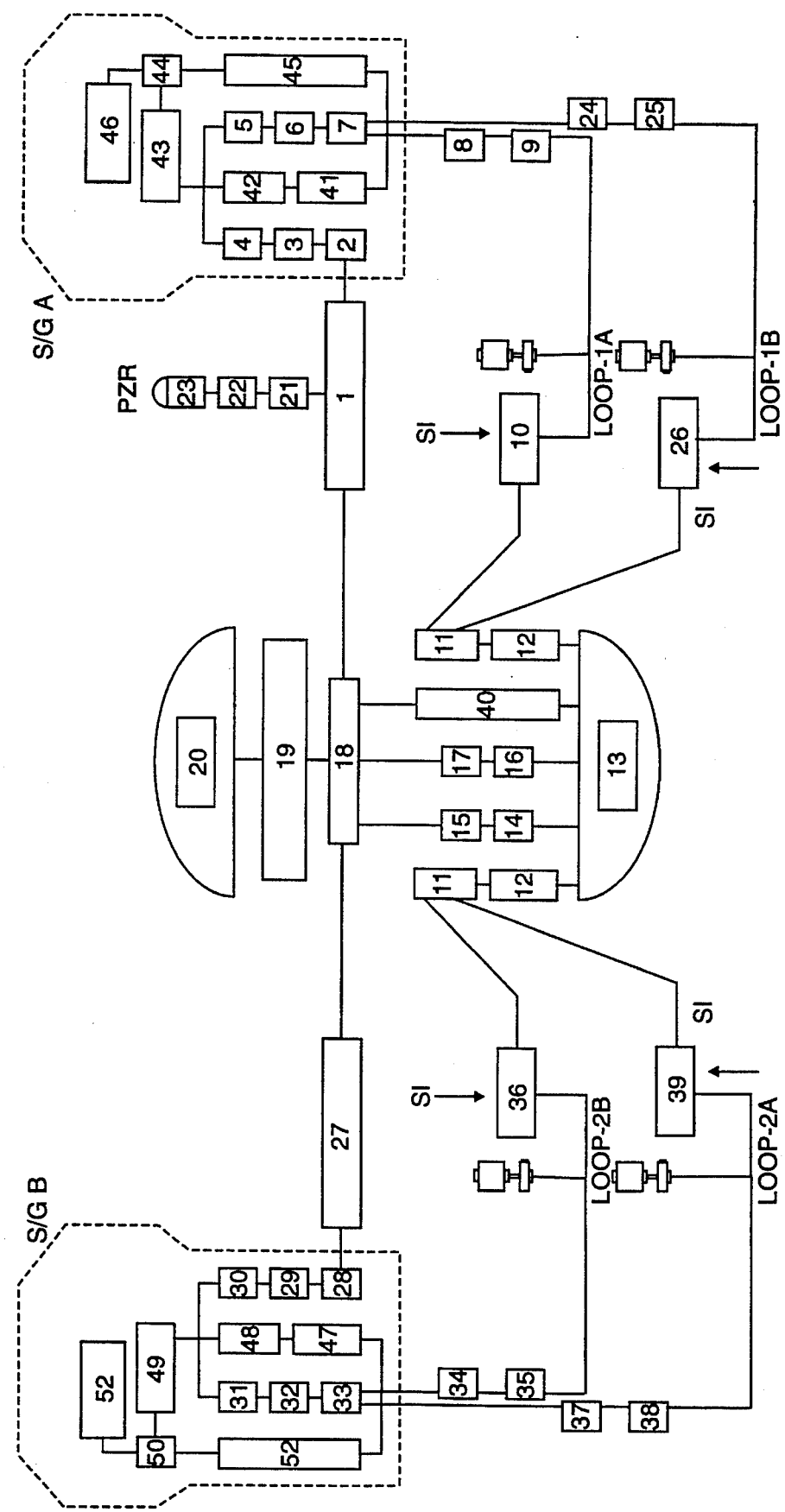
FIG. 12 is a schematic diagram of a representative power plant nodalization scheme having 52 nodes.

One representative power plant is a typical Combustion Engineering (CE) two-by-four loop configuration, which includes two hot legs, four cold legs, two steam generators S/AG and S/GB and one pressurizer. The reactor is operated at full pressure of 142 bar (2060 psia) and full power of 2530 MWt. Total volume of primary coolant system (PCS) is $-262$ m$^3$ ($-9242$ ft$^3$) and for one steam generator the volume is $-219$ m$^3$ (7734 ft$^3$). FIG. 12 illustrates the nodalization scheme. Forty nodes are used to describe the primary system and six nodes for each steam generator. Three nodes are used to simulate pressurizer behaviors (nodes 20, 21, 22). The core region is divided into one bypass channel (node 40) and two active channels—one high power zone (node 14, 15) and one low power zone (node 16, 17). Each of the two hot legs is represented by one node while each of the four cold legs is represented by three nodes. Each reactor coolant pump is represented by one fluid node (nodes 9, 25, 36, 39). Steam generator tubes are modeled by four nodes on each side (node 3, 4, 5, 6 and 29, 30, 31, 32). The secondary side of each steam generator includes six nodes: two for riser section, two for separator region, one for downcomer and one for steam dome.

1. Normal Operational Transients

Reactor Power and Temperature

During power escalation or power reduction operations, the reactor power and the primary coolant system (PCS) average temperature ($T_{avc}$) are the two most important indices to characterize the status of the reactor. The plant operators do not have direct means to control these two parameters. The control is accomplished through the regulation of PCS's "boundary conditions", such as steam flow, feedwater flow, boron concentration, control rod position, etc. For a given set of boundary conditions, the thermohydraulic interaction across the two sides of steam generator tubes and the thermo-neutronic feedback at the core play an important role in determining the core power and $T_{avc}$. The core power is calculated by a three-dimensional, one-and-one-half group, time-dependent neutronics model available from General Physics International Engineering and Simulation, Inc., Columbia, Md., U.S.A. under the Trademark CONcERT™. This advanced model calculates core power for a total of 2448 neutronic nodes based on boron concentration, control rod positions and core thermodynamic conditions (such as temperature) for each individual node. The core power in turn contributes to the core fluid temperature. For the purpose of illustrating the physical mechanism, the steady state $T_{avc}$ can be related to core power and secondary side temperature by a simple heat rate equation, that is, Core power+pump heat
=(Heat Transfer Coefficient)
* (SG tube area)
* ($T_{avc}$—Secondary Side Temperature)

The secondary temperature is determined by steam generator pressure, feedwater flow and temperature and the natural recirculation flow. Heat transfer coefficients are calculated by a re-written RELAP correlation package. The correlation package is comprehensive and covers a full range of heat transfer regimes and flow patterns. The steam generator tube area is a given geometric constant, which always remains the same for all operational conditions.

Figure 13:
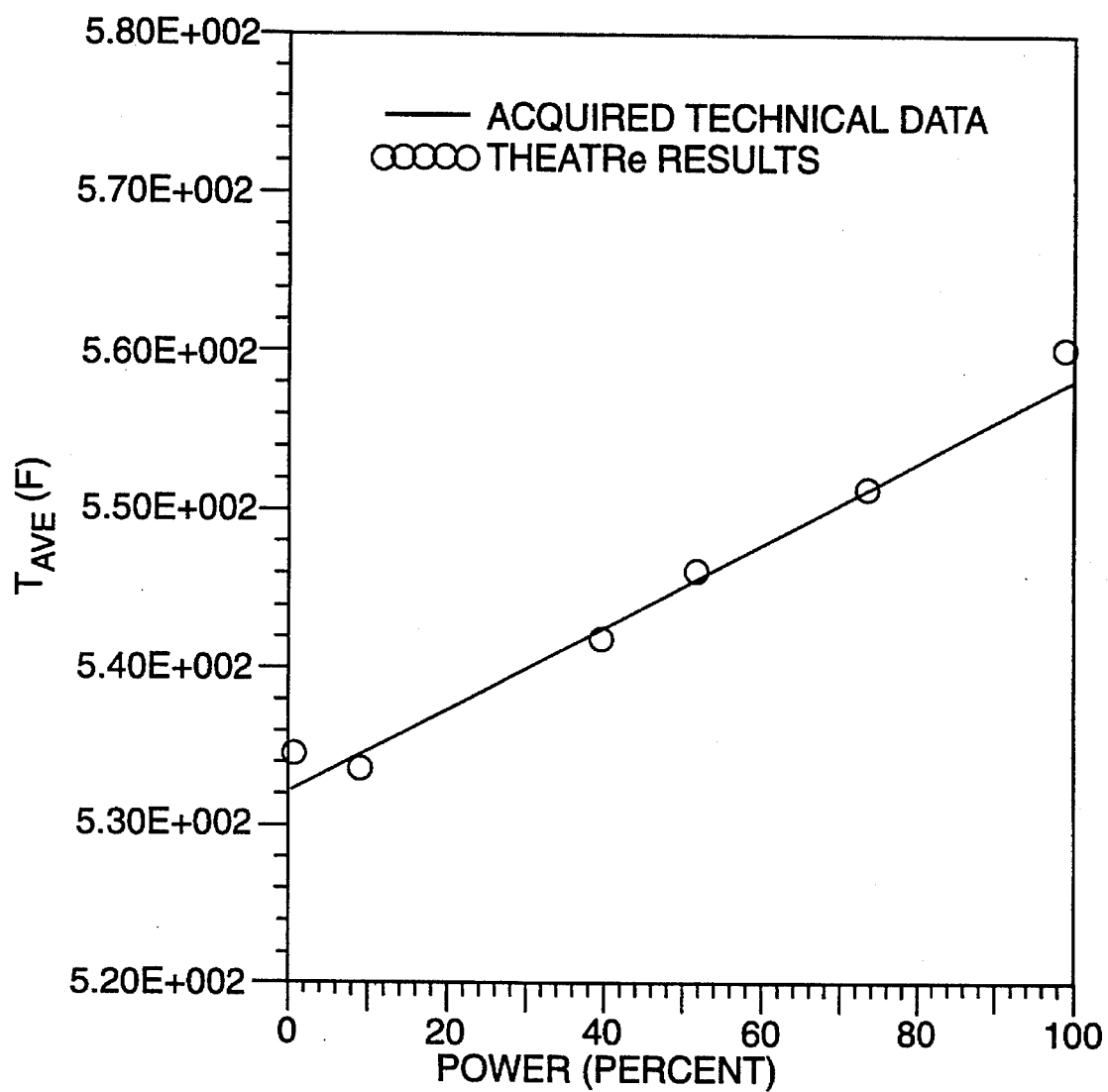
FIG. 13 is a plot of the primary coolant system average temperature in degrees F versus reactor power in percent for the power plant of FIG. 12.

Thus, accurate simulation of core power and $T_{avc}$ for a complete power range (0 to 100%) implies that the physical integrity of the simulation model is robust and sound. FIG. 13 shows that the simulated values agree well with the plant data within 0.4%. Note that the calculated values were taken directly from the representative plant simulator, ranging from hot shutdown to hot full power condition.

Pressurizer Pressure and Surge Flow

For a pressurized water reactor, the volume of pressurizer represents only a small part of the total reactor coolant system (~15%). However, a large part of operator actions are concentrated on this component. These intensive actions include control of heater power, spray flow and vent flow. This component is used for a simple purpose, that is to control the reactor coolant system pressure at a value such that proper subcooling margin can be maintained in the coolant loops. From physical point of view, the pressurizer pressure response is a synergistic result of several significant mechanisms: liquid vaporization (due to heater power and outsurge), vapor condensation (due to spray flow and out-surge), phase separation (bubble rise), fluid cooling (due to heat loss to containment), mass injection (due to in-surge flow) and mass depletion (due to out-surge flow). The surge line flow is crucial to the pressure response, but can not be regulated by operators. The surge line serves as the only communicating channel between a small vessel filled with stratified compressible two phase fluid and a large vessel filled with highly incompressible single phase liquid. Thus, the response of surge flow represents the combined effect of incompressible fluid expansion and contraction, and mass imbalance due to flow injection and depletion. The amount of surge flow is very small compared with the substantially large RCS mass inventory (~440000 lbm). Note that, usually for a steady state condition, the surge flow should equal zero.

It is evident that stable and accurate simulation of pressurizer pressure and surge flow requires physically reasonable simulation of the six major mechanisms and an almost exact calculation of mass and energy balances. From numerical point of view, an accurate momentum treatment for pressurizer junctions is also equally important to simulate the nearly-static fluid movements in a dead-end volume. Note that the combined volume of pressurizer and surge line is modeled by three fluid nodes and two fluid junctions. A special "tee" junction is applied to simulate flow in the long and thin surge line, which attaches to a hot leg perpendicularly. All the simulation tests presented in this application validate the THEATRe™ code pressurizer performance. An excellent illustration can be found in simulation of stable pressure and surge flow at a steady state power condition for the representative power plant. The plant pressurizer is operated at an unusual condition. For 100% hot full power condition, all the backup heaters (1.35 MW) are always turned on to make up relatively large heat loss of the reactor coolant loops. Only the remaining 0.15 MW proportional heater power is used to regulate the pressure. Consequently, to achieve a steady state condition (constant pressure and level in pressurizer, no charging and letdown flows), a small amount of surge line flow is required to carry hot fluid from pressurizer to coolant loop, in return, an equal amount of cold fluid should be removed from cold legs and enter the pressurizer as the spray fluid. For this type of operation, the surge flow should approach to the following value, i.e., Surge flow = (1.35 MW − pressurizer heat loss)/
(enthalpy of out-surge fluid −
enthalpy of spray fluid)

Figure 14:
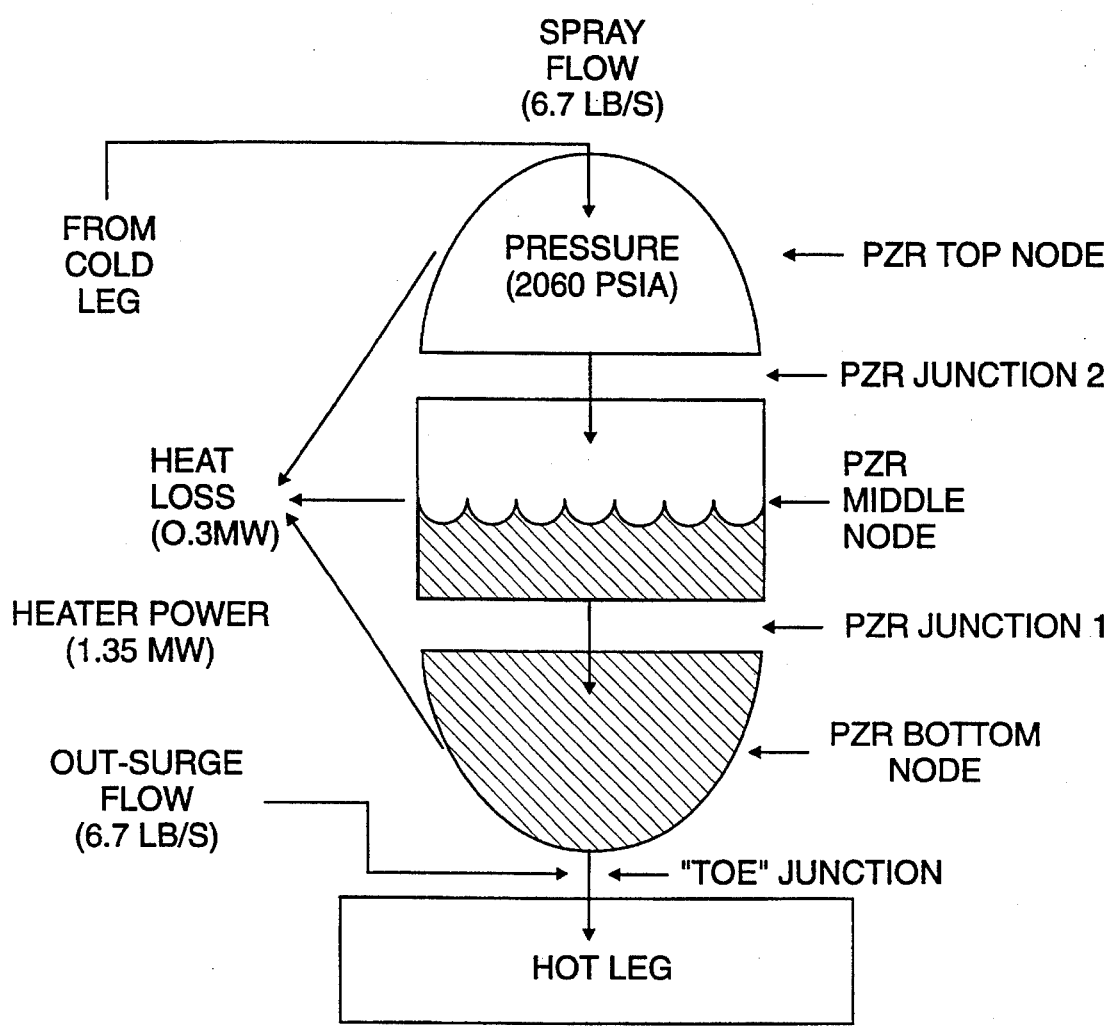
FIG. 14 is a schematic illustration of the heat flow balances for the pressurizer of the power plant of FIG. 12.

The out-surge fluid enthalpy can be approximated as the saturation enthalpy of the pressurizer pressure and the enthalpy of spray fluid is close to the cold leg fluid enthalpy. Thus, the out-surge flow is estimated as 8.6 lbm/sec. This value is close to the THEATRe™ calculated value (~6.7 lbm/sec) with a deviation (~1.9 lbm/sec), which can be accounted for by the pressurizer heat loss (corresponding to ~0.3 MW of heat loss). FIG. 14 illustrates the heat and flow balances for the pressurizer.

Liquid Injection and Depletion of a Solid Reactor

Coolant System (Cooldown Operation)

This simulation test was specifically designed to validate the capability of a complex two phase thermohydraulic code to handle correctly rapid transients of a system filled with only highly incompressible liquid. The complex two phase equation model should be automatically degenerated to calculate single-phase phenomena, particularly for rapid responses. The test is two fold, i.e., rapid pressurization and rapid depressurization in a compressed single-phase system. After the shutdown cooling mode is initiated during the plant cooldown process, charging flow is increased to make up the coolant shrinkage and to fill up the system. When the pressurizer is almost solid, the pressure control is switched from manual to automatic mode. Right before the switching, plant operators have to carefully control letdown valve and charging pumps such that the system will not be overpressurized by inadvertent injection of highly incompressible water. Note that at this moment, little air cushion exists to absorb abnormal pressure surge. In this application, a test is conducted by an inadvertent operation, that is, too much charging flow is supplied into the system causing pressure spike.

Figure 15:
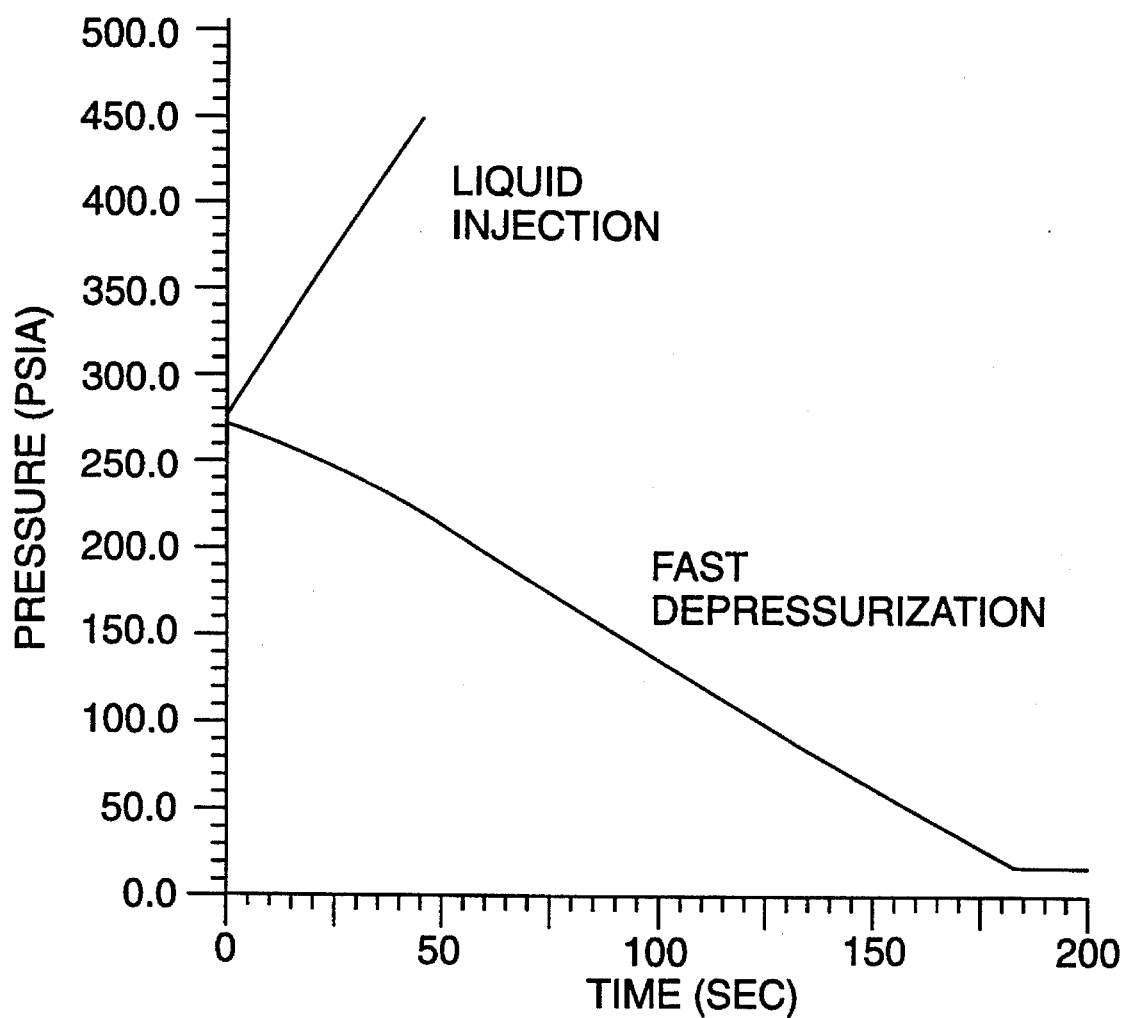
FIG. 15 is a plot of the liquid injection and fast depressurization at pressurizer solid condition, in pressure (psia) verses time (seconds) of the power plant of FIG. 12.

The initial conditions for this case were taken from the representative power plant simulator at the moment when the pressurizer became solid. All the initial boundary conditions (charging and letdown flows) are the same as those in the simulator. FIG. 15 shows the system pressure transient. Before the transient is initiated, the net flow into the system is 26 GPM(1.6e−3 m³/s), which delicately balances the volume of coolant shrinkage due to plant cooldown and thus maintains the system pressure at 271.4 psia(18.46 bar). The transient is introduced by injecting more coolant into the system (totally 64.86 GPM(4.0e−3 m³/s)) and the pressure rises immediately. The pressure increases 181(12.31) psi in 45 seconds at a roughly linear rate (dP/dt=4.02 psi/sec(0.273 bar/s)). Using the same initial condition described above, depressurization rate is validated by increasing the letdown flow. As the system loses compressed liquid, the pressure decreases and the liquid expands. Thus, the volume of depleted liquid is made up by the expanded liquid volume. As the pressure goes down, the saturation temperature drops accordingly and approaches to the coolant temperature. As long as system coolant remains subcooled, the coolant will not flash. The plant operators will have to carefully control the amount of depleted liquid to prevent the occurrence of vapor generation. FIG. 15 illustrates that the system pressure drops from 271.4 psia(18.46 bar) to 15.5 psia(1.05 bar) within 183 seconds at a linear rate of dP/dt equals −1.398 psi/sec(−0.095 bar/s). The depressurization rate obtained from the THEATRe™ code calculation is close to real plant operation.

Simple analytical solutions exist for the two problems described above. From analytical point of view, we can treat the whole system as a control volume with negligible in-out-flow through control surface. According to thermodynamic laws, pressure is a function of two independent states—density and temperature. That is $$P_{sys} = P_{sys}(\rho, T_{sys}) \tag{35}$$

After differentiating with time, Equation 35 becomes $$\frac{dP_{sys}}{dt} = \frac{\partial P_{sys}}{\partial \rho}\bigg|_{T_{sys}} \cdot \frac{\partial \rho}{\partial t} + \frac{\partial P_{sys}}{\partial T_{sys}}\bigg|_{\rho} \cdot \frac{\partial T_{sys}}{\partial t} \qquad (36)$$

Since the transient time of the above two processes is short, we can assume that they are almost adiabatic processes with negligible temperature changes. Using this assumption, Equation 36 can be rearranged to a form which describes an approximate relationship between pressure gradient and mass inventory gradient. Equation 36 becomes $$\frac{dP_{sys}}{dt} \approx \frac{\partial P_{sys}}{\partial \rho}\bigg|_{T_{sys}} \cdot \frac{\partial \rho}{\partial t} \qquad (37)$$

$$= \frac{1}{V} \cdot \frac{1}{\frac{\partial \rho}{\partial P_{sys}}\bigg|_{T_{sys}}} \cdot \frac{\partial M}{\partial t}$$

where M is mass inventory, V is system volume.

According to the NBS/NRC steam table, $(\delta\rho/\delta P_{sys})_{T_{sys}}$ is almost constant ($1.757548 \times 10^4 \sim 1.79485 \times 10^4$ lbm/ft$^3$. psia($0.0415 \sim 0.0424$ kg/m$_3$. bar)). The estimated pressure gradient dP/dt for these two transients are 4.260 psi/sec(0.29 bar/s) at $\delta M/\delta t$ equals 8.25836 lbm/sec(3.753 kg/s) and $-1.097556$ psi/sec($-0.0746$ bar/s) at $\delta M/\delta t$ equals $-2.09385$ lbm/sec($-0.952$ kg/s) respectively. These estimated values agree well with computational results, i.e., dP/dt=4.02 psi/sec(0.273 bar/s) at $\delta M/\delta t$ equals 8.25836 lbm/sec(3.753 kg/s) and $-1.398$ psi/sec(0.0951 bar/s) at $\delta M/\delta t$ equals $-2.09385$ lbm/sec($-0.952$ kg/s). The minor discrepancies can be attributed to the imposed adiabatic assumption.

Midloop Operation

Simulation of a steady state midloop condition is one of the most difficult tasks for a complex thermohydraulic code. The challenges are in many folds. In the region above the liquid level, most of the space is filled with noncondensible gas (air) and thus the steam partial pressure is extremely low, $p_{sys}$ is near 0.4 psia(0.0272 bar). Simulation code should be able to overcome the difficulty of handling gas diffusion in this region. If large gas diffusion is encountered, over-depletion of steam inventory in one or more fluid nodes may occur numerically. In such case the steam partial pressure reaches beyond the limit of steam table and it leads to code failure. The validity of interfacial heat transfer correlations in this low steam partial pressure range also requires additional attention. Incorrect prediction of interfacial heat transfer coefficient values may cause over-condensation of steam or over-flashing of liquid, which then lead to numerical instability. At low pressure, $p_{sys} \sim 0.4$ psia(0.0272 bar), these numerical problems are much more likely to take place than at high pressures since the liquid to steam density ratio is extremely high (43200 at 0.4 psia(0.0272 bar) compared with 7 at 2060 psia (140.14 bar)). In addition to these two aspects, stable simulation of a steady state midloop condition in a complex two-by-four multiloop configuration requires perfect momentum balance calculations. If momentum balance can not be maintained, manometer oscillation can be numerically introduced and the above mentioned instabilities may be magnified. Eventually it will result in code failure.

Figure 16:
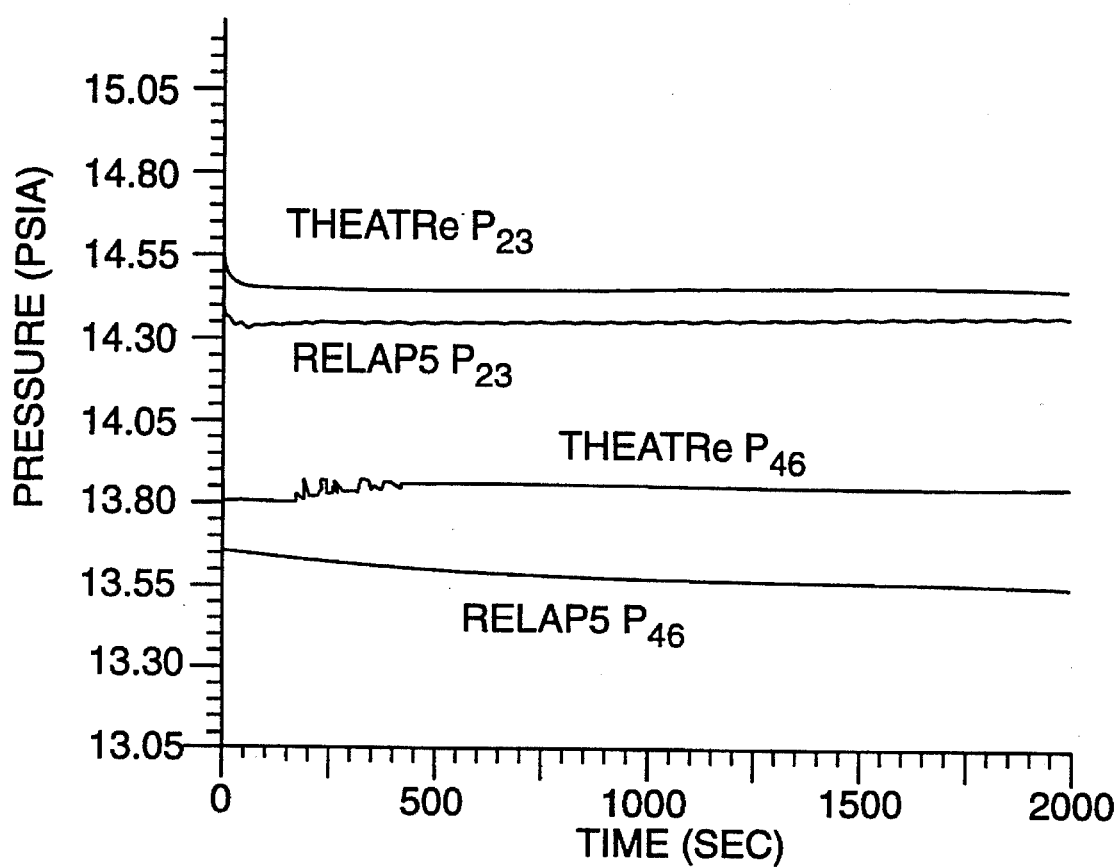
FIG. 16 is a plot of the pressure at the primary and secondary sides comparing the RELAP5 and THEATRe code results during the midloop initialization process over time for the power plant of FIG. 12.
Figure 17:
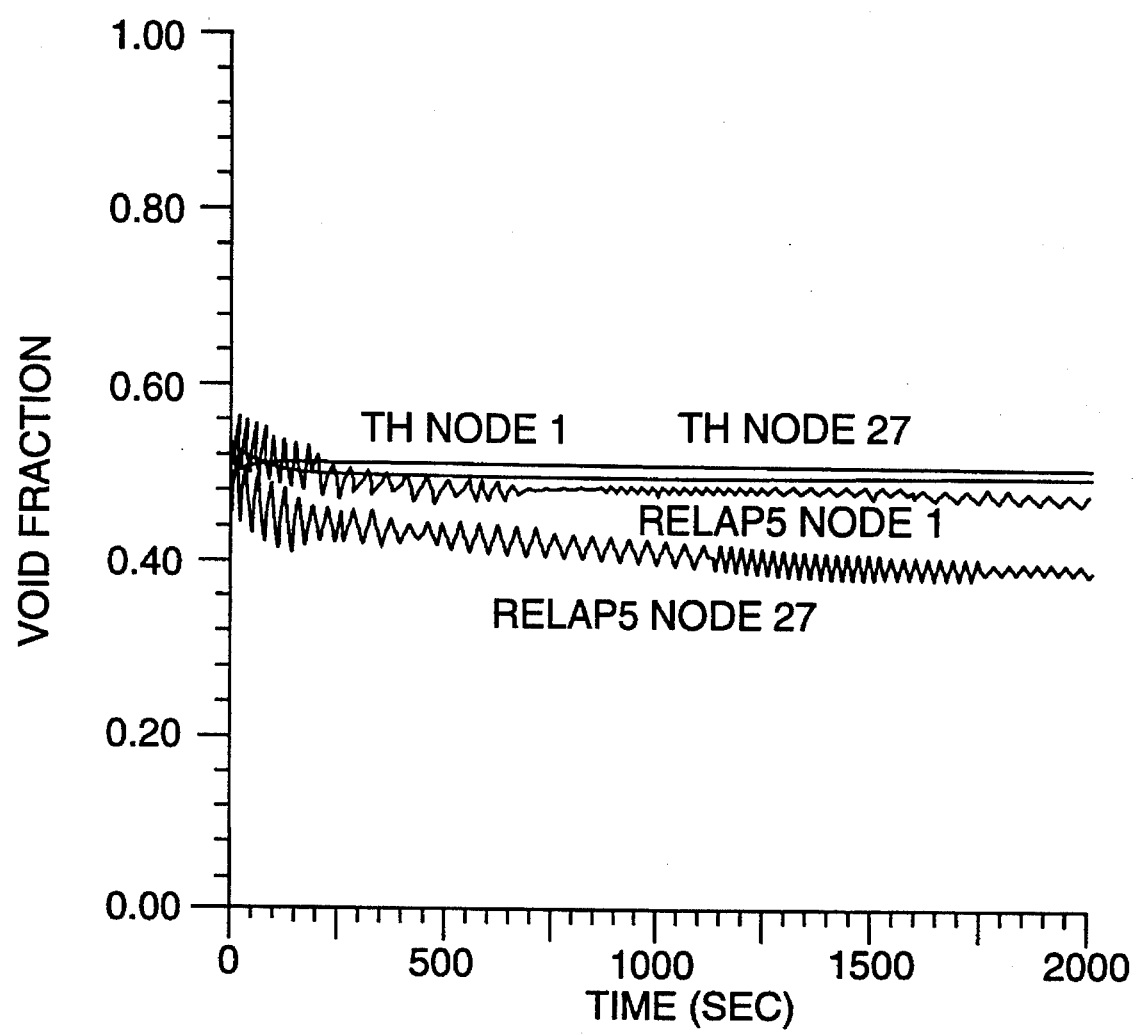
FIG. 17 is a plot of the void fraction at the hot legs comparing the RELAP5 and THEATRe code results during the midloop initialization process over time for the power plant of FIG. 12.

As previously discussed, extremely long hours of liquid inventory draining process is required before the system reaches a midloop condition. In this simulation test, the calculation of such a long draining process is intentionally avoided. The steady state midloop calculation is initialized from a given set of good approximate conditions. The initial midloop steady state conditions are obtained by careful hand-calculation and are assigned to each node of the system. FIGS. 16 and 17 show the comparison of THEATRe™ and RELAP code calculations for 2000 seconds simulation. The pressures obtained by THEATRe™ at both primary and secondary sides indicate stable and converging results (see FIG. 16). The converging process is further illustrated by the void fractions in two hot legs (see FIG. 17). Initially the void fractions assigned to two hot legs are purposely given a small deviation ($\alpha_1=0.7357$, $\alpha_0=0.5991$). Consequently manometer oscillations is introduced. In 100 seconds of calculations, the oscillation is damped out and the small void fraction deviation is confined within 0.01 in the THEATRe™ results, however, the RELAP results indicates persistent oscillations. After 2000 seconds calculation, the pressure at steam generator dome is decreasing and the deviation of void fraction at both hot legs is magnifying.

It is interesting to note that despite the unphysical RELAP performance, the calculational result is stable. This is different from the RELAP 8-nodes steady state initialization calculational results. The simple 8-node calculation was performed with similar steam and liquid conditions, except that noncondensible gas was not present. Thus the total pressure in the 8-node case was the same as the steam partial pressure. The 8-node results eventually diverged. It is believed that the noncondensible treatment for the interfacial heat transfer coefficients plays an important stabilizing role in the present RELAP midloop calculation. Because of the presence of noncondensible gas, the interfacial heat transfer coefficients are substantially reduced. In fact, a careful check of the interfacial heat transfer coefficient value in a two phase node (hot leg node 1) indicates that the value is further attenuated (unreportedly). According to the RELAP minor edit outputs, the flow regime is horizontally stratified with a noncondensible quality of 0.979. The liquid state is slightly superheated and void fraction is 0.48338. Using the reported thermodynamic properties and appropriate geometric constants, the associated $H_{if}$ correlation documented in the RELAP manual[27] gives a value which is approximately 25 times larger than the value obtained in the RELAP minor edit outputs. The hand calculation considers the noncondensible gas treatment, the upper/lower bound check and the coefficient-lag. It is suspected that the $H_{if}$ value is reduced from the correlation value but the treatment is not clearly documented in the code manual. Note that similar treatments are also taken by the THEATRe™ code to reduce the interfacial heat transfer coefficient values calculated by the documented correlations at this low pressure condition. The THEATRe™ calculational results independently confirm that the attenuation of coefficients is essential to the calculational stability. The treatment appears to be artificial, in fact, it exposes the deficiency of correlations at sub-atmospheric pressure conditions. Note that the correlations used in RELAP, which are also implemented in THEATRe™, were mostly developed at pressures above atmospheric condition.

Bubble-Drawing Process (Heatup Operation)

The bubble-drawing operation is one interesting event taking place in the long heating up process. As previously discussed, this event is commenced by increasing the let-down flow from a solid reactor coolant system. The liquid in the system loop is substantially subcooled (~100° F.(310.78° K.)), however, liquid in the pressurizer is only slightly subcooled. Since the pressurizer fluid is close to saturation (i.e., slightly compressed), thus as soon as the liquid is released, the slightly compressed liquid expands, pressure decreases and fluid in the pressurizer becomes superheated. Immediately, the superheated liquid flashes to steam. In the mean time, bubbles are also generated by the heat addition (from heaters) to the saturated liquid in the bottom of the pressurizer. All the generated bubbles fill up the space previously occupied by the released liquid. Since the vacated liquid space is continuously filled up by the generated steam, the initially decreasing pressure (due to the release of subcooled liquid) is then held up. If the volume of the generated steam exceeds the vacated liquid space volume, then the generated steam will be compressed and the pressure rises. On the other hand, the pressure will decrease or stay at a constant value. Regardless of the pressure response, the water level continuously recedes as long as the letdown flow persists. This process prolongs until the water level in the pressurizer reaches the normal operating condition.

Figure 18:
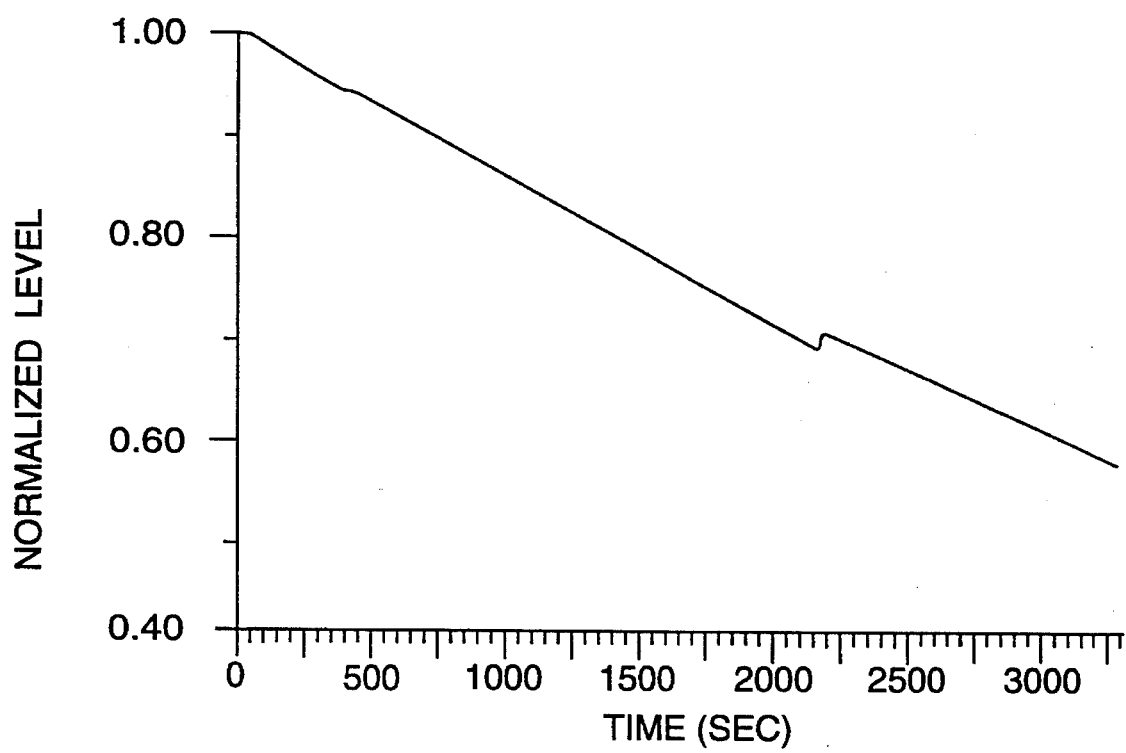
FIG. 18 is a plot of the normalized water level over time during the bubble drawing (voiding) process in the pressurizer of the power plant of FIG. 12.
Figure 19:
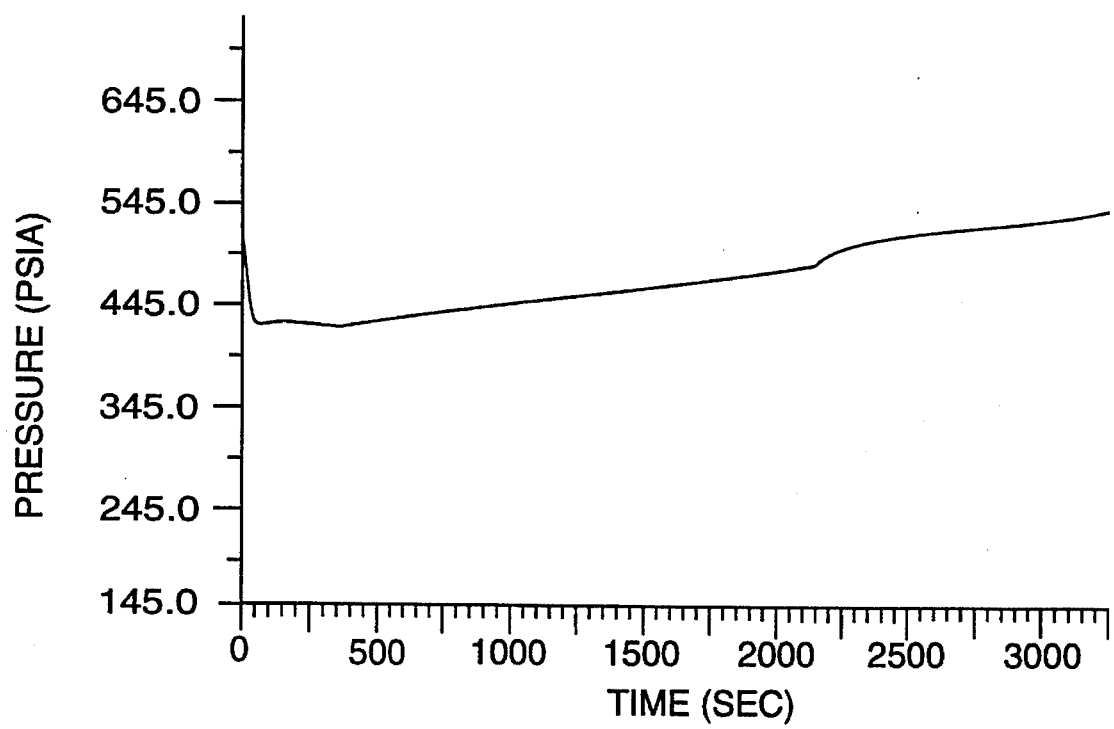
FIG. 19 is a plot of the pressurizer pressure history versus time during the bubble drawing process for the power plant of FIG. 12.

The described phase change process presents as a challenging numerical problem. Accurate simulation requires smooth transition between two phase and single-phase and exact mass and energy conservation. For the present test, the initial condition is taken from the representative power plant simulator. Pressure in the pressurizer is at 517.6 psia(35.21 bar) and the temperature is 506° F.(536.33° K.). Initially, the letdown flow is increased to 150 GPM(9.25e−3 m³/s) to launch the bubble-drawing calculation. FIG. 18 shows the voiding process in pressurizer. The water level smoothly decreases, except that at 2150 seconds the calculation produces a small jump. It is due to the flow regime transition (from stratified to bubbly) which occurs when the liquid level passes through the junction between node 22 and node 23. FIG. 19 shows reasonable system pressure response. The pressure drops initially, then stays at a relatively constant value for about 300 seconds and gradually rises afterwards. It appears that the space of vacated letdown flow is not enough to accommodate all the generated bubbles.

A quantitative estimation of steam volume balance in the pressurizer is made to verify the calculated liquid level response. The vacated liquid space (via surge line flow) is assumed equal to the generated steam space. That is $$\frac{W_{surge}}{\rho_f} = \frac{dV_{steam}}{dt} \tag{38}$$

Since the coolant was being heat up during this process, the expanded volume contribute to the letdown flow, that is $$\frac{W_{surge}}{\rho_f} = \frac{W_{letdown}}{\rho_f} - \frac{dV_{liquid\ expansion}}{dt} \tag{39}$$

After combining Equations 38 and 39, we have $$\frac{W_{letdown}}{\rho_f} - \frac{dV_{liquid\ expansion}}{dt} = \frac{dV_{steam}}{dt} \tag{40}$$

In Equation 40, the left-hand-side estimate value, 102 GPM(6.29e−3 m³/s), agrees well with the right-hand-side code calculated value, 109 GPM(6.722e−3 m³/s). However, the calculated value appears to be slightly larger. The discrepancy is expected due to the thermodynamic properties used in the estimation of liquid expansion volume. Sound mass and energy balance calculation of THEATRe code is verified in this test.

2. Abnormal Operation Transients Reactor scram and Turbine Trip

In order to obtain further comparison analysis, the two sets of IB conditions supplied to the THEATRe™ code calculation and its counterpart RELAP calculation include two noticeable differences. The liquid in the bottom node of the pressurizer is initially slightly subcooled by 0.03 degree C. for the THEATRe calculation (TH), but it is subcooled by 0.6 degree C. for one RELAP calculation (RE-1) and 7 degree C. for another (RE-2). The initial steam generator mass inventory of the RELAP calculations (RE-1 and RE-2) is higher by 10% than the THEATRe calculation (TH). Otherwise, both code calculations use similar IB conditions. The transient calculations are initiated by reducing the core power to ~5% (126.5 MW) to imitate core scram and by decreasing the main steam flow to ~5% to simulate turbine trip. At the same time, the pressurizer spray flow is turned off and the heater power is maintained at roughly 1.35 MW. The steam generator feedwater flow is calculated by a simple driver routine to maintain a constant level.

Figure 20:
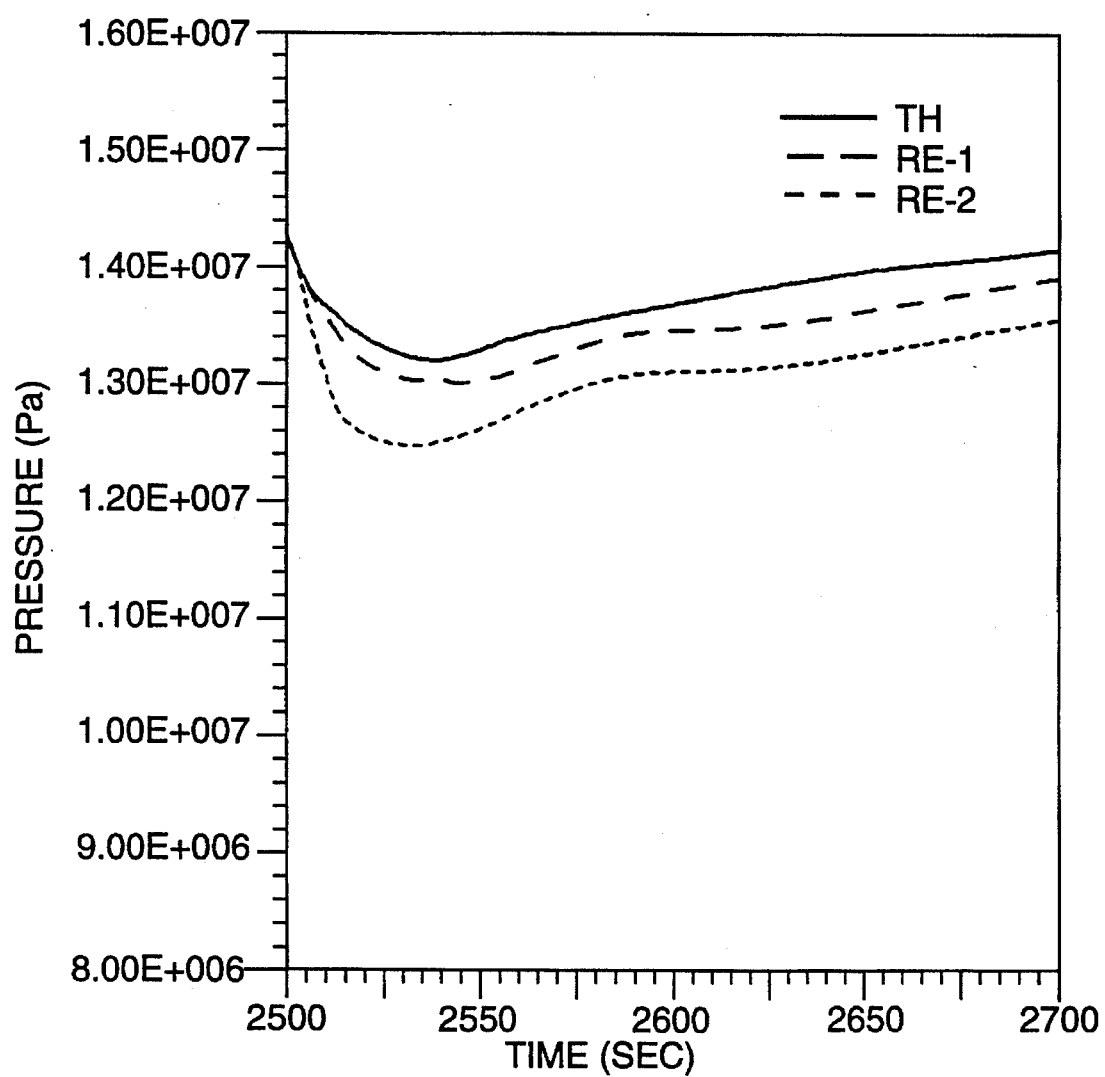
FIG. 20 is a plot of the pressurizer pressure response over time for the reactor scram and turbine trip conditions, comparing the THEATRe and RELAP5 codes.

FIG. 20 presents the pressurizer pressure responses of THEATRe and RELAP for 200 seconds of transients (2500 to 2700 sec). The three calculations show similar characteristics and some noticeable differences. In fact, the differences reveal interesting cause-and-effect physical mechanisms and thus indicate the robustness of both codes. The pressurization responses after the first 40 seconds of transients are similar for three calculations. They show roughly the same pressurization rate (−0.225 bar/sec). For the first 40 seconds (time<2540 sec), TH and RE-1 reveal a small deviation of the pressure drop (−2 bar). The deviation can be attributed to the small variation of the initial subcooling of liquid in the bottom node of the pressurizer (0.03 vs 0.6 degree C.). This cause-and-effect relation is further illustrated by the comparison of pressure drop between RE-1 and RE-2. Note that the only different IB condition existed between RE-1 and RE-2 is the initial liquid subcooling (0.6 vs 7 degree C.). RE-2 has a larger liquid subcooling and produces a substantially larger depressurization than RE-1, i.e., −5 bar larger. More liquid subcooling of fluid which surrounds the heaters will lead to less vaporization. In a depressurized pressurizer (caused by out-surge), less vaporization will have smaller contribution to retard the depressurization rate. Thus, more liquid subcooling generates stronger depressurization rate. The differences of initial liquid subcooling seem not significant; however, it leads to a significant difference in pressure drops.

Figure 21:
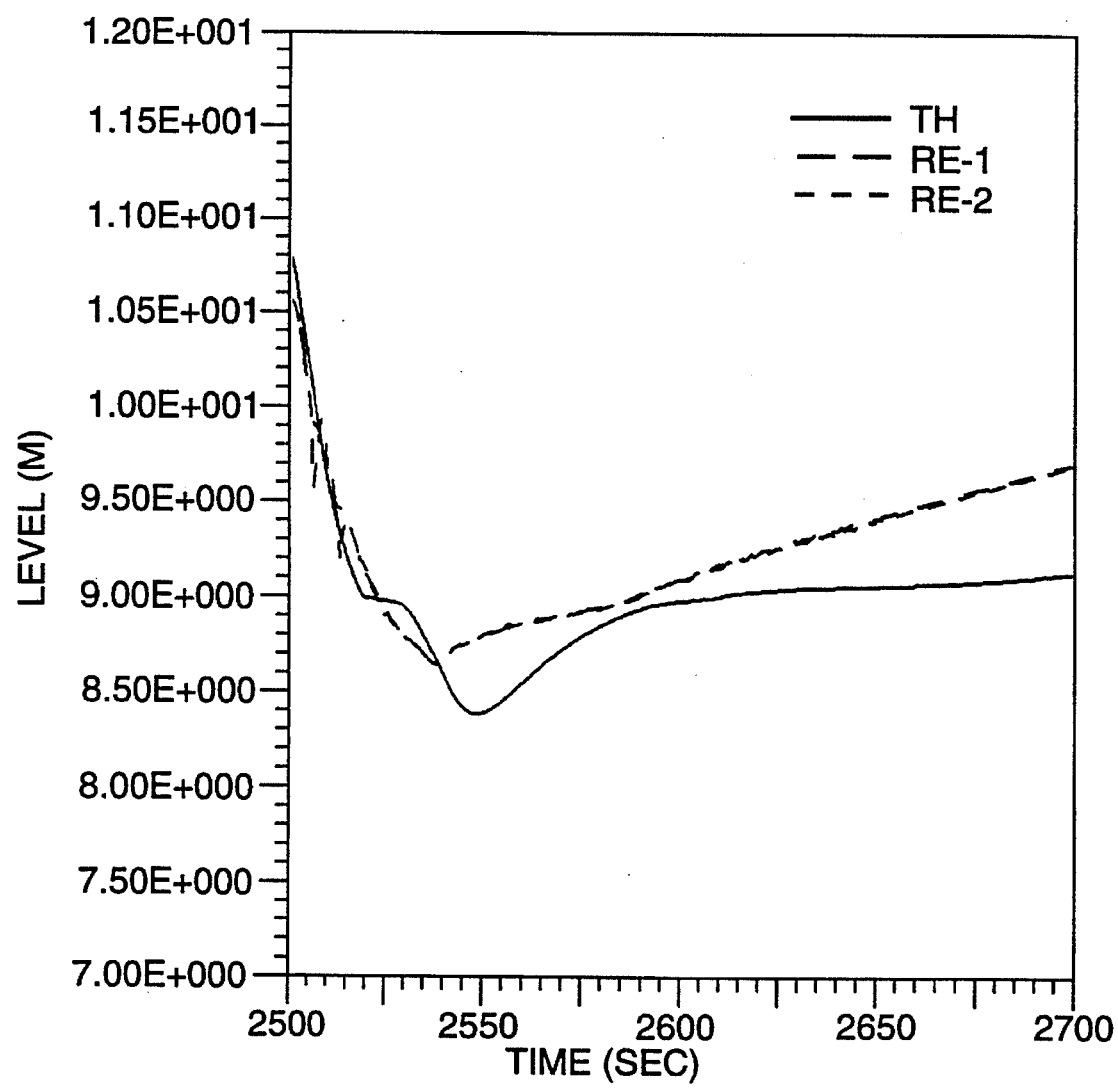
FIG. 21 is a plot of the steam generator liquid level over time for the reactor scram and turbine trip conditions of FIG. 20, comparing the THEATRe and RELAP5 codes.
Figure 22:
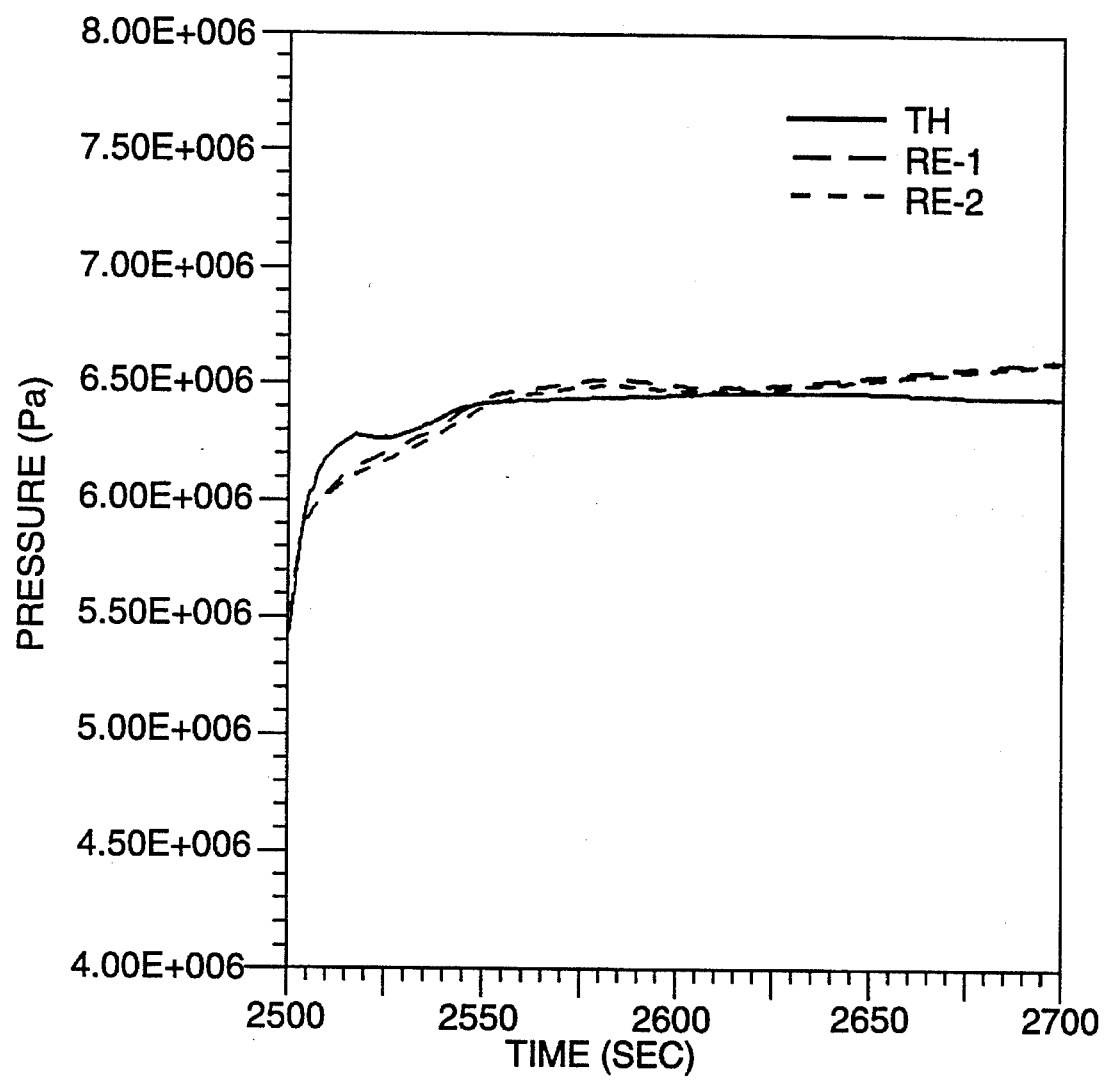
FIG. 22 is a plot of the steam generator dome pressure over time for the reactor scram and turbine trip conditions of FIG. 20, comparing the THEATRe and RELAP5 codes.
Figure 23:
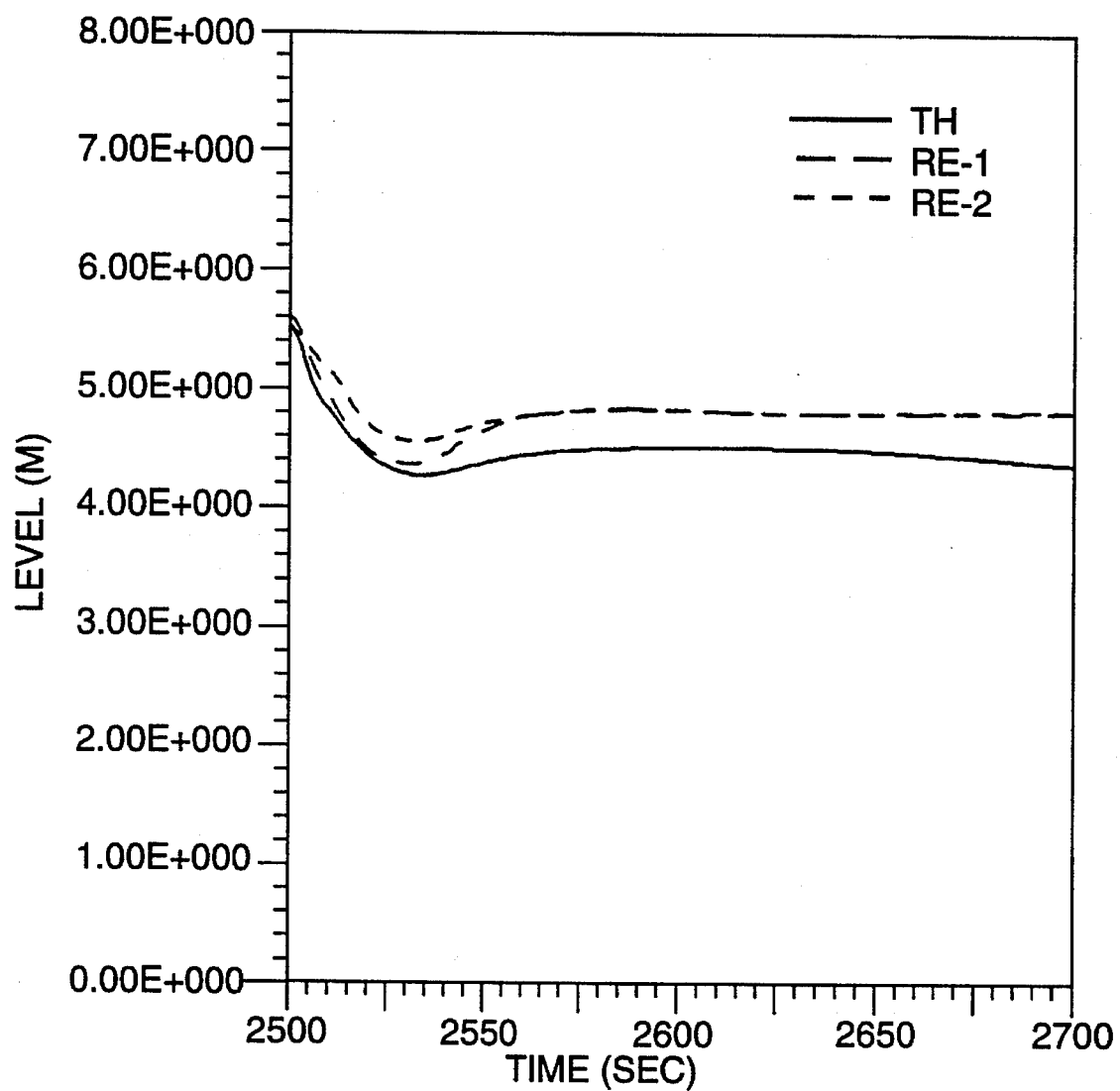
FIG. 23 is a plot of the pressurizer liquid level over time for the reactor scram and turbine trip conditions of FIG. 20, comparing the THEATRe and RELAP5 codes.
Figure 24:
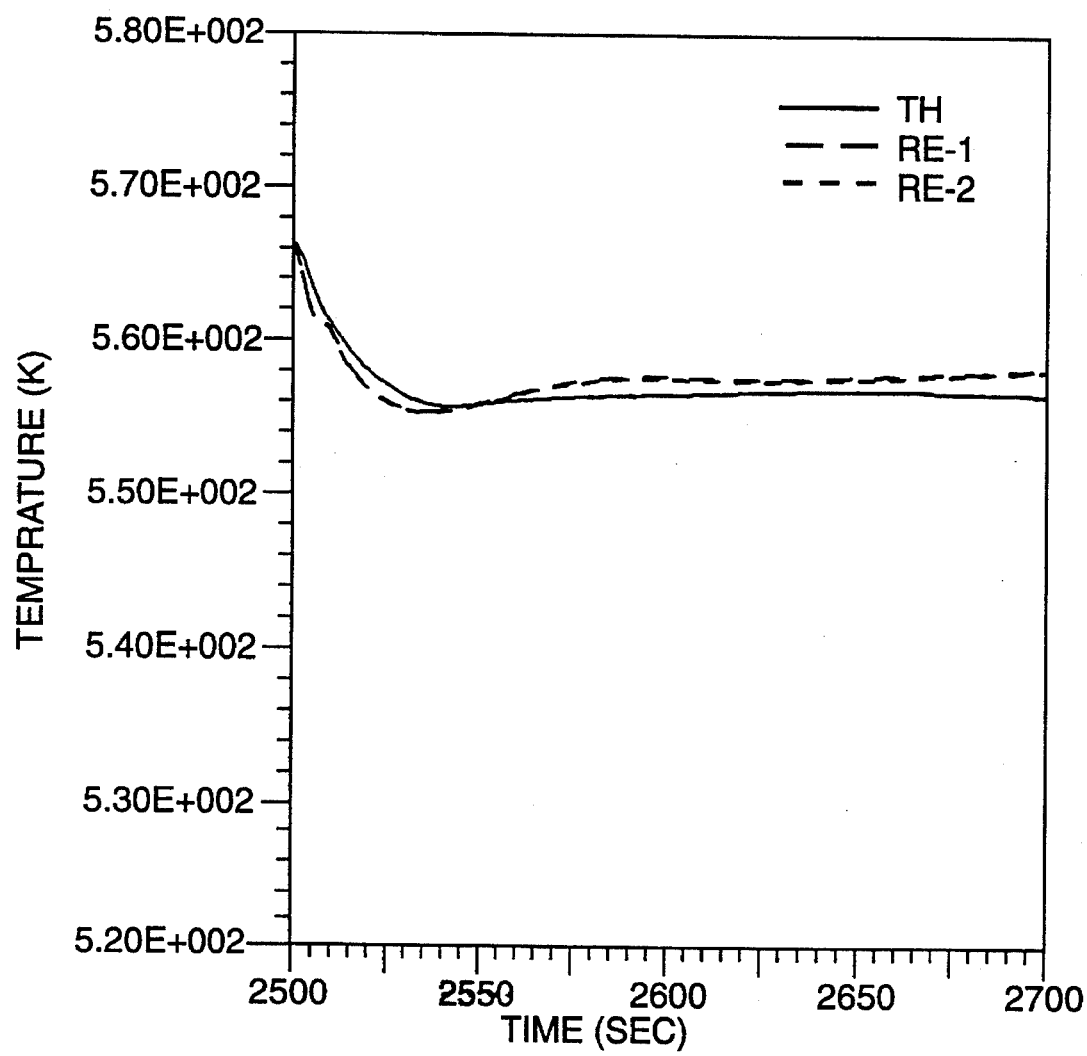
FIG. 24 is a plot of the PCS average temperature (degrees Kelvin) over time for the reactor scram and turbine trip conditions of FIG. 20, comparing the THEATRe and RELAP5 codes.
Figure 25:
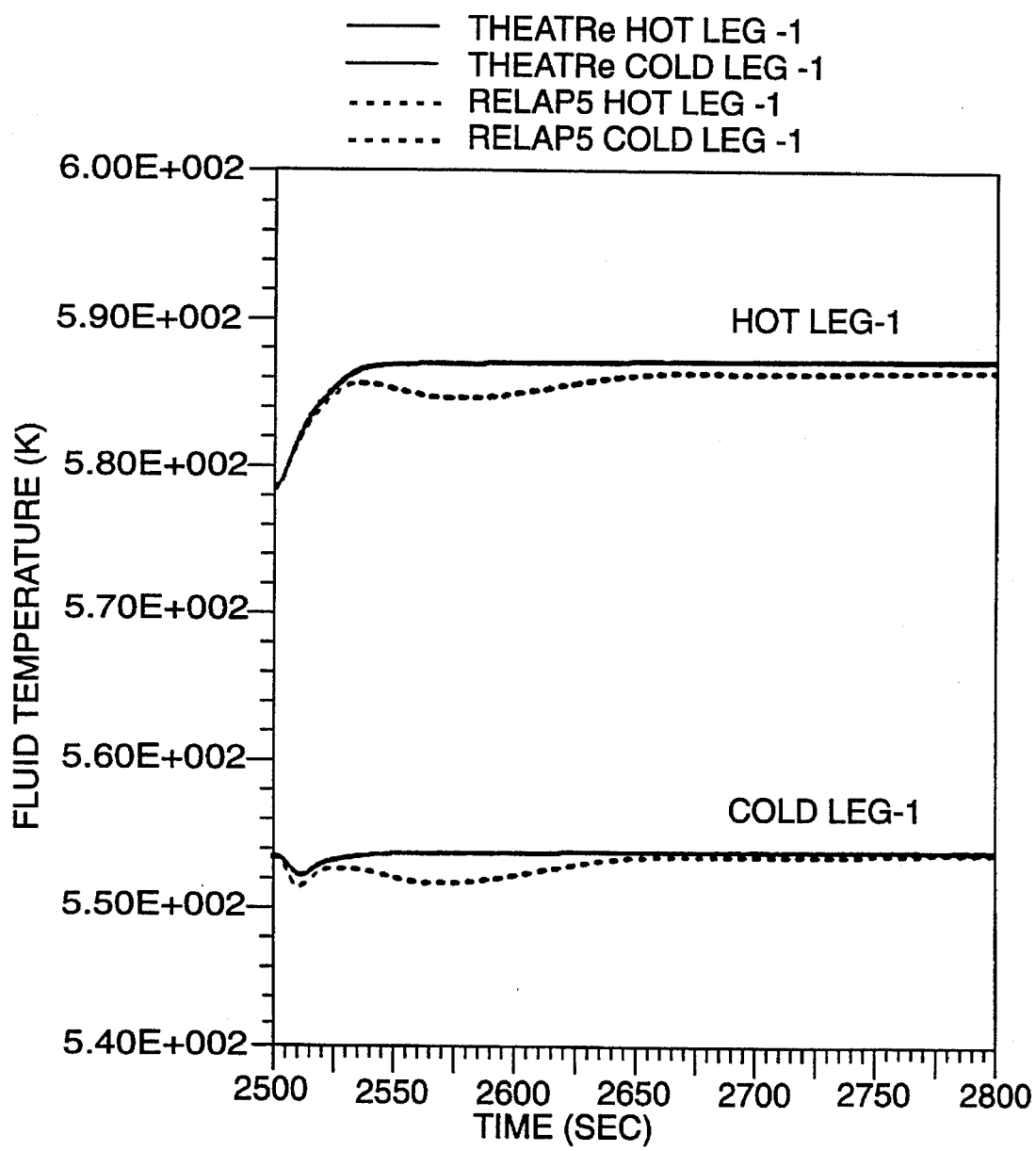
FIG. 25 is a plot of the fluid temperature (degrees Kelvin) in the hot and cold legs over time for a one reactor coolant pump trip, without reactor scram conditions, comparing the THEATRe and RELAP5 codes.
Figure 26:
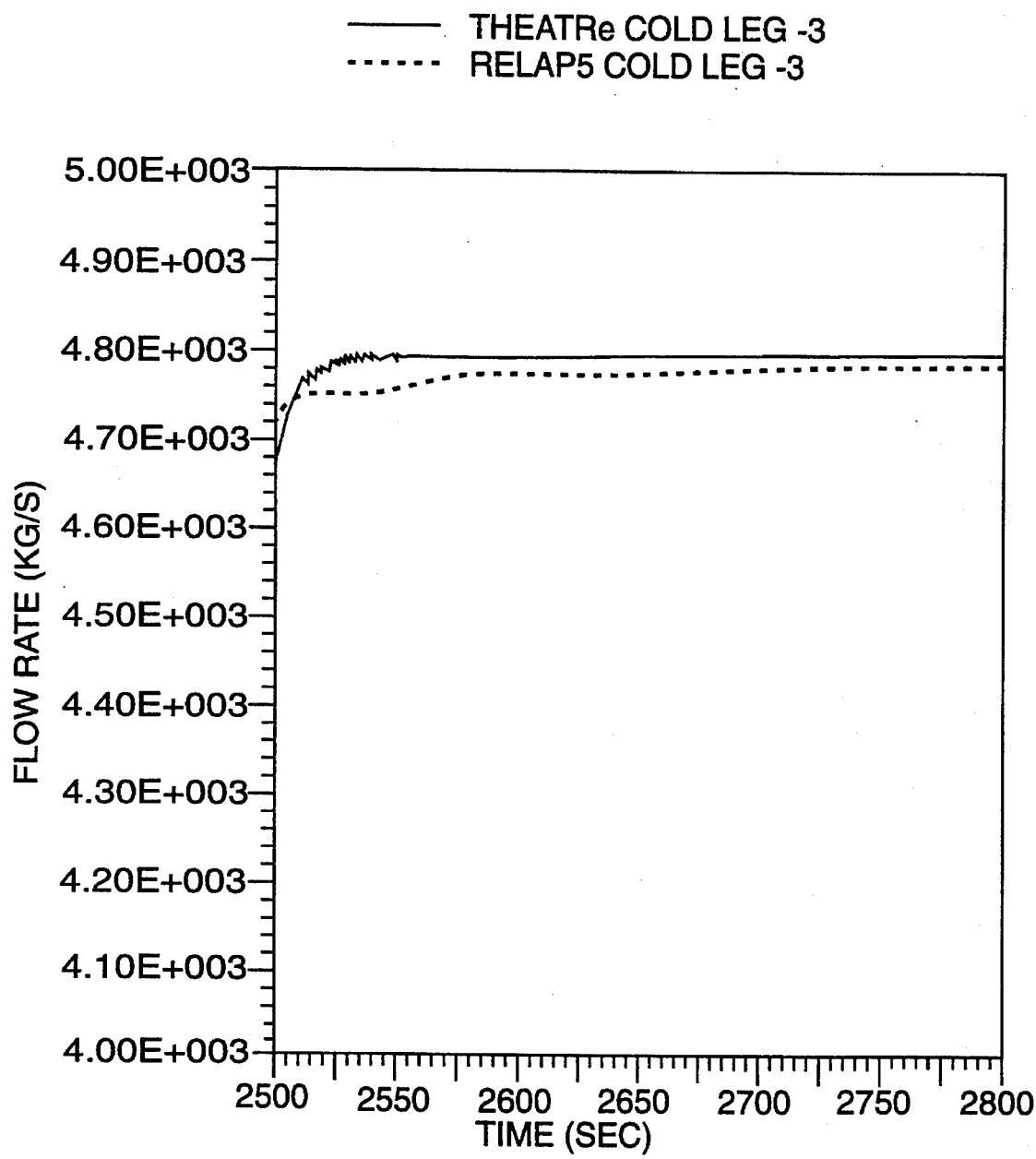
FIG. 26 is a plot of the flow rate in the cold legs over time for the one reactor coolant pump trip condition of FIG. 25, comparing the THEATRe and RELAP5 codes.
Figure 27:
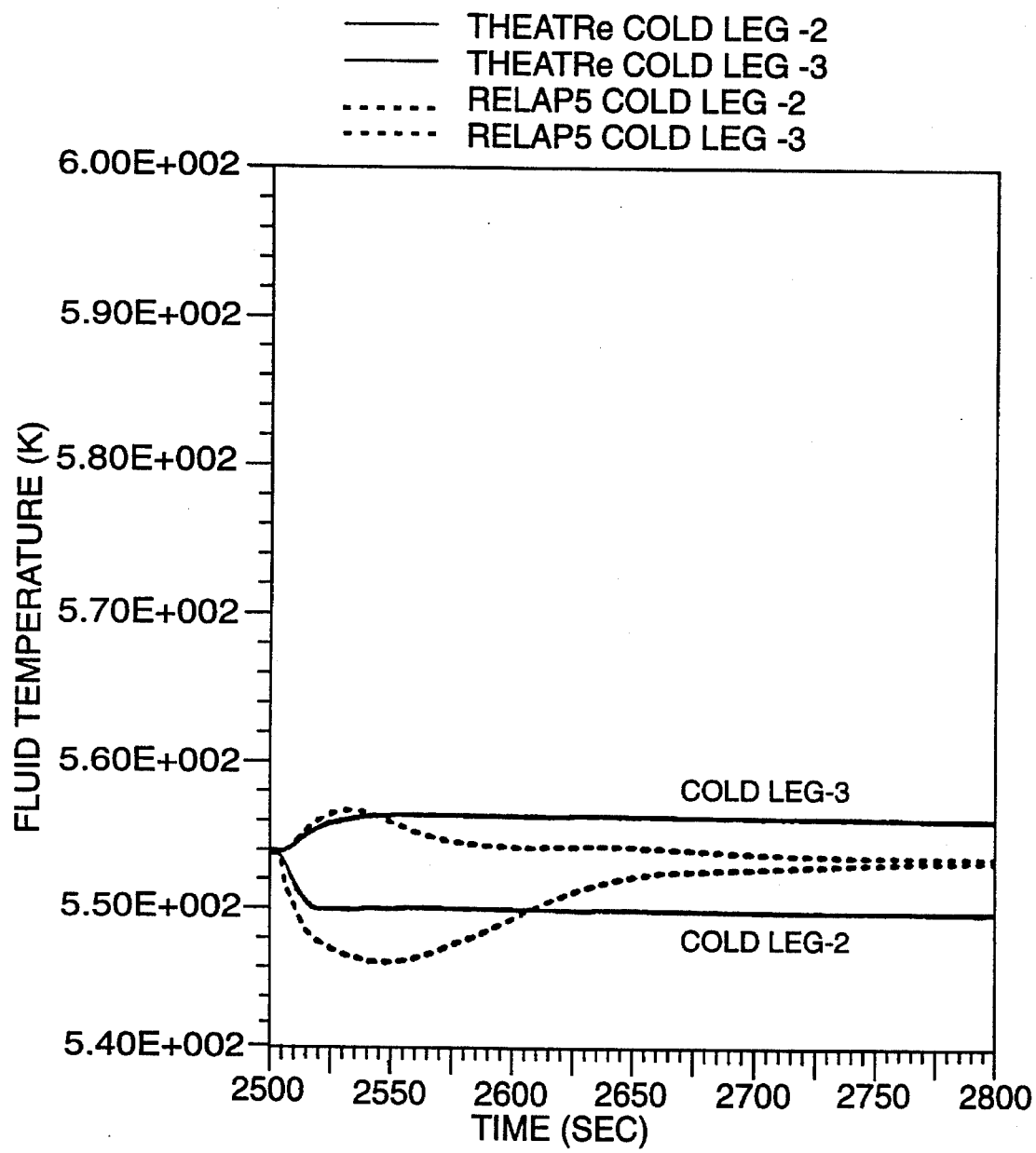
FIG. 27 is a plot of the fluid temperature (degrees Kelvin) in the cold legs over time for the one reactor coolant pump trip condition of FIG. 25, comparing the THEATRe and RELAP5 codes.
Figure 28:
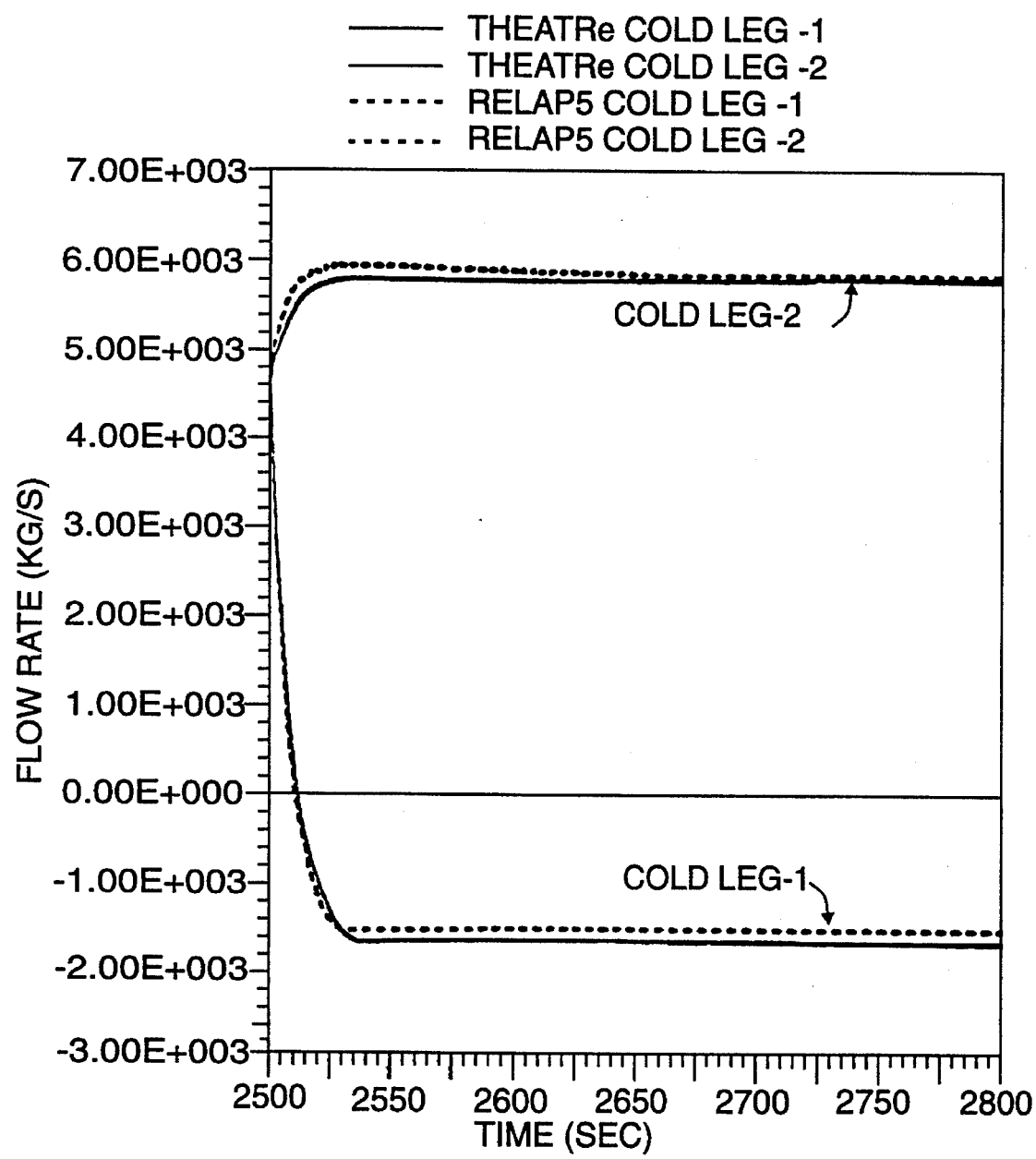
FIG. 28 is a plot of the flow rate in the cold legs over time for the one reactor coolant pump trip condition of FIG. 25, comparing the THEATRe and RELAP5 codes.

The results of THEATRe and RELAP have another discernable and physically meaningful departure. The THEATRe calculated steam generator level is −10% lower than RELAP, i.e., 0.5 m difference in −5 m narrow range indication (See FIG. 21). This is physically reasonable when correlated to the deviation of initial mass inventory. Note that THEATRe uses a mass inventory which is −10% smaller than RELAP for the same liquid level. This implies that ~10% more void space exists in the THEATRe riser region than that for RELAP. Since more void space will lead to more void collapse for similar pressurization rates (see FIG. 22), then more shrinkage of liquid level should take place. Comparison of pressurizer level and PCS average temperature are shown in FIGS. 23 and 24 respectively. The pressurizer level calculated by THEATRe is ~5% lower than that for RELAP. The deviation is small and acceptable. The variation of PCS average temperature is only −1 degree C.

One Reactor Coolant Pump Trip (Without Scram)

This section is to demonstrate the THEATRe thermal-hydraulic model's response to the sudden reduction of the single phase coolant flow by tripping one of the four reactor coolant pumps. The RCP (pump 1) is tripped at 100% core power steady state without initiating the reactor scram or turbine trip. Pump coastdown and flow reversal are observed at the cold leg of the tripped-pump. FIGS. 25–28 show the excellent agreement of the loop flow rate and coolant temperature between THEATRe and RELAP.

3. Accidental Malfunctions Small Break LOCA

The same IB conditions used in the previous calculation are also adopted in the benchmark of small break loss-of-coolant-accident. Additional IB conditions are required by LOCA analysis. Several significant events are assumed to take place at the initiation of the break. These include core scram, turbine trip, primary coolant pumps trip and pressurizer heaters off. High pressure safety injection (HPSI) flow is injected into cold legs (node 10, 26, 36, 39) at 83 bar. Low pressure safety injection (LPSI) flow and safety injection tank (SIT) flow are both activated at the same pressure ~13 bar and they are injected into cold legs at the same location (node 10, 26, 36, 39). HPSI, LPSI and SIT flows are calculated by a simple routine (driver). The calculated flow rates vary according to the changes of PCS pressure. The HPSI flow rate is roughly 18 kg/sec, which is insignificant as compared to the LPSI flow (~70 kg/sec) and the SIT flow (~2000 kg/sec). The initial inventory of SIT tank is 100000.0 kg (~half of initial PCS inventory) and it will be injected into PCS for about 60 seconds for the break size analyzed. The break size (0.05 $m^2$) is chosen to be 11.1% of The cold leg pipe cross sectional area (0.5 $m^2$) and the break is located in one cold leg (node 10).

Figure 29:
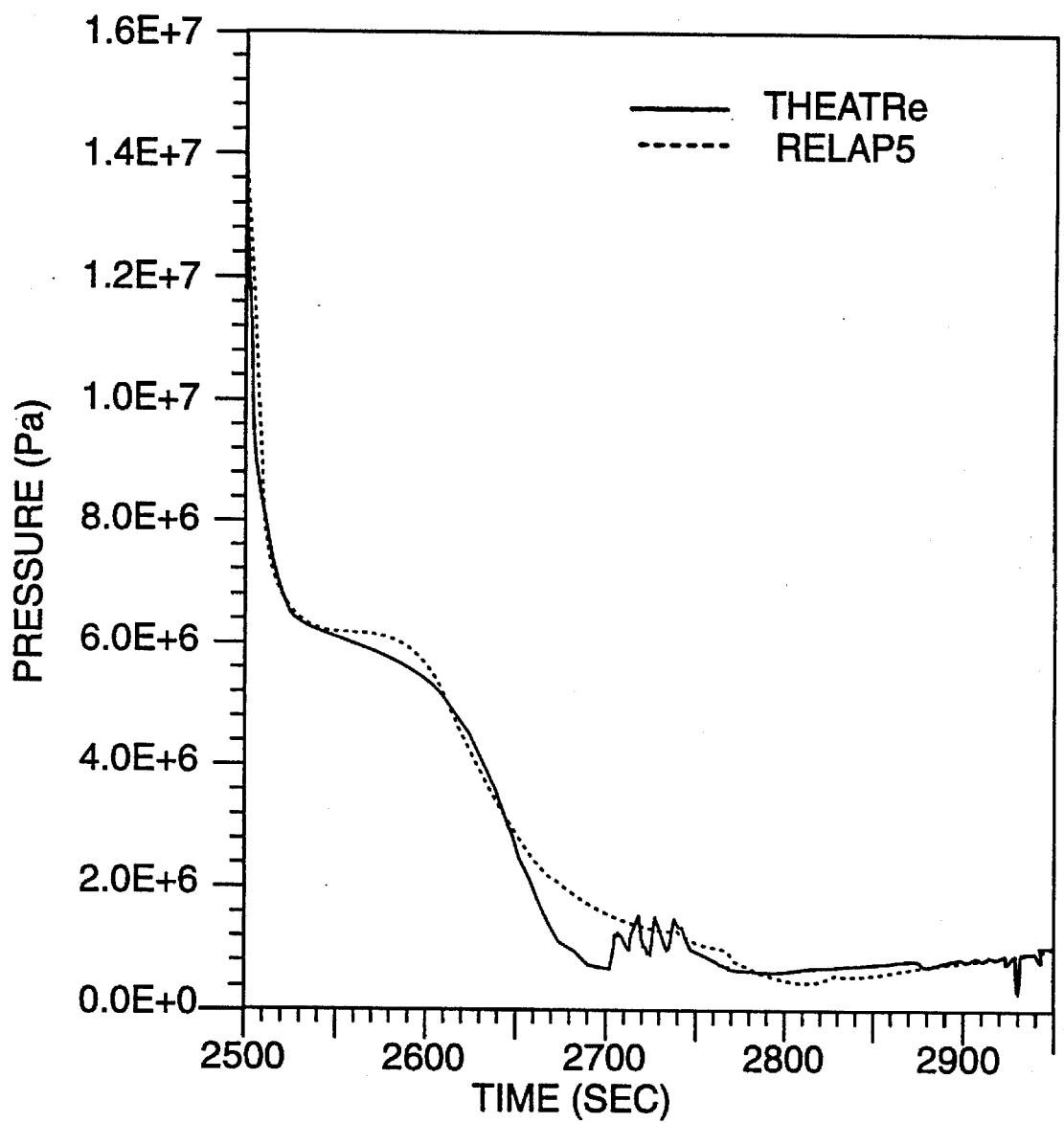
FIG. 29 is a plot of the pressurizer pressure (Pa) over time for a small break loss-of-coolant-accident, comparing the THEATRe and RELAP5 codes.
Figure 30:
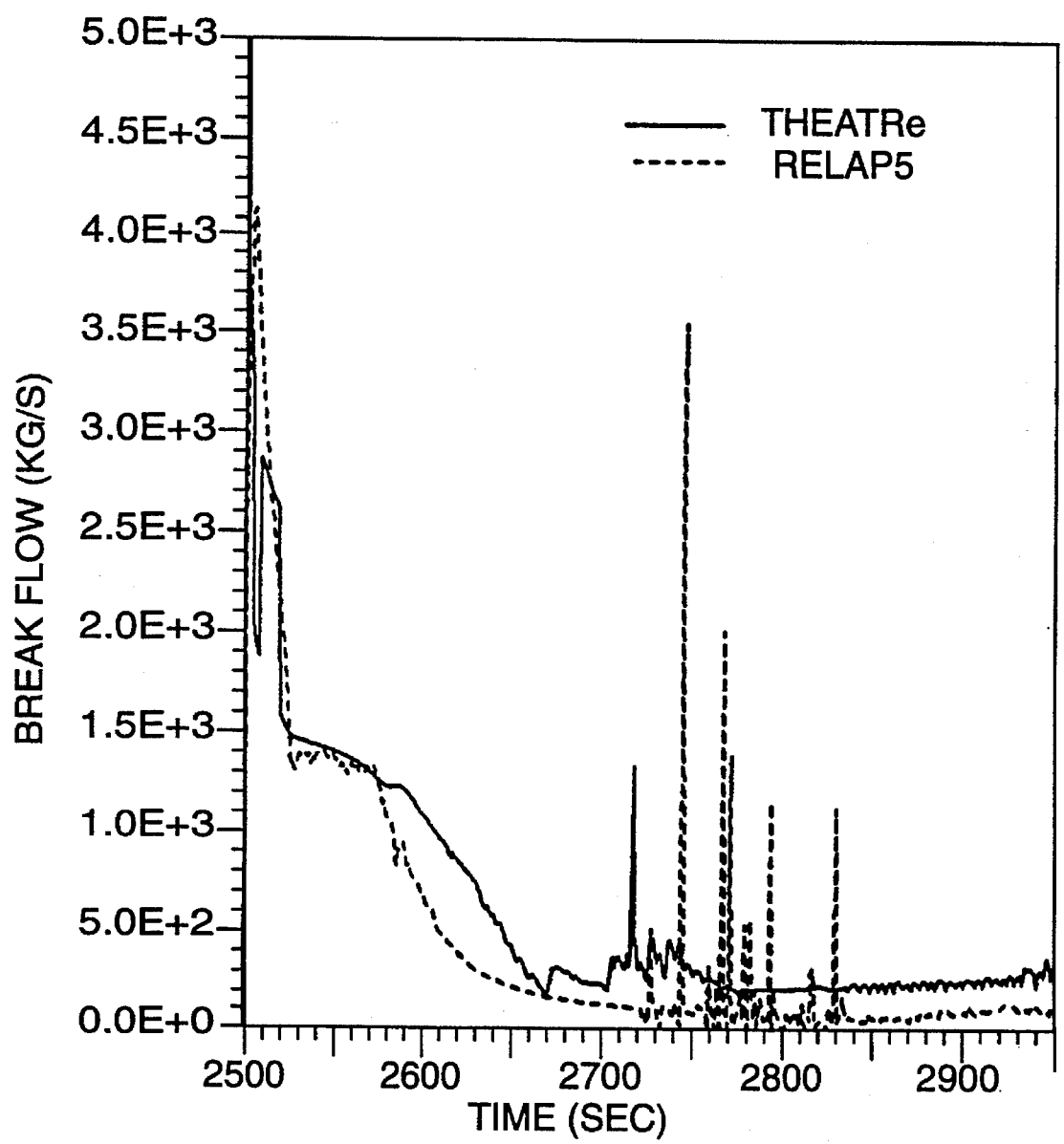
FIG. 30 is a plot of the total break flow rate over time for the small break loss-of-coolant-accident condition of FIG. 29, comparing the THEATRe and RELAP5 codes.
Figure 31:
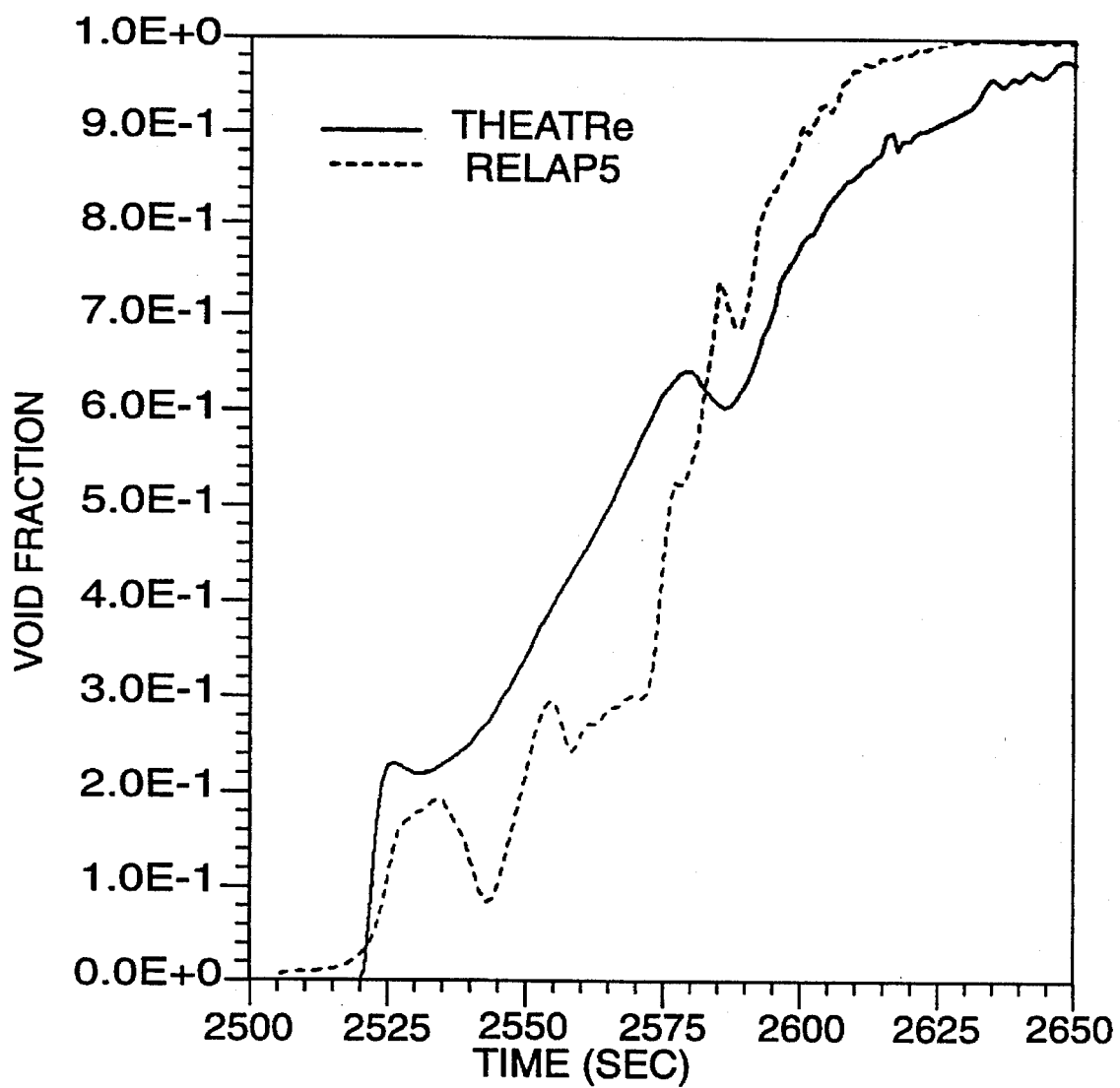
FIG. 31 is a plot of the cold leg void fraction (node 10) over time for the small break loss-of-coolant-accident condition of FIG. 29, comparing the THEATRe and RELAP5 codes.
Figure 32:
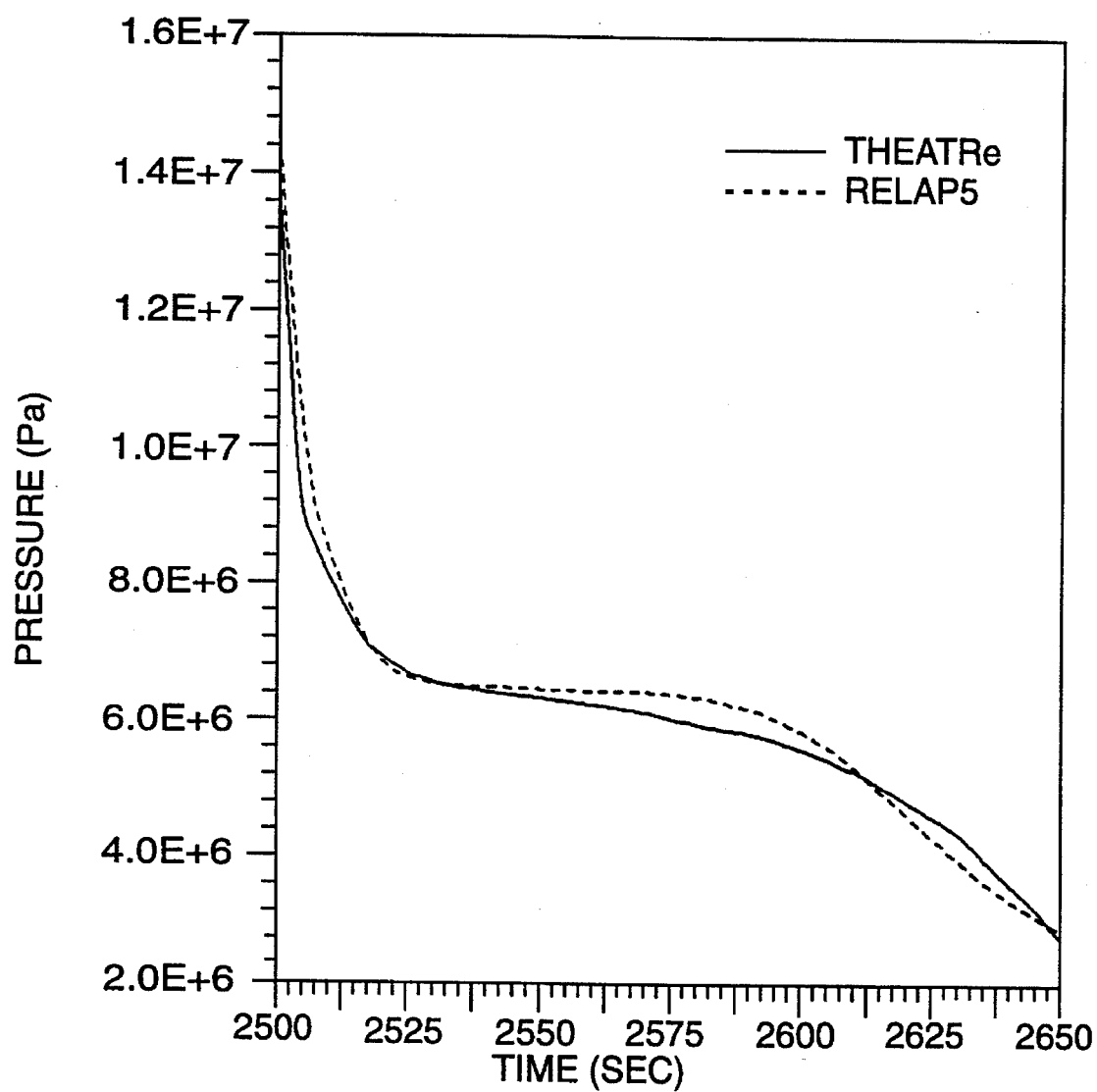
FIG. 32 is a plot of the pressurizer pressure (Pa) over the first 150 seconds for the small break loss-of-coolant-accident condition of FIG. 29, comparing the THEATRe and RELAP5 codes.
Figure 33:
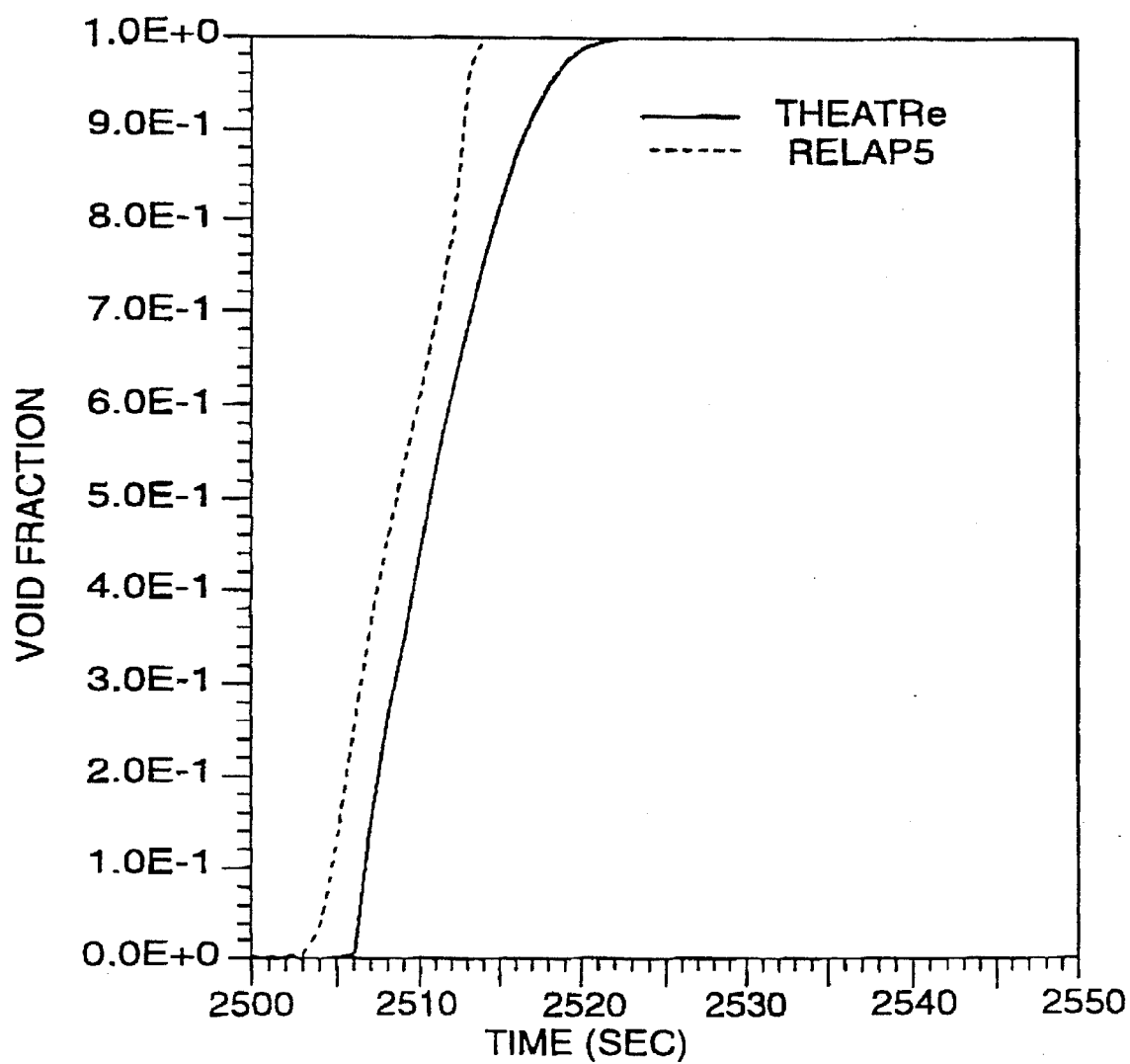
FIG. 33 is a plot of the upper head void fraction over time for the small break loss-of-coolant-accident condition of FIG. 29, comparing the THEATRe and RELAP5 codes.
Figure 34:
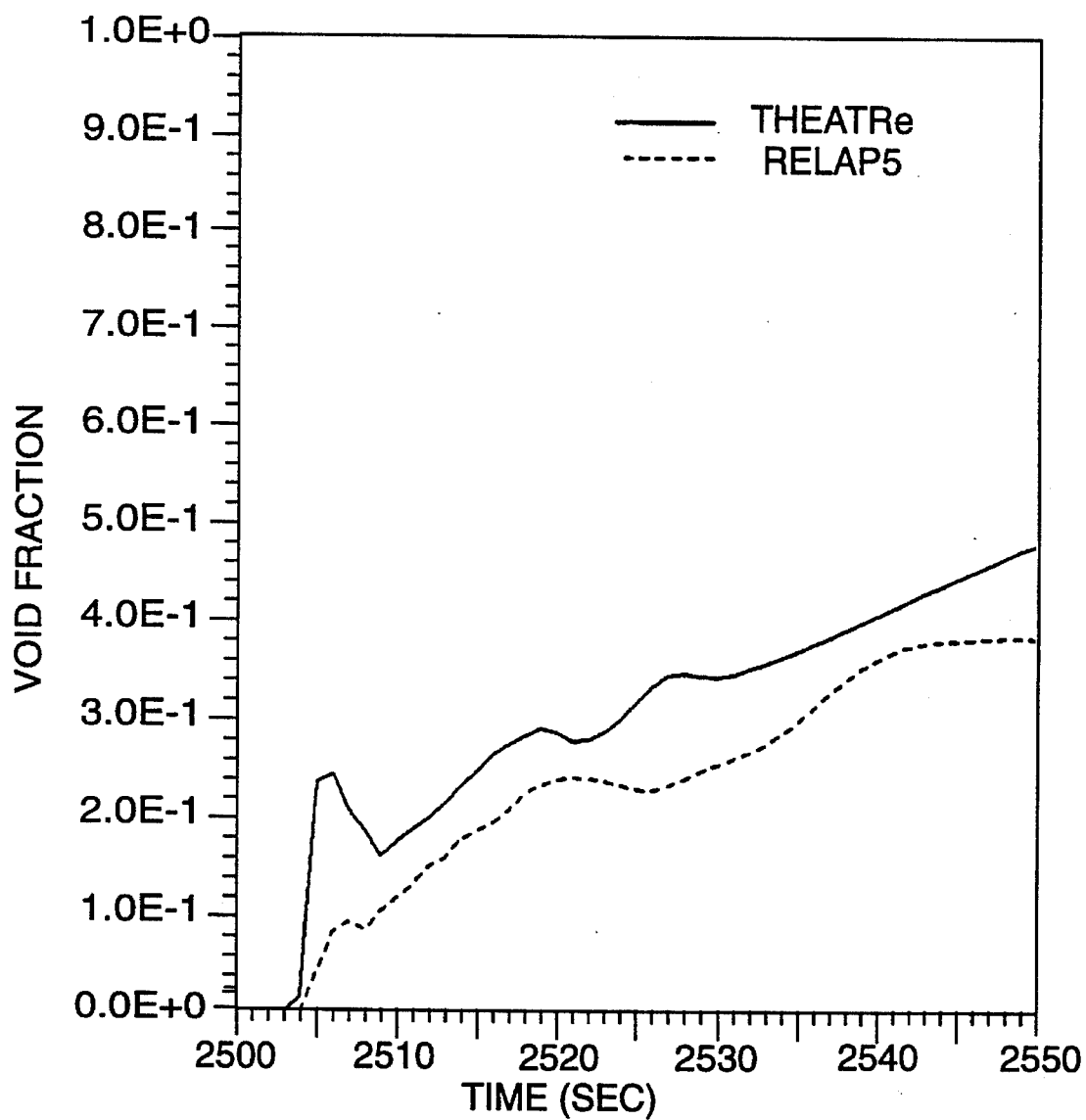
FIG. 34 is a plot of the upper core void fraction over time for the small break loss-of-coolant-accident condition of FIG. 29, comparing the THEATRe and RELAP5 codes.

The size of the simulated LOCA is at the high end of small break LOCA spectrum. A wide range of interesting phenomena can be simulated in a reasonably short period. The simulated time period is 450 seconds (2500 to 2950 sec). FIG. 29 shows an excellent comparison of the pressurizer pressures calculated by THEATRe and RELAP, i.e., the trend and magnitude of the two calculated pressures agrees quite well. Comparison of the most crucial boundary condition (total break flow rate) also agrees reasonably well (see FIG. 30). Most importantly, the pressure comparison indicates that the same sequence of events takes place at similar time for both calculations (see Table IX). Four distinct depressurization periods can be observed in both pressure history curves. The first period is the subcooled liquid blowdown, since the break fluid is single phase subcooled liquid. This period lasts for ~20 seconds. As the fluid pressure in the broken cold leg continues to drop, the subcooled liquid approaches the saturation point. As soon as the liquid becomes saturated (or even superheated), significant liquid flashing takes place (see FIG. 31). At that time (~2520 sec), two phase blowdown begins. FIG. 30 indicates that at 2520 sec two phase choking phenomenon occurs. The total break flow drops significantly and correspondingly, the depressurization rate slows down (FIGS. 29 and 32). In fact, the pressure stabilizes at ~60 bar. The liquid flashing (as well as the blowdown flow) continues to take away liquid in the broken cold leg. When the broken leg loop seal is nearly clear (as reflected in FIG. 31), substantially increased steam blowdown is observed. This leads to another rapid depressurization period (see FIG. 32 at ~2600 sec for THEATRe and ~2590 sec for RELAP). When the pressure decreases to the set point of SIT and LPSI flow injection, substantial amount of cold liquid enters cold legs and, subsequently, the core. The stored heat in the fuel is thus released to the incoming liquid and causes the liquid to boil. The liquid boiling in the core then reduces the pressure decrease (FIG. 29). A detailed look at the initial single phase blowdown period reveals more interesting phenomena. FIG. 32 indicates that the initial fast depressurization slows down in ~4–6 seconds after transient initiation. The causal mechanism is flashing of liquid in the upper head and upper core region. FIG. 33 shows that the two calculated flashing rates in upper head region agree well (complete void in 10 seconds). FIG. 34 shows that the upper core fluid flashing takes place as early as the upper head, although the core fluid saturation temperature is higher (due to hydrostatic head). This is reasonable since the core fluid is hotter than the upper head fluid. The hotter core fluid is caused by faster heatup of core fluid. Note that the coolant pumps are tripped at the initiation of the break calculation. Thus the core flow rapidly coasts down which leads to faster heatup of the core fluid than the upper head fluid.

A numerical aspect should be noted. The RELAP calculation allows the time step to dynamically reduce to cope with the unstable calculations (requested time step is 0.125 sec). However, this particular capability does not remove the numerical spikes. In fact, the RELAP calculation involves substantially more numerical oscillations than the THEATRe calculation which uses a constant time step (0.125 sec). FIG. 30 shows that, when the SIT flow is injected, the break flow rate is significantly oscillating (2730–2830 sec). The unstable break flow introduces some oscillation of the calculated pressure (FIG. 29). It is suspected that the causes for unstable RELAP calculations are primarily introduced by the discontinuity which exist in the interfacial heat transfer correlation package and the critical flow model. The explicit calculation of correlation coefficients may also have to do with the unstable calculations.

TABLE IX

Comparison of Major Sequence of Events for 10% Small Break LOCA

| Time(sec) | | |
| --- | --- | --- |
| THEATRe | RELAP5 | Events |
| 2500.0 | 2500.0 | Break initiated<br>Core scram<br>Turbine trip<br>PCPs trip<br>heaters off |
| 2500.125 | 2500.4 | Significant voiding taken place in hot legs due to liquid flashing |
| 2504.0 | 2504.0 | Significant voiding taken place in upper core region due to power-flow mismatch |
| 2506.0 | 2504.0 | Significant voiding taken place in upper head region due to liquid flashing |
| 2509.0 | 2511.0 | High pressure safety injection (HPSI) initiated at 83 bar |
| 2520.0 | 2520.0 | Significant voiding taken place in the broken cold leg |
| 2595.0 | 2585.0 | Reverse heat transfer taken place in steam generators since PCS pressure drops lower than the secondary pressure |
| 2600.0 | 2590.0 | Significant steam flow observed at the break since liquid in loop seal nearly disappears. |
| 2700.0 | 2730.0 | Initiation of safety injection tank flow (SIT) and low pressure safety injection (LPSI) flow at ~ 13 bar |

Large Break LOCA

Figure 35:
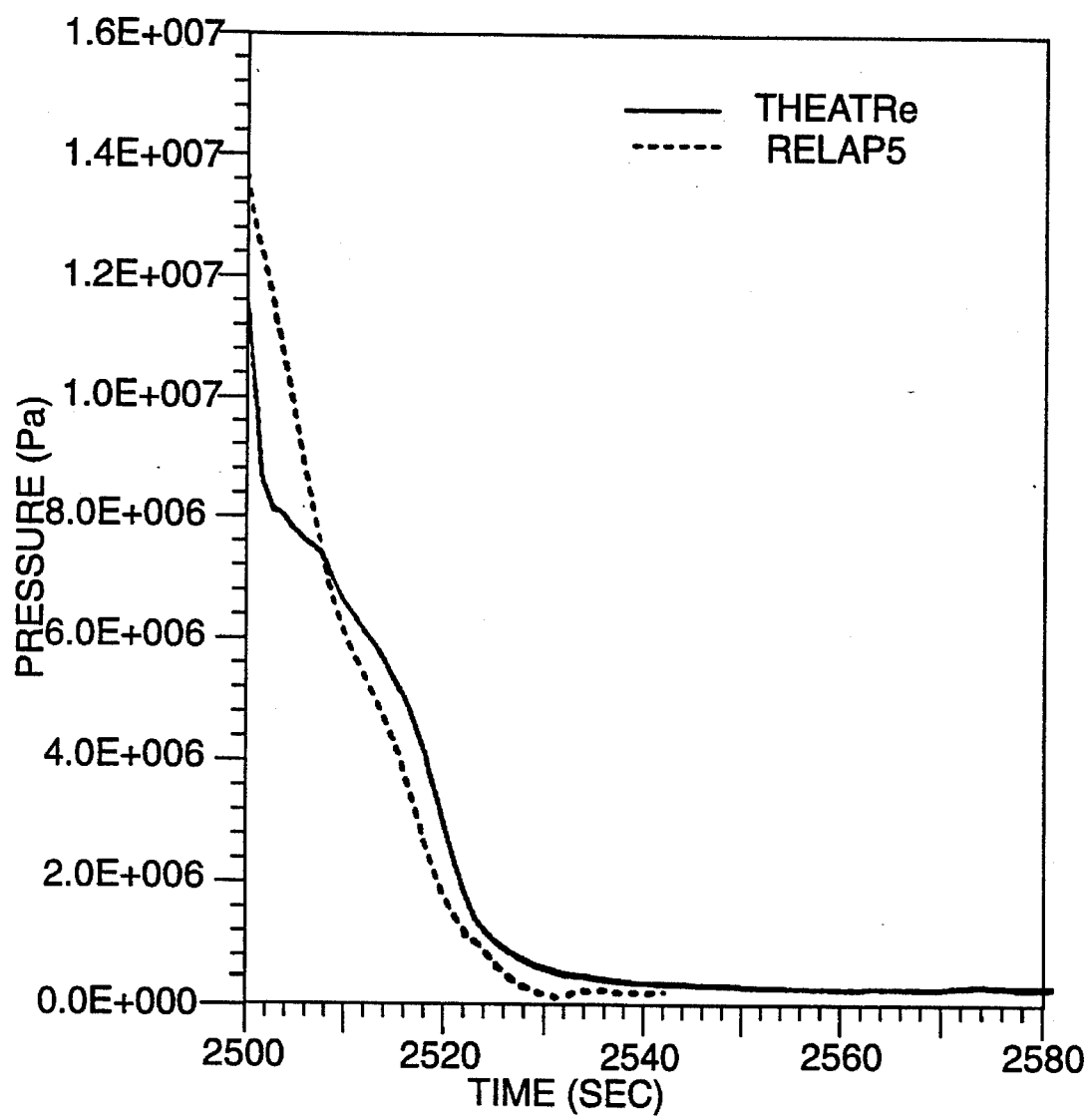
FIG. 35 is a plot of the pressurizer pressure (Pa) over time for a large break loss-of-coolant-accident, comparing the THEATRe and RELAP5 codes.
Figure 36:
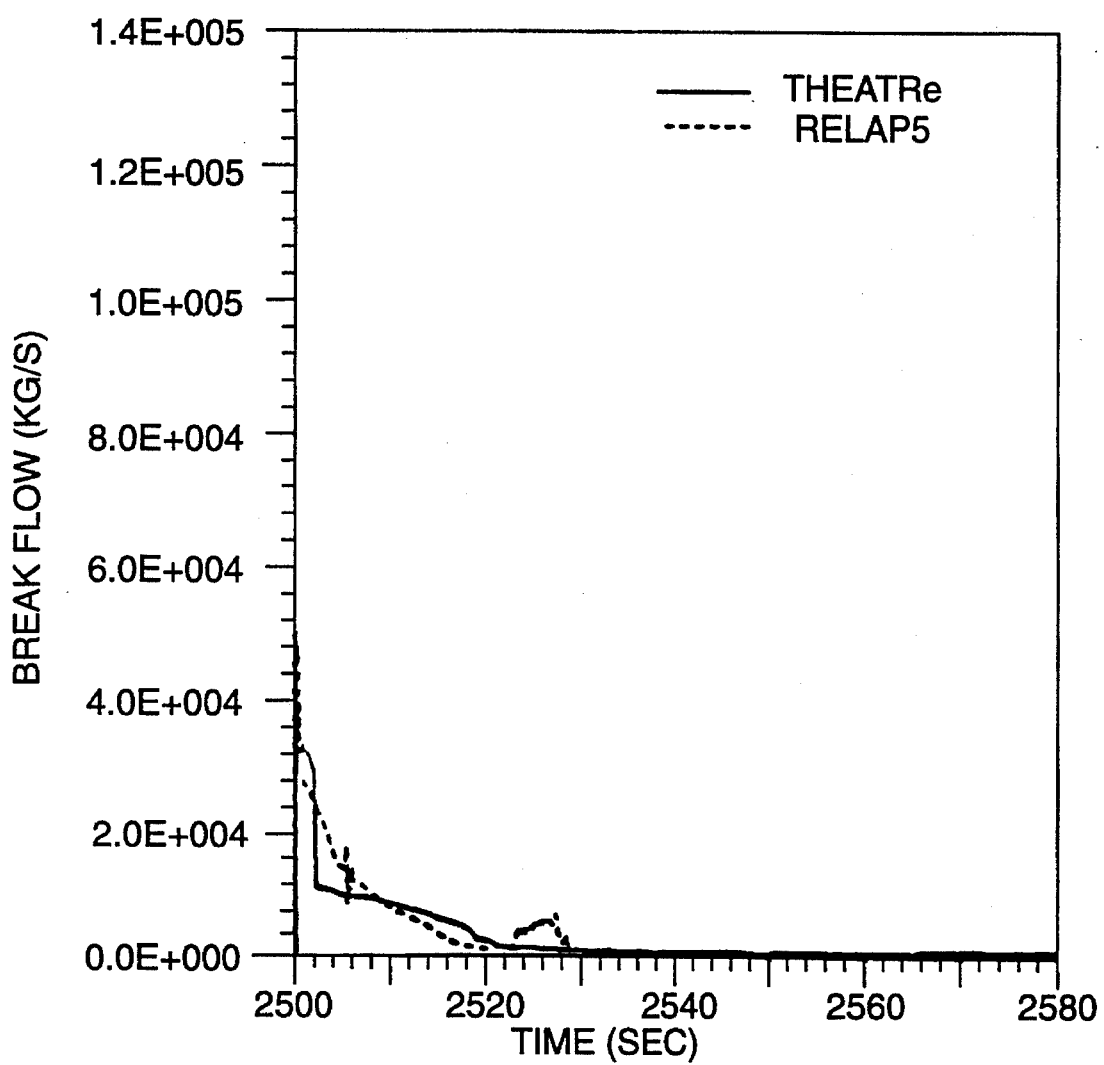
FIG. 36 is a plot of the total break flow rate over time for the large break loss-of-coolant-accident condition of FIG. 35, comparing the THEATRe and RELAP5 codes.
Figure 37:
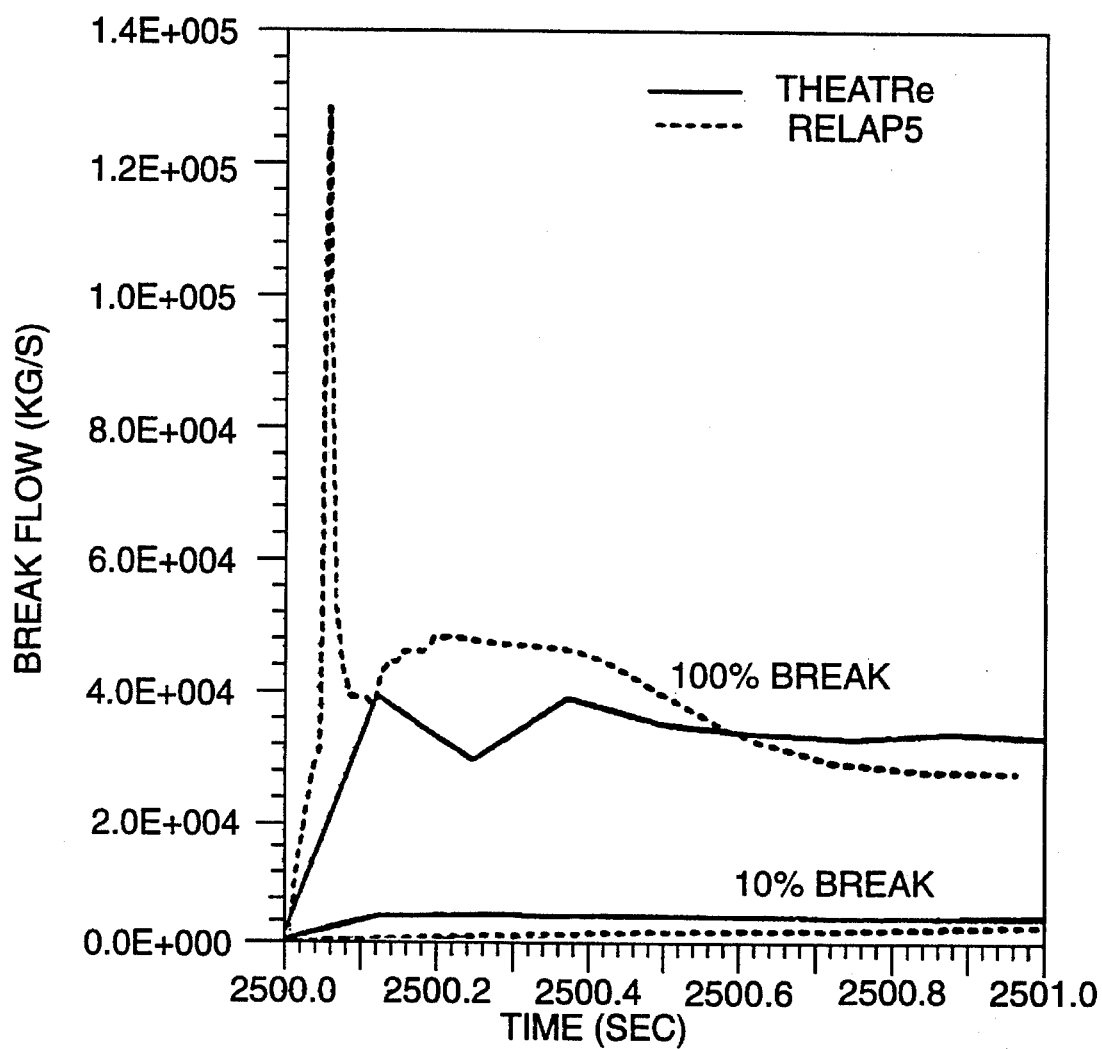
FIG. 37 is a plot of the total break flow rate over time for a second large break loss-of-coolant-accident condition, comparing the THEATRe and RELAP5 codes.

The severity of this simulated large break LOCA is 10 times larger than the presented small break LOCA. Thus the break size represents a 100% break (in fact 110%). The same set of IB conditions for the small break LOCA calculation is used. FIGS. 35–37 show reasonable comparisons of the pressurizer pressure and the break flow rate. The calculated overall depressurization period is ~10 times shorter than the small break LOCA. Major events taken place in the 10% LOCA are also observed in both the THEATRe and RELAP calculations for 100% LOCA. These major events include the four depressurization periods discussed previously. However, some differences are noted. The THEATRe calculation reveals clearer distinction of the four periods than the RELAP calculation. The clearer distinction seems to be more reasonable. FIG. 36 indicates an abrupt decrease of break flow at ~2502 second and correspondingly, the pressure drop is slowed down (see FIG. 35). This result represents a typical two phase choking phenomenon caused by the presence of void in the broken cold leg region. Note that the THEATRe code adopts the choke model from RELAP and functions well.

Another unreasonable break flow calculation is illustrated in FIG. 37. In the first 0.1 second, the RELAP break flow rate increases to 130000 kg/sec and drops to –38000 kg/sec. The spike of break flow is clearly unphysical. Note that 38000 kg/sec corresponds to 10 times of the break flow for 10% break.

It is important to note that the THEATRe code calculates large break LOCA responses using a constant time step (0.125 sec). The requested time step for RELAP calculation is 0.01 second. The time step is substantially reduced when SIT cold liquid injection is initiated. However, even with reducing time steps, the RELAP calculation fails at –2542 sec. Note that for 10% LOCA, the RELAP calculation survives but produces severe numerical spikes.

THEATRe™ Code Structure and Input Description

As noted, the preferred embodiment of the present invention is implemented in a software code that operates a computer that has as inputs the various sensed operating parameters as described herein. The preferred THEATRe code structure is shown in FIGS. 38A–38C.

Set forth below is a list of the main and subroutines, briefly describing their respective functions.

main—This is the main program of the THEATRe™ code. It controls the advancement of hydraulics and heat structure calculation. It has features such as restart capabilities, different reactor transient options and user friendly structured programming.

sthinput—This subroutine is used to process the hydraulic node information. A typical PWR input deck is in_pa1_th.

sthinputht—This subroutine is a module for heat structure data input. A typical input deck is inhtf.i.

sthconst—This module is invoked before the major calculation to process all the constants needed in hydraulic calculations, such as, geometric constants of hydraulic nodes, configuration of hydraulics and constants used in constitutive correlations.

sthconstht—This subroutine is used to process heat structure-related constants, such as geometric constants and configurations.

sthinit—This subroutine is used for the initialization of the hydraulic nodes. It follows the execution of constants processing.

sthinitht—This subroutine is a module to initialize the data of heat structures, it follows the calculation of sthinit.

sthfregime—This is the main subroutine for determining flow regime modes and regime boundaries.

sthfregmaph—This subroutine determines the horizontal flow regime boundaries.

sthfregmapv—This subroutine determines the vertical flow regime boundaries.

sthfregmode—This subroutine determines the flow regime modes.

sthfregmapj—This routine determines the flow regime for junction cells.

sthgamma—This is the main subroutine for calculating interfacial heat transfer coefficients.

sthhifhig—This subroutine calculates the liquid and gas interfacial heat transfer coefficients.

sthhifhigus—This subroutine calculates the liquid and gas interfacial heat transfer coefficients for the vertical flow in unstratified regimes.

sthhifhig23—This subroutine calculates the liquid and gas interfacial heat transfer coefficients for transition regions between slug flow and annular mist flow.

sthhifhigs—This subroutine calculates the liquid and gas interfacial heat transfer coefficients for slug flow.

sthhifhigbb—This subroutine calculates the liquid and gas interfacial heat transfer coefficients for basic bubbly flow.

sthhifhiga—This subroutine calculates the liquid and gas interfacial heat transfer coefficients for annular flow.

sthhifhig56—This subroutine calculates the liquid and gas interfacial heat transfer coefficients for transition regions between inverted annular flow and inverted slug flow.

sthhifhigia—This subroutine calculates the liquid and gas interfacial heat transfer coefficients for inverted annular flow.

sthhifhigis—This subroutine calculates the liquid and gas interfacial heat transfer coefficients for inverted slug flow.

sthhifhigb—This subroutine calculates the liquid and gas interfacial heat transfer coefficients for bubbly flow.

sthhifhigd—This subroutine calculates the liquid and gas interfacial heat transfer coefficients for dispersed flow.

sthhifhighs—This subroutine calculates the liquid and gas interfacial heat transfer coefficients for horizontal stratified flow.

sthhifhigvs—This subroutine calculates the liquid and gas interfacial heat transfer coefficients for vertical flow in the stratified and transition regions.

sthhifhigxn—This subroutine evaluates the effect of non-condensible gas on the interfacial heat transfer coefficients.

sthhifhiglag—This subroutine performs the smoothing task for the rapid changes of interfacial heat transfer coefficients and it also limits the coefficients to prevent over condensation or over flashing.

sthfwffwg—This is the main subroutine to calculate wall friction losses for liquid and gas phases.

sthfwallj—This subroutine calculates wall friction loss for the mixture phase.

sthmfloss—This subroutine calculates friction factor based on Reynolds number.

sthfwafgj—This subroutine calculates the liquid and gas wall friction losses after the friction loss for mixture phase is determined.

sthhlossfg—This subroutine calculates momentum loss due to form changes.

sthpvsov—This is the main subroutine to perform the two-step solution task.

sthmviscfg—This subroutine evaluates the momentum viscous terms.

sthpgasdrv—This subroutine determines the property derivatives for mixture gas.

sthpvsovl—This is the main subroutine to perform the first step solution task.

sthpvgamma—This subroutine calculates the gamma-related coefficients in the first step linearized equations.

sthpvcoefla—This subroutine calculates the coefficient values for the first step matrix "a".

sthmtxinv—This subroutine performs matrix inversion for the first step matrix "a".

sthmtxinv4—This subroutine performs matrix inversion for the degenerated first step matrix "a" (4×4).

sthmtxinv5—This subroutine performs matrix inversion for the first step matrix "a" (5×5).

sthpvcoeflb—This subroutine calculates the coefficient values for the first step array "b".

sthpvcoeflp—This subroutine calculates the coefficient values for the first step array "p".

sthpvcoeflc—This subroutine calculates the coefficient values for the first step array "c".

sthdriftc0—This subroutine evaluates the drift flux coefficients "c0".

sthdriftvgj—This subroutine evaluates the drift velocity "vgj".

sthpvcoefdp—This subroutine calculates the coefficient values for the first step pressure equation matrix.

sthdpsov40—This subroutine prepares coefficients values for the pressure equation matrix solver for the sample 40 nodes configuration.

sthdpmtx40—This subroutine is the pressure equation matrix solver for the sample 40 nodes configuration.

sthdpsovsg—This subroutine prepares coefficients values for the pressure equation matrix solver for the sample steam generator configuration.

sthdpmtxsg—This is the pressure equation matrix solver for the sample steam generator.

sthpvnewpv—This subroutine updates pressures and velocities for the new time step.

sthpvzprop—This subroutine calculates intermediate properties for the first step solution.

sthpvvflfp—This subroutine-determines the flip-flop junctions.

sthmdonor—This subroutine determines the donor cell indices for each junction.

sthpvcoefff—This subroutine re-computes the first step solutions for the flip-flop junctions.

sthppropjj—This subroutine determines the donor cell properties for each junction.

sthsthsepup—This subroutine determines the donor cell properties for the top junction of a steam separator.

sthsepdn—This subroutine determines the donor cell properties for the bottom junction of a steam separator.

sthpvdisp—This subroutine calculates display variables for each term of momentum equation.

sthpvsov2—This subroutine calculates second time step solution.

sthpvconv—This subroutine computes convective term for second time step.

sthpvnfield—This subroutine computes field equations for second time step.

sthpvnprop—This subroutine computes new properties for second time step.

spwaters—This subroutine is used to calculate thermodynamic and transport properties of steam by table lookup method. This module is linked with steam table subroutines stable1, stable2, stable3 and stable4.

spwaterf—This subroutine is used to calculate thermodynamic and transport properties of water by table lookup method. This module is linked with water table subroutine table.

spwatersat—This subroutine is used for the saturated thermodynamic properties of water. It includes two entry points-sthtsat and sthpsat.

sthpsat—This is an entry point of the spwatersat subroutine to calculate the properties through the pressure input.

sthtsat—This is an entry point of the spwatersat subroutine to calculate the properties through the temperature input.

sthpgasprp—This subroutine calculates certain properties.

sthpemass—This subroutine calculates the error mass. sthmpropj—This subroutine computes momentum cell junction properties.

sthmvelk—This subroutine computes volume cell average velocity.

sthppropj—This subroutine computes junction cell properties.

sthmflow—This subroutine computes junction mass flow rate.

sthchoke—This is a subroutine to perform the critical flow calculation. It determines the choking status and compute the sonic velocity as well as choke flow.

sthsgdriver—This is an auxiliary subroutine to control the main steam line output and feed water input of the steam generator.

sthpropct1—This is a proportional controller.

sthpict1—This is a proportional-integral controller.

sthprdriver—This is the pressurizer driver subroutine.

sthhyht—This subroutine is a main module to perform the heat transfer calculations. In this subroutine it calculates the convection heat transfer coefficients along the heat structures and perform the conduction heat transfer calculation within heat slabs. Then it combines the total heat fluxes on the wall surfaces of the adjacent heat slabs along a specific hydraulic node and put it back into the energy equation.

sthhcoef—This is the subroutine to pass the hydraulic node properties for wall heat convection calculation. The output of this module will be convection heat transfer coefficient.

sthhtlogic—This is the module to select heat transfer mode. A boiling curve is modeled in wall heat transfer. It also covers the condensation heat transfer and air-water mixture heat transfer.

sthtpawht—This is the subroutine to compute the air-water mixture (noncondensible effects) heat transfer.

sthdittus—This subroutine calculates the single phase convection, including forced and free convection. Turbulent and laminar flow effects are also considered.

sthprednb—This subroutine computes the subcooled and saturate nucleate boiling heat transfer. Chen's correlation is implemented in this calculation.

sthinter—This is a function subroutine to do the interpolation in sthprednb.

sthchfcal—This subroutine computes the critical heat flux by Dr. Groeneveld's AECL table lookup method (1986).

sthchfcalint—This is an interpolation function subroutine in sthchfcal calculation.

sthpstdnb—This is the subroutine to compute post critical heat flux heat transfer. It includes the subcooled and saturate transition boiling as well as subcooled and saturate film boiling.

sthcon—This function subroutine computes the thermal conductivities of saturate gas in sthpstdnb.

sthconden—This subroutine is used in the calculation of condensation heat transfer.

sthhcoeflag—This is a subroutine to time-lag the wall heat transfer coefficients before conduction calculation.

sthcond1—This is the subroutine to calculate the temperature profile of heat structures with one side convective boundary such as fuel rods.

sthcond2—This is the subroutine to calculate the temperature profile of heat structure with two side convective boundaries such as steam generator tubings.

sthqwfqwg—This is the subroutine to correct wall heat fluxes after new wall temperatures are obtained.

sthxvflow—This is the subroutine to calculate detail void distribution.

sthhfcore—This is the subroutine to interpolate local gas and liquid enthalpy for subnodes in VAD model.

sthqwcore—This subroutine is used to distribute wall heat fluxes in the reactor core for subnodes in VAD model.

Set forth below is a list of the hydrodynamic components input deck of the thermohydraulics analysis program, by card number.

| | |
|---|---|
| Card1 | Initial time for calculation. |
| Card2 | Time increment for transient calculation. |
| Card3 | Number of maximum flip-flop checks. |
| Card4 | Total number of regions in hydraulic calculation. |
| Card5 | Region number. Enter 1 for primary coolant system and 2 for steam generator. |
| Card6 | Total number of nodes for the region prescribed in Card5. |
| Card7 | Total number of junctions for the region prescribed in Card5. |
| Card8 | Separator node number in the region prescribed in Card5. Enter 0 for no separator case. |
| Card9 | Node number in the region prescribed in Card5. |
| Card10 | Tee junction number connected to this node(Card9). Enter 0 of no tee junction on the node. |
| Card11 | Flow area of this node(Card9). |
| Card12 | Nodal length of this node(Card9). |
| Card13 | Azimuthal angle of this node(Card9). |
| Card14 | Surface roughness along flow path. |
| Card15 | Form loss coefficient for this node(Card9). |
| Card16 | Pressure initial condition for this node(Card9). |
| Card17 | Gas phase internal energy for this node(Card9). |
| Card18 | Liquid phase internal energy for this node(Card9). |
| Card19 | Initial void fraction at this node(Card9). |
| Card20 | Initial non condensible gas concentration at the node(Card9). |
| Card21 | Non-condensible gas source term for this node(Card9). |
| Card22 | Gas source term for this node(Card9). |
| Card23 | Liquid source term for this node(Card9). |
| Card24 | Gas enthalpy source term for this node(Card9). |
| Card25 | Liquid enthalpy source term for this node(Card9). |
| Card26 | Gas momentum source term for this node(Card9). |
| Card27 | Liquid momentum source term for this node(Card9). |
| Card28 | Source injection angle for the node(Card9). |
| Card29 | Direct wall heat into liquid phase of the node(Card9). |
| Card30 | Direct wall heat into gas phase of the node(Card9). Repeat Card9 to Card30 until total number of nodes is equal to Card6. |
| Card31 | Junction number in this region(Card5). |
| Card32 | Inlet node number for this junction(Card31). |
| Card33 | Outlet node number for this junction(Card31). |
| Card34 | Flow area of this junction(Card31). |
| Card35 | Form loss coefficient of this junction(Card31). |
| Card36 | Initial gas mass flow rate at this junction(Card31). |
| Card37 | Initial liquid mass flow rate at this junction(Card31). |
| Card38 | Pump head if pump head is applied at this junction(Card31). Enter 0 otherwise. Repeat Card31 to Card38 until total number of junctions is equal to Card7. Repeat Card5 to Card38 until total number of regions is equal to Card4. End of hydrodynamic components data. |

Set forth below is a list of heat structure input deck of the thermohydraulics analysis program by card number.

| | |
|---|---|
| Card1 | Flag of Coupling between hydraulics and heat transfer. Enter 0 for decoupling and 1 for coupling. |
| Card2 | Heat slab number for type1 heat structure (fuel rod). |
| Card3 | Fuel rod geometry in radial direction. Enter r1, r2, r3. r1 is fuel pellet radius. r2 is the inner radius of fuel cladding. r3 is the outer radius of fuel cladding. |
| Card4 | Heating sources into this heat slab(Card2). Enter s1, s2, s3. s1 is from neutronic power. s2 is for direct heating into cladding and s3 is the hydrogen generation heat. unit is w/m3. |
| Card5 | Initial temperature for the three regions for fuel rod (pellet, gap, cladding). |
| Card6 | Hydraulic node number on the right hand side of this heat slab. |
| Card7 | Heating diameter of this heat slab(Card2). |
| Card8 | Heating length of this heat slab(Card2). |
| Card9 | Distance from nearest grid spacer to the center of heat slab(Card2) and energy loss coefficient. |
| Card10 | Local peaking factor of neutronic power. |
| Card11 | Fuel rod bundle indicator. Enter 1 if heat slab is type1 and 0 for type2 and type3 heat slabs. |
| Card12 | Total heat transfer area for this heat slab(Card2). Repeat Card2 to Card12 until all type1 heat slab data are entered. Then enter type2 heat slab (steam generator tubing). |
| Card13 | Heat slab number for type2 heat slab (S.G. tubing). |
| Card14 | Thickness of tubing and crud on secondary side. |
| Card15 | Unit perimeter in primary and secondary side. Enter inner and outer tubing perimeter for simplicity. |
| Card16 | Enter thermal conductivity of crud. |
| Card17 | Enter heating source into this heat slab(Card13) |
| Card18 | Initial temperatures for three points in the tubing. First is on tubing surface at primary side, second is on tubing surface at secondary side and the third is the interfacial temperature between tubing and crud. |
| Card19 | Primary and secondary side hydraulic node number. |
| Card20 | Primary and secondary side heating diameter. |
| Card21 | Primary and secondary side heating length. |
| Card22 | Distance from nearest grid spacer to the center of heat slab(Card13) and energy loss coefficient at primary side. |
| Card23 | Distance from nearest grid spacer to the center of heat slab(Card13) and energy loss coefficient at secondary side. |
| Card24 | Local peaking factor of neutronic power at primary and secondary side. |
| Card25 | Rod bundle indicator like Card11 at primary and secondary side. |
| Card26 | Total heat transfer area like Card12 at primary and secondary side. Repeat Card13 to Card26 until all type2 heat slab data are entered. Then enter type3 heat slab (heat losses to containment). |
| Card27 | Heat slab number for type3 heat slab (RV, SG vessel, piping). |
| Card28 | Thickness of vessel and thermal insulator. |
| Card29 | Unit perimeter in primary and secondary side. Enter inner and outer vessel perimeter for simplicity. |
| Card30 | Enter thermal conductivity of thermal insulator. |
| Card31 | Enter heating source into this heat slab(Card27) |
| Card32 | Initial temperatures for three points in the vessel. First is on vessel surface at primary coolant side, second is on vessel surface at containment side and the third is the interfacial temperature between vessel and insulator. |
| Card33 | Primary coolant side hydraulic node number. |
| Card34 | Containment side bulk air temperature and heat transfer coefficient. |
| Card35 | Primary coolant side heating diameter. |
| Card36 | Primary coolant side heating length. |
| Card37 | Distance for nearest grid spacer to the center of |

|  |  |
|---|---|
| | heat slab(Card27) and energy loss coefficient at primary coolant side. |
| Card38 | Local peaking factor of neutronic power at primary coolant side. |
| Card39 | Rod bundle indicator like Card25 at primary coolant side. |
| Card40 | Total heat transfer area like Card26 at primary coolant and containment side. Repeat Card27 to Card40 until all type3 heat slab data are entered. End of heat slab data. |

Nomeclature

|  |  |
|---|---|
| A | Cross-sectional area (m$^2$) |
| $A_t$ | Throat area (m$^2$) |
| $A_i$ | Atomic weight of radioactive isotope i (Kg) |
| a | Speed of sound (m/s); interfacial area per unit volume (m$^{-1}$) |
| $a_{HE}$ | Two phase homogeneous sound speed (m/s) |
| $B_x$ | Body force in x coordinate direction (m/s$^2$) |
| $\beta_f$ | Coefficient of isobaric thermal expansion for liquid (K$^{-1}$) |
| $\beta_g$ | Coefficient of isobaric thermal expansion for vapor (K$^{-1}$) |
| $C_0$ | A distribution parameter in drift flux correlation |
| $C_p$ | Specific heat at constant pressure (J/Kg · K) |
| $C_{pf}^s$ | Saturated liquid specific heat at constant pressure (J/Kg · K) |
| $C_{pg}^s$ | Saturated gas specific heat at constant pressure (J/Kg · K) |
| $C_v$ | Specific volume at constant volume (J/Kg · K) |
| $C_{Rfi}$ | Concentration of radioactive material in liquid |
| D | Diameter of pipe (m) |
| $d_d$ | Droplet diameter (m) |
| $d_b$ | Bubble diameter (m) |
| dt | Increment in time variable, time step (s$^{-1}$) |
| dx | Increment in spacial variable (m) |
| $dm_{H2}$ | The mass of hydrogen generated (kg/s) |
| $dm_{Zr}$ | The mass of Zircaloy consumed per second (kg/w) |
| Diss$_p$ | Energy dissipation function for phase $_p$ (W/m$^3$) |
| FWF | Wall drag coefficient for liquid (s$^{-1}$) |
| FWG | Wall drag coefficient for vapor (s$^{-1}$) |
| g | gravitational constant (m/s$^2$) |
| h | Enthalpy of mixture (W) |
| $h_{if}$ | Interfacial heat transfer coefficient for liquid phase (W/m$^2$ · K) |
| $h_{ig}$ | Interfacial heat transfer coefficient for vapor phase (W/m$^2$ · K) |
| $h_{fg}$ | Latent heat of vaporization (W) |
| htcf | Convective heat transfer coefficient for liquid phase (W/m$_2$ · K) |
| htcg | Convective heat transfer coefficient for vapor phase (W/m$_2$ · K) |
| j | Index for junction location |
| jik | The index of inlet volume k of junction flow j |
| jok | The index of outlet volume k of junction flow j |
| $J_n$ | Conversion factor (10$^{-3}$/6.02 × 10$^{23}$ kg/# atoms) |
| K | Thermal conductivity (W/m · k) |
| $K_B$ | Boltzman constant |
| $K_f$ | Coefficient of isothermal compressibility for liquid (Pa$^{-1}$) |
| $K_g$ | Coefficient of isothermal compressibility for vapor (Pa$^{-1}$) |
| L | Length (m) |
| M | Mach number |
| $m_o''$ | Total oxygen consumed (Kg/m$^2$) |
| $m_{Zr}$ | Mass of Zircaloy (Kg) |
| P | Pressure (Pa) |
| Pr | Prandtl number |
| $q_{if}$ | Interfacial heat transfer to liquid phase (W/m$^2$) |
| $q_{ig}$ | Interfacial heat transfer to gas phase (W/m$^2$) |
| $q_{wf}$ | Wall heat transfer to liquid phase (W/m$^2$) |
| $q_{wg}$ | Wall heat transfer to gas phase (W/m$^2$) |
| Re | Reynolds number |
| Rn | Universal gas constant of noncondensible gas (N · m/Kg · K) |
| Rs | Universal gas contnet of steam (N · m/Kg · K) |
| $R_{fi}$ | Number density of radioactive isotope i in liquid phase (# atoms/m$^3$) |
| $R_{gi}$ | Number density of radioactive isotope i in gas phase (# atoms/m$^3$) |
| $\rho_f^s$ | Saturated liquid density (Kg/m$^3$) |
| $\rho_g^s$ | Saturated vapor density (Kg/m$^3$) |
| $\rho_{Rfi}$ | Density of radioactive material i in liquid phase (Kg/m$^3$) |
| $\rho_{Rgi}$ | Density of radioactive material i in gas phase (Kg/m$^3$) |
| $\rho_{Zr}$ | Density of $ZrO_2$ |
| r(t) | Reacting surface at time t (m) |
| $\delta S_f$ | Source/sink of liquid per unit of length (Kg/s · m) |
| $\delta S_g$ | Source/sink of gas per unit length (Kg/s · m) |
| $\delta S_n$ | Source/sink of noncondensible gas per unit length (Kg/s · m) |
| T | Fluid temperature (K) |
| $T_c$ | Critical temperature (K) |
| $T_R$ | Temperature Ratio |
| $T^s$ | Saturation temperature (K) |
| $T_f$ | Liquid temperature (K) |
| $T_g$ | Gas temperature (K) |
| $u_f$ | Specific internal energy of liquid phase (J/Kg) |
| $u_g$ | Specific internal energy of gas phase (J/Kg) |
| $v_f$ | Velocity of liquid phase (m/s) |
| $v_g$ | Velocity of gas phase (m/s) |
| $V_g$ | Vapor specific volume (1/m$^3$) |
| $V_f$ | Liquid specific volume (1/m$^3$) |
| $v_c$ | Choking velocity (m/s) |
| W | Mass flow rate (Kg/S) |
| X | Mass fraction, quality of steam |
| $X_c$ | Equilibrium quality |
| $X_i$ | Carry-over factor (value between 0–1) |

Symbols

|  |  |
|---|---|
| α | Void fraction |
| β | Coefficient of isobaric thermal expansion (K$^{-1}$) |
| Γ | Volumetric mass exchange rate (kg/m$^3$ · s) |
| ε | Surface roughness |
| K | Coefficient of isothermal compressibility (Pa$^{-1}$) |
| λ | Friction factor |
| μ | Viscosity (Kg/m · s) |
| ν | Kinematic viscosity (m$^2$/s) |
| π | 3.141592654 |
| ρ | Density (Kg/m$^3$) |
| σ | Surface tension (J/m$^2$) |

Endnotes

1. M. Ishii, "Foundation of Various Two-Phase Flow Models and Their Limitations," Argonne National Laboratory Report.
2. M. Ishii, "Two-Fluid Model for Two-Phase Flow," Multiphase Science and Technology, Volume 5 (1990), Chapter 1.
3. W. Wulff, "Computational Method for Multiphase Flow," Multiphase Science and Technology, Volume 5 (1990), Chapter 3.
4. Zen-Yow Wang, et al., "THEATRe™—Thermal Hydraulic Engineering Analysis Tool in Real-Time," paper, Proceedings of The Simulation Multiconference on Simulators International VIII, 1–5, April 1991.
5. M. Ishii, "One-Dimensional Drift-Flux Model And Constitutive Equations for Relative Motion Between Phases in Various Two-Phase Flow Regimes," ANL-77-47, Oct. 1977.
6. Isao Kataoka and Mamoru Ishii, "Prediction of Pool Void Fraction By New Drift Flux Correlation," NUREG/CR-4657, ANL-86-29, June 1986.
7. Guan-Hwa Wang, et al., "CONcERT™—Core Neutronic Engineering in Real-Time," paper, Proceedings of The Simulation Multiconference on Simulators International VIII, 1–5 April 1991.
8. Victor H. Ransom, et al., "RELAP5/MOD3 Code Manual Volume 1: Code Structure System Models, and Solution Methods," paper, Idaho National Engineering Laboratory, NUREG/CR-4312, EGG-2396, August 1985.

9. M. Ishii and K. Mishima, "Study of Two-Fluid Model and Interfacial Area" NUREG/CR-1873, ANL-80-111, December 1980.

10. Y. Taitel, D. Bornea and A. E. Dukler, "Modeling Flow Pattern Transitions for Study Upward Gas-Liquid Flow in Vertical Tubes," AIChE Journal, 26, 3, 1980, pp 345–354.

11. H. C. Unal, "Maximum Bubble Diameter, Maximum Bubble-Growth Time and Bubble Growth Rate During the Subcooled Nucleate Flow Boiling of Water Up to 17.7 $MN/m^2$," International Journal of Heat and Mass Transfer, 198, (1976), pp. 643.2–649.

12. K. Mishima and M. Ishii, "Flow Regime Transition Criteria for Upward Two-Phase Flow in Vertical Tubes," International Journal of Heat and Mass Transfer, 27 (1984), pp. 723–737.

13. K. Mishima and M. Ishii, Flow Regime Transition Criteria Consistent with Two-Fluid Model for Vertical Two-Phase Flow, NUREG/CR-3338, AXIL-83.2-42, April 1983.

14. K. W. McQuillan and P. D. Whalley, "Flow Patterns in Vertical Two-Phase Flow, International Journal of Multiphase Flow, 11 (1985), pp. 161–175.

15. S. Rouhani et al., "TRAC-BF1 Models and Correlations," February 1988.

16. Y. Taitel, A. E. Kudler, "A Model for Predicting Flow Regime Transitions in Horizontal and Near Horizontal Gas-Liquid Flow," AIChE Journal, 22, 1, (1976), pp 47–55.

17. P. Griffith and G. B. Wallis, "Two-Phase Slug Flow," Journal of Heat Transfer, 83, (1961), pp. 307–318.

18. G. F. Hewitt, "Two-Phase Flow Patterns and Their Relationship to Two-Phase Heat Transfer," Two-Phase Flows and Heat Transfer, 1, (Washington: Hemisphere Publishing Corp., 1977), pp. 11–35.

19. J. Weisman, D. Duncan, J. Gibson and T. Crawford, "Effects of Fluid Properties and Pipe Diameter on Two-Phase Flow Patterns in Horizontal Lines," International Journal of Multiphase Flow, 5, (1979), pp. 437–462.

20. W. G. Choe, L. Weinberg and J. Weisman, "Observation and Correlation of Flow Pattern Transition in Horizontal, Co-Current Gas-Liquid Flow," in T. N. Veziroglu and S. Kakac (eds.), Two-Phase Transport and Reactor Safety, (Washington: Hemisphere Publishing Corp., 1978).

21. K. Lee & D. J. Ryley, "The Evaporation of Water Droplets in Superheated Steam", Journal of Heat Transfer, ASME, (November 1968), pp. 445–451.

22. F. W. Dittus and L. M. K. Boelter, "Heat Transfer in Automobile Radiators of The Tubular Type," Publications in Engineering, 2, (University of California, Berkeley, 1930), pp. 443–461.

23. K. T. Chaxton, J. G. Collier, J. A. Ward, "H.T.F.S., Correlation for Two-Phase Pressure Drop and Void Fraction in Tubes", AERE-R7162, 1972

24. R. W. Lockhart and R. C. Martinelli, "Proposed Correlation of Data for Isothermal two-Phase, Two Component Flow in Pipes," Chemical Engineering Progress, 45, 1 (1949), pp 39–48.

25. D. Chisholm, "A Theoretical Basis for the Lockhart-Martinelli Correlation for Two-Phase Flow," Journal of Heat and Mass Transfer, 10 (1967), pp. 1767–1778.

26. C. F. Colebrook, "Turbulent Flow in Pipes with Particular Reference to the Transition Region Between Smooth and Rough Pipe Laws," Journal of Institution Civil Engineers, 11 (1939), pp. 133–156.

27. Victor H. Ransom, et al., "RELAP5/MOD3 Code Manual Volume 4: Models and Correlations," Idaho National Engineering Laboratory, NUREG/CR-4312, EGG-2396, August 1985.

28. J. C. Chen, "A Correlation for Boiling Heat Transfer to Saturated Fluids in Convective Flow," Process Design and Development, 5, 1966, pp. 322–327.

29. D. C. Groeneveld, S. C. Cheng, and T. Doan, "1986 AECL-UO Critical Heat Flux Lookup Table," Heat Transfer Engineering, 7, 1–2, 1986, pp. 46–62.

30. K. H. Sun, J. M. Gonzales-Santalo, and C. L. Tien, "Calculations of Combined Radiation and Convection Heat Transfer in Rod Bundles Under Emergency Cooling Conditions," Journal of Heat Transfer, 1976, pp. 414.2–420.

31. L. A. Bromley, N. R. Leroy and J. A. Robbers, "Heat Transfer in Forced Convection Film Boiling," Industrial and Engineering Chemistry, 45, 1953, p. 2639.

32. W. M. Kays, Convective Heat and Mass Transfer, New York: McGraw-Hill Book Co., 1986.

33. W. H. McAdams, Heat Transmission, 3rd edition, (New York: McGraw-Hill, 1954).

34. L. Haar, J. S. Gallagher and G. S. Kell, "NBS/NRC Steam Tables," Hemisphere Publishing Corporation, Washington, 1984.

35. M. D. Alamgir and J. H. lienhard, "Correlation of Pressure Undershoot During Hot Water Depressurization," ASME Journal of Heat Transfer, volume 103, 1981, pp.52–73.

36. O. C. Jones, Jr., "Flashing Inception in Flowing Liquids," ASME Journal of Heat Transfer, Volume 102, 1980, pp. 439–444.

37. J. A. Trapp and V. H. Ransom, "A choked-Flow Calculation Criterion for Nonhomogeneous, Nonequilibrium, Two-Phase Flows," International Journal of Multiphase Flow, Volume 8, 1982, pp. 669–681.

38. Guy B. Spikes, GGNS Simulator Fuel/Mechanical and Thermal-Hydraulic Reference Data (Attachment to Memo no. PSA-91/0278, Entergy Operations, Inc. Dec. 23, 1991).

39. Zen-Yow Wang, Guan-Hwa Wang, Eric K Lin, James K. Lin, Horngshyang Lein, The THEATRe™ Code Development and Assessment (1991 ANS Winter Meeting, Nov. 10–14, 1991, San Francisco, Calif.).

40. Neil E. Todreas and Mujid S. Kazimi, Nuclear Systems I—Thermal Hydraulic Fundamentals (Hemisphere Publishing Corporation, 1990).

41. James H. Rust, Nuclear Power Plant Engineering (Haralson Publishing Company, 1979).

42. R. T. Lahey, Jr. and F. J. Moody, The Thermal Hydraulics of A Boiling Water Nuclear Reactor (American Nuclear Society, 1977).

43. Fred H. Smith, GGNS-1 Cycle-5 Core Performance Data for the Plant Simulator Upgrade (Attachment to Memo No. CEXO92/00023, Entergy Operations, Inc., Jan. 20, 1992).

One skilled in the art will appreciate that the present invention can be practiced by other than the described embodiments which are presented for purposes of illustration and not of limitation.

We claim:

1. A method for generating a real time simulation and best estimate engineering analysis of power plant thermohydraulic phenomena comprising:

providing a single computer having a memory and an operating system for executing software;

selecting a two-phase thermal hydraulic methodology for a power plant thermohydraulic system;

selecting a real time computational methodology having a constant time step;

synthesizing the selected two phase thermal hydraulic and real time computational methodologies, and producing thereby a real time simulation and best estimate engineering analysis for said power plant thermohydraulic system operable to cover a full range power plant simulation and analysis within a high fidelity tolerance; and storing the sythesized real time simulation and best estimate engineering analysis as a software program in said computer memory, providing a set of thennohydraulic parameters for said power plant thermohydraulic system, and using said software program to train power plant operators to learn how to respond to unexpected events arising from power plant thermohydraulic system malfunctions, and accidents in response to said provided set of thermohydraulic parameters.

2. The method of claim 1 wherein said full range power plant simulation further comprises simulating normal, abnormal and accidental operating conditions of said power plant thermohydraulic system and including at least one fluid thermodynamic state selected from among the group consisting of a stable subcooled liquid state, a stable superheated gas state, a metastable superheated liquid state, and a metastable subcooled gas state.

3. The method of claim 1 wherein the step of synthesizing the selected two phase thermal hydraulic and real time computational methodologies further comprise providing a time domain and a space domain, a constant computational time step in the time domain and a fixed two-phase thermal hydraulic configuration in the space domain, a first plurality of basic field equations, one noncondensible continuity equation, a plurality of state equations, an interfacial mass balance equation, a plurality of constitutive correlations, and a two-step semi-implicit numerical scheme solution.

4. The method of claim 3 wherein:

providing the first plurality of basic field equations further comprises providing five basic field equations for a gas mass continuity, a liquid mass continuity, a gas energy continuity, a liquid energy continuity, and a mixture momentum;

providing the plurality of state equations further comprises providing five state equations characterized by a gas density, a liquid density, a gas temperature, a liquid temperature, and a saturation temperature; and providing the plurality of constitutive correlations further comprises providing a set of flow regime maps, an interfacial heat and mass transfer, a wall drag, and a wall heat transfer.

5. The method of claim 4 further comprising providing component models including at least one of a noncondensible gas model, a critical flow model, and a dimensionless homologous pump model.

6. The method of claim 5 wherein providing the plurality of constitutive correlations further comprises selecting a plurality of RELAP constitutive correlations and component models and modifying the RELAP constitutive correlations and component models by providing a real time computational constraint having a constant time step and a coarse nodalization, the coarse nodalization comprising a number of nodes that is approximately one third of the number of nodes used when using an engineering code in reactor core modeling, wherein the modified RELAP constitutive correlations and component models can be assessed under a first set of input conditions and lead to a corresponding first set of numerical results which first set of input conditions applied to said RELAP constitutive correlations and component models lead to said first set of numerical results.

7. The method of claim 6 further comprising the step of providing said constant time step to be selected from between 0.0625 to 0.125 seconds.

8. The method of claim 3 wherein providing the first plurality of basic field equations further comprises providing five basic field equations for a gas mass continuity, a liquid mass continuity, a gas energy continuity, a liquid energy continuity, and a mixture momentum;

providing the plurality of state equations further comprises providing five state equations characterized by a gas density, a liquid density, a gas temperature, a liquid temperature, and a saturation temperature; and providing the plurality of constitutive correlations further comprises providing a set of flow regime maps, an interfacial heat and mass transfer, a wall drag, and a wall heat transfer; and wherein selecting the real time computational methodology further comprises selecting:

an interfacial slip equation that is a drift flux equation;

a set of drift flux correlations that are consistent with RELAP flow regime maps;

a water property computation method including a full thermodynamic range two independent thermodynamic state table search steam tables;

a solution method including efficient matrix solvers; and at least one of a heat structure model, a void axial distribution model in a boiling water reactor core, a boron tracking model, a water-metal reaction model, and a radioactivity model;

wherein selecting the drift flux correlations further comprises providing a drift flux correlation that provides a momentum closure for the mixture momentum equation and drift flux equation under normal and severe transient tests, includes a selection logic and drift-flux correlations having a distribution parameter ($C_0$) and a velocity of gas phase parameter($v_{gj}$), and covers different flow regimes, different inclination and flow stratifications.

9. The method of claims 1 or 4 wherein selecting the real time computational methodology further comprises selecting:

an interfacial slip equation that is a drift flux equation;

a set of drift flux correlations that are consistent with RELAP flow regime maps;

a water property computation method including a full thermodynamic range two independent thermodynamic state table search steam tables;

a solution method including efficient matrix solvers; and at least one of a heat structure model, a void axial distribution model in a boiling water reactor core, a boron tracking model, a water-metal reaction model, and a radioactivity model.

10. The method of claims 9 further comprising selecting a 1984 NBS/NRC steam table package, modifying the steam table package to calculate additional derived water thermodynamic properties, producing a water property package output from the modified steam table package, and modifying the output to increase accuracy and speed by applying an automatic grid optimization scheme, coding generation during off-line development, and applying fast table search method in on-line environment.

11. The method of claims 1 or 3 further comprising selecting a 1984 NBS/NRC steam table package, modifying the steam table package to calculate additional derived water thermodynamic properties, producing a water property package output from the modified steam table package, and modifying the output to increase accuracy and speed by applying an automatic grid optimization scheme, coding generation during off-line development, and applying fast table search method in on-line environment.

12. In a simulator tool for simulating a power plant thermohydraulic system having a plurality of thermohydraulic parameters and a plurality of thermodynamic states, said simulator being responsive to a set of initial and boundary conditions representing said plurality of thermohydraulic parameters of said power plant thermohydraulic system parameters at a point where a simulation is to begin, comprising:

a single computer having an operating system for executing software and memory;

a software program loaded in said computer memory and including a model of said power plant thermohydraulic system as a plurality of nodes, and a solution set of equations operable to determine changes in said plurality of thermohydraulic parameters and thermodynamic states during a real time marching in response to a constant time step and said plurality of thermohydraulic parameters, said thermohydraulic system comprising a two-phase thermohydraulic system; and a matrix solver package for minimizing computation time to solve simultaneously said solution set of equations during real time marching under constant time step for simulating all power plant operations in real time, characterized by (i) a matrix solution code generation during an off-line development for matrix inversion and factorization, (ii) an optimization of matrix inversion, matrix factorization and execution of the solution of factorized matrices to produce an optimized solver package, and (iii) an execution of the optimized solver package during an on-line environment to solve said solution set.

13. The simulator tool of claim 12 further comprising means for simulating a power plant thermohydraulic void axial distribution (VAD) phenomena in real time wherein said plurality of nodes comprises a coarse node configuration having approximately one third the number of nodes of an engineering code free nodalization in a reactor core, each coarse node having a plurality of subnodes, and means for calculating a mixture enthalpy distribution, a local liquid and gas enthalpy distribution, and a local wall heat transfer distribution for each subnode of the coarse node.

14. A computer implemented method for simulating a power plant thermohydraulic system comprising the steps of:

modeling the power plant thermohydraulic system as a plurality of nodes; providing a solution set of equations comprising a fast plurality of basic field equations having one noncondensible parameter field equation, the first plurality of field equations having a second plurality of independent field variables;

a drift equation for correlating the first plurality of field equations with the independent field variables of those equations;

an interfacial mass balance equation for determining an interfacial mass transfer rate;

a set of constitutive correlations so that there is closure between the first plurality of field equations, the interfacial mass balance equation and the independent field variables; and a plurality of state equations for determining dependent thermodynamic variables; and selecting a plurality of thermohydraulic parameters representative of an initial and boundary condition for said power plant thermohydraulic system; and simulating a sequence of operating conditions for said power plant thermohydraulic system with a high fidelity tolerance in real time as a function of time and said selected plurality of thermohydraulic parameters by applying said solution set of equations to said selected plurality of thermohydraulic parameters using a predictor-corrector numerical scheme and a constant time step.

15. The method of claim 14 wherein:

providing the first plurality of field equations further comprises providing equations for gas mass continuity, liquid mass continuity, gas energy continuity, liquid energy continuity, and mixture momentum, each equation having a non-linear form and a linearized form;

providing the one noncondensible parameter field equation further comprises providing a non-condensible gas mass continuity equation;

providing the plurality of state equations further comprises providing five state equations characterized by gas density, liquid density, gas temperature, liquid temperature, and saturation temperature, each equation having a non-linear form and a linearized form;

providing the constitutive correlations further comprises providing flow regime maps, interfacial heat and mass transfer, wall drag, wall heat transfer; and using the predictor-corrector numerical scheme further comprises applying a two-step semi-implicit numerical scheme comprising a first step of solving simultaneously the solution set of equations using non-conservative linearized forms of the first plurality of field equations and the plurality of state equations, and a second step of enhancing mass and energy conservation and a consistency of fluid properties by applying the non-linear forms of the first plurality of field equations and the plurality of state equations.

16. The method of claim 15 wherein the first step is further characterized by creating a large matrix for a system of cells in a nodal representation, solving the matrix by direct factorization to form two matrices, and solving the two matrices.

17. The method of claim 14 wherein simulating the sequence of operating conditions further comprises determining a response of the power plant thermohydraulic system based on a model of at least one of a noncondensible gas model, a critical flow model, and a dimensionless homologous pump model.

18. The method of claim 14 wherein using the constant time step further comprises using a constant time step that is in a range between 0.0625 seconds and 0.125 seconds.

19. The method of claim 14 wherein the simulating step further comprises determining a plurality of final state parameters of said power plant thermohydraulic system by determining final state parameters of at least one of a set of junction averaged properties, a set of volume averaged properties and a set of junction donor properties.

20. The method of claim 14 further comprising displaying the simulated operating condition to an operator and providing an input device for the operator to modify a thermohydraulic parameter of said simulated operating condition, wherein the simulating step further comprises incorporating said modified thermohydraulic parameter into said selected plurality of thermohydraulic parameters for modifying the simulated operating condition in real time.

21. The method of claim 20 further comprising training an operator to respond to a variation in said power plant thermohydraulic system operating condition, and further simulating said operating condition in response to said operator's response.

22. The method of claim 14 further comprising performing a best estimate engineering analysis of said power plant thermohydraulic system based on the simulated sequence of operation conditions.

23. The method of claim 14 wherein the step of selecting the plurality of thermohydraulic parameters further comprises monitoring the plurality of thermohydraulic parameters of said power plant thermohydraulic system, selecting a time instant, and recording the monitored plurality of thermohydraulic parameters at the selected time instant as the initial and boundary condition.

24. Apparatus for real time simulation of a power plant thermohydraulic system having a plurality of thermohydraulic parameters and a sequence of operating conditions comprising:

a computer having an operating system for executing software and a memory storage device;

a mathematical model of the power plant thermohydraulic system as a plurality of interconnected nodes, the mathematical model being stored in said memory storage device;

a first set of thermohydraulic parameters corresponding to a selected power plant thermohydraulic system operating condition and a flow regime of the plurality of thermohydraulic parameters;

means for inputting said first set of thermohydraulic parameters into said memory storage device;

a solution set of equations comprising:

a first plurality of basic field equations having one noncondensible parameter field equation, the first plurality of basic field equations having a second plurality of independent field variables;

a drift equation for correlating the first plurality of basic field equations with the independent field variables;

an interfacial mass balance equation for determining an interfacial mass transfer rate;

a set of constitutive correlations to provide closure between the first plurality of basic field equations, the interfacial mass balance equation and the independent field variables; and a plurality of state equations for determining dependent thermodynamic variables said solution set of equations being stored in said memory storage device;

the computer being operable to simulate in real time a sequence of thermohydraulic parameters representative of said sequence of power plant operating conditions as a function of time and said first set of thermohydraulic parameters, the computer comprising means for applying a two step semi-implicit numerical scheme to solve simultaneously the solution set of equations in response to an input set of thermohydraulic parameters using a constant time step and determining an output set of thermohydraulic parameters corresponding to said simulated power plant thermohydraulic system condition with a high fidelity tolerance, wherein said first set of thermohydraulic parameters is an initial input set of thermohydraulic parameters, and each output set of thermohydraulic parameters is thereafter the next input set of thermohydraulic parameters for a following time step.

25. The apparatus of claim 24 wherein the applying means further comprises:

means for converting the solution set of equations into a first matrix;

means for generating a sparse matrix solver;

means for creating two factorized matrices from the first matrix; and means for solving the factorized matrices.

26. The apparatus of claim 24 wherein the computer further comprises means for determining the output set of thermohydraulic parameters to be at least one of a set of junction averaged properties, a set of volume averaged properties, and a set of junction donor properties.

27. The apparatus of claim 24 wherein the constant time step is selected from between 0.0625 and 0.125 seconds.

28. The apparatus of claim 24 wherein the computer further comprises a user interface to modify a thermohydraulic parameter in a determined output set of thermohydraulic parameters.

29. The apparatus of claim 28 wherein the computer further comprises a tool to train an operator to respond to a full range of power plant thermohydraulic system operating conditions in real time.

30. The apparatus of claim 20 wherein the computer further comprises a best estimate engineering analysis tool to analyze said power plant thermohydraulic system based on a selected simulated sequence of thermohydraulic parameters.

31. The apparatus of claim 24 further comprising a plurality of sensors coupled to said power plant thermohydraulic system, said plurality of sensors having respective output signals comprising said first set of thermohydraulic parameters.

32. Apparatus for training a power plant operator to respond to normal, abnormal, and beyond design operating conditions of a power plant thermohydraulic system comprising:

a computer;

a memory device operable to store data representative of said power plant thermohydraulic system operating conditions and executable software for operating on said data;

an input interface operable to store in said memory device a data set corresponding to said plurality of thermohydraulic parameters; and a software program performing the method of claim 23, the software program being stored in said memory device, the computer being operable to execute said computer program and process said stored data set to simulate said operating conditions of the power plant thermohydraulic system.

33. The apparatus of claim 32 wherein said input interface is further operable to store an operator-provided data sub-set in said memory device, said operator-provided data sub-set corresponding to an operator's response to the computer execution of said computer program in response to said stored data set, said operator-provided data sub-set operable to modify said stored data set.

* * * * *